(12) United States Patent
Balzacki

(10) Patent No.: US 9,448,636 B2
(45) Date of Patent: Sep. 20, 2016

(54) IDENTIFYING GESTURES USING GESTURE DATA COMPRESSED BY PCA, PRINCIPAL JOINT VARIABLE ANALYSIS, AND COMPRESSED FEATURE MATRICES

(71) Applicant: ARB LABS INC., Toronto (CA)

(72) Inventor: Adrian Balzacki, Toronto (CA)

(73) Assignee: ARB LABS INC., Mississauga (CA)

( * ) Notice: Subject to any disclaimer, the term of this patent is extended or adjusted under 35 U.S.C. 154(b) by 183 days.

(21) Appl. No.: 13/838,294

(22) Filed: Mar. 15, 2013

(65) Prior Publication Data

US 2013/0278501 A1    Oct. 24, 2013

Related U.S. Application Data

(63) Continuation-in-part of application No. PCT/IB2012/000772, filed on Apr. 18, 2012.

(60) Provisional application No. 61/735,838, filed on Dec. 11, 2012, provisional application No. 61/699,519, filed on Sep. 11, 2012.

(51) Int. Cl.
| | | |
|---|---|---|
| G06F 15/18 | (2006.01) |
| G06F 3/01 | (2006.01) |
| G06K 9/46 | (2006.01) |
| G06F 3/03 | (2006.01) |
| G06K 9/00 | (2006.01) |
| G06K 9/62 | (2006.01) |

(52) U.S. Cl.
CPC .............. *G06F 3/017* (2013.01); *G06F 3/011* (2013.01); *G06F 3/0304* (2013.01); *G06K 9/00335* (2013.01); *G06K 9/46* (2013.01); *G06K 9/6247* (2013.01)

(58) Field of Classification Search
CPC ........................... G06K 9/00087; G06K 9/46
USPC ............................... 706/12, 45, 62
See application file for complete search history.

(56) References Cited

U.S. PATENT DOCUMENTS

| | | | | |
|---|---|---|---|---|
| 8,284,202 | B2 * | 10/2012 | Hodgins et al. | 345/473 |
| 8,864,581 | B2 * | 10/2014 | Leyvand et al. | 463/30 |
| 2010/0111370 | A1 * | 5/2010 | Black et al. | 382/111 |
| 2012/0165098 | A1 * | 6/2012 | Raptis et al. | 463/36 |
| 2012/0214594 | A1 * | 8/2012 | Kirovski et al. | 463/36 |

* cited by examiner

*Primary Examiner* — David Vincent
(74) *Attorney, Agent, or Firm* — Norton Rose Fulbright Canada LLP; Maya Medeiros

(57) ABSTRACT

Systems and method described herein present techniques for identifying a gesture using gesture data compressed by principal joint variable analysis. A classifier of a gesture recognition system may receive a frame comprising a set of gesture data points identifying locations of body parts of a subject. The classifier may determining that a subset of the set of gesture data points is sufficient to recognize a first gesture. The subset may be stored into a database in reference to the first gesture. A recognizer may receive a new frame of new gesture data points identifying locations of body parts of a new subject. The recognizer may recognize that the gesture of the new subject corresponds to the first gesture responsive to comparing at least one new gesture data point from the new frame to at least one gesture data point of the subset.

20 Claims, 31 Drawing Sheets

Defining Feature Matrix

Self-Referencing (Anchoring)

$$f_{st} = \begin{bmatrix} -0.4234 & -0.5235 & 0.7234 \\ \vdots & \vdots & \vdots \\ 0.4864 & 0.2341 & -0.1241 \end{bmatrix}$$

All joints oriented $to\ j_a$:
$f_{st j_a} = [0\ 0\ 0]$ $$f_{st} = \begin{bmatrix} 0 & 0 & 0 \\ \vdots & \vdots & \vdots \\ 0.063 & 0.7576 & -0.8475 \end{bmatrix}$$

FIG. 12

Scaling (Normalizing)

The normalized vector equation:

$$\hat{u} = \frac{u}{\|u\|}$$

Matrix Scaled to:

$$\hat{f}_{st} = \begin{bmatrix} 0 & 0 & 0 & \cdots & \hat{z}_{st} \\ \cdots & \hat{x}_{st} & \hat{y}_{st} & \cdots & \end{bmatrix}$$

where, $0 \leq x, y, z \leq 1$

FIG. 13

PCA Collapsing - Reducing Dimensionality $$\hat{f}_{st} = \begin{bmatrix} x_{st1} & y_{st1} & z_{st1} \\ \vdots & \vdots & \vdots \\ x_{stj} & y_{stj} & z_{stj} \end{bmatrix}$$

Reduced through PCA to:

$$\hat{f}'_{st} = \begin{bmatrix} f'_{st1} \\ \vdots \\ f'_{stj} \end{bmatrix}$$

FIG. 14

Slow and Fast Motion Vectors

Two Temporal Vector Matrices, defined as:

$$[\hat{f}'_{s(\bar{t}-t')} \quad ... \quad \hat{f}'_{s\bar{t}}] \ \& \ [\hat{f}'_{s(\bar{t}-t'')} \quad ... \quad \hat{f}'_{s\bar{t}}]$$

Experimental Parameters:

$$[\hat{f}'_{s(\bar{t}-45)} \quad ... \quad \hat{f}'_{s\bar{t}}] \ \& \ [\hat{f}'_{s(\bar{t}-15)} \quad ... \quad \hat{f}'_{s\bar{t}}]$$

For each Joint J
→ 4 derive coefficients for each row of Matrix 1, and
→ 4 derive coefficients for each row of Matrix 2,
= total of 8 feature points / skeleton point / co-ordinate axis
= 24 feature points for of the skeleton point along all 3 axis.

So for $J = 20$, total of 480 feature point describe the temporal motion of skeleton at this instant $t$.

FIG. 15

Temporal Vector

[Frame i - 45, Frame i - 44,... Frame i, Frame i - 15, Frame i - 14,... Frame i]

[Frame (i+1) - 45, Frame (i+1) - 44,... Frame (i+1), Frame (i+1) - 15, Frame (i+1) - 14,... Frame (i+1)]

[Frame (i+2) - 45, Frame (i+2) - 44,... Frame (i+2), Frame (i+2) - 15, Frame (i+2) - 14,... Frame (i+2)]

[Frame (i+2) - 45, Frame (i+2) - 44,... Frame (i+2), Frame (i+2) - 15, Frame (i+2) - 14,... Frame (i+2)]

[Frame (i+2) - 45, Frame (i+2) - 44,... Frame (i+2), Frame (i+2) - 15, Frame (i+2) - 14,... Frame (i+2)]

FIG. 16

IDENTIFYING GESTURES USING GESTURE DATA COMPRESSED BY PCA, PRINCIPAL JOINT VARIABLE ANALYSIS, AND COMPRESSED FEATURE MATRICES

CROSS-REFERENCE TO RELATED APPLICATIONS

The present application claims priority to U.S. Provisional Patent Application Ser. No. 61/735,838 filed on Dec. 11, 2012, entitled "Systems and Methods of Detecting Body Movements Using Globally Generated Multi-Dimensional Gesture Data", U.S. Provisional Patent Application Ser. No. 61/699,519, filed on Sep. 11, 2012, entitled "Systems and Methods of Providing Non-Contact and Hardware-Free Interface with a Display Screen", and also to a PCT international Application serial number PCT/IB2012/000772, filed on Apr. 18, 2012, all three of which are incorporated by reference herein in their entirety. This application is also a continuation-in-part application of PCT International Application serial number PCT/IB2012/000772, filed on Apr. 18, 2012.

FIELD OF THE INVENTION

The present invention relates to crowd sourcing based on multi-dimensional gesture data. More particularly, the present invention relates to systems and methods for crowd sourcing using multi-dimensional gesture data.

BACKGROUND

Gestures may be viewed as an important aspect of body language and may be used every day in communications between people. For many people, it may be difficult to avoid making some kind of gesture when communicating face to face with another person. Gestures may convey messages easily and seemingly wordlessly. Being able to consistently and rapidly assess and perform gestures may form the basis of many forms of entertainment, including for example games that can be either cooperative or competitive in nature. Gestures may represent emotions or even intentions that people may have. Finding a way to differentiate between these forms of communication accurately may be beneficial for a variety of purposes.

Typically in the industry, the challenges of implementing gesture recognition systems would be overcome by using shape descriptors in combination with various processes as evidenced in the works of Prof. Ling Goan and Prof. Matthew Kyan and the published papers "Computerized Recognition of Human Gestures" by A. Bulzacki, L. Zhao, L. Guan and K. Raahemifar and "An Introduction to Gesture Recognition Through Conversion to a Vector Based Medium" by A. Bulzacki; L. Civan and L. Zhao. However, despite the general direction taken by these and other similar leaders in the field and despite their suggestion to continue on this path, the inventor took a different approach to solving the gesture recognition problem as disclosed below.

SUMMARY

Machines may have the potential to successfully classify a gesture more quickly and more efficiently than a human being through a process, such as machine learning. In a process, such as machine learning, a machine may be taught to recognize gestures. The potential for machine-based intelligence to categorize and detect different types of gestures may be used to expand the worlds of electronic communication, interactive entertainment, and security systems.

What actually defines a gesture, and what that gesture means may be a subjective view. Gestures may include one or more sequences of movements of a human body through a range of time. Gestures may also include a set of configurations or positions of the human body at a particular point in time. In some instances, gestures include a particular position of a human body at it particular instant or a specific point in time A multitude of such particular positions through time may make up a sequence of movements, which may also be used to define a gesture. In some embodiments, an orientation or position of one or more body parts of a human body at a particular time, as well as the movement of these one or more body parts, such as joints, through time may define a gesture.

In one embodiment, hardware components that may be used in the field of gesture recognition research and applied techniques may be made available to the general public for home use and enterprises for industrial or professional use. Data comprising information about positioning and/or movement of joints may be stored for usage by a recognition system. Data comprising information about positioning and/or movement may include self-referenced features of data in which positions of body parts of a subject or locations of joints of a subject are referenced with respect to a particular location on the subject's body. In one instance, the data includes features identifying locations or positions of a subject's body parts and/or joints in reference to, or with respect to the subject's waist. In some instances, the self-referential data may be referenced with respect to any other body part or location on the subject's body. This self-referential data may used by a learning algorithm so that the learning algorithm may analyze the data and identify some key features of the self-referenced data for a particular body movement that may uniquely identify this particular body movement from all other movements of the subject. As the self-referenced data identifying the positioning and location of body parts with respect to a reference point within the data itself is provided to an artificially intelligent means or algorithms operating on a system, this algorithm may use the data to learn to detect and recognize a gesture of a person based on one or more consecutive frames of gesture data comprising such distinct identifying movement features.

In some embodiments, the same means or algorithms may be used to interpret or detect the future gestures or the intent of the person based on the person's current gesture and movement. In one example, the system may compare one or more frames of gesture data comprising self-referenced data features of an incoming fresh stream of data to one or more frames of gesture data previously processed by the "learning" system and stored in a database. Upon comparison, the system may identify that one or more distinct self-referential features of gesture data in the stored frames closely resemble the one or more self-referential features of the gesture data of the incoming stream. Upon the comparison, the system may determine that the two sets of frames match. In response to identifying that the one or more frames of data stored in a database correspond to a movement of a subject Shooting a basketball, the system may determine that the subject whose body movements are referenced by the self-referenced gesture data of the incoming stream is also shooting a basketball. Similarly, a sequence of flumes in which self-referenced gesture data identifying a person's body parts are in a category of "a waving person" may be detected as a waving person in response to a match of the sequence of frames of the incoming data comprising self-referenced gesture data to a stored set of frames of processed self-referenced gesture data identifying a waving person.

The embodiments of the methods and systems of the present disclosure may be distributed in any type of settings and to any type and form of customers, including end users, enterprises and third parties. In one example, the systems and methods described herein may be deployed to an enterprise, such as an airport security agency, for monitoring behavior of people on the airport and being on lookout for any threatening movements or signs of trouble. In such an embodiment, the enterprise may install a system at the airport which includes detection means, such as cameras, which record frames of data supplied for processing by the recognizing system that compares such incoming data against the gesture data used for detecting of movements. The gesture data used for detection of movements may be supplied by the same or another enterprise as a product. In some embodiments, the gesture data used for the system to learn the movements may be supplied by any number of users providing the gesture data identifying the movements via a network, where the data is generated during the course of the users playing a video game, such as the game of Charades in which players act out movements. In some embodiments, the gesture data used for learning; may be provided by an enterprise that records crowds of people, such as for example a baseball stadium or football stadium where thousands of people are gathered. Data may be provided by any mix of third parties, end users or the enterprise providing the system. Once the data is provided and the system has learned the movements, the learned system may be deployed to any number of enterprises, sport events arenas, airports, concert arenas, or may be deployed to end users for use during the course of playing a video game or for any other type and form of an individual use.

The idea that the process of gesture recognition may be performed by machines may not only offer the convenience of automation and speed, but also open up the potential for artificial systems to participate in gesture-based communication and entertainment. Towards this goal, some form of artificial intelligence may be used to detect, learn or recognize which categories of gestures exist or which movements of a human body exist. As indicated earlier, using these learned categories or movements, systems and methods described herein may, upon detecting a particular movement in the future, predict from contextual (e.g. visual) cues the movement the system has previously learned. The systems described herein may be taught the movements using globally collected data of movements collected and observed from various human performers worldwide. For example, gesture data may be collected via the interne from various players of social and co-operative for competitive) games which may play these games using electronic means, such as the Xbox by Microsoft Corp., Playstation video console by Sony Computer Entertainment or the Wii video console by Nintendo Co, or any other gaining systems or device. In some embodiments, gesture data is collected from players engaging in to gesture-based game in which the players attempting to perform gestures or recognize which gestures are being performed by others; thereby attempting to maximize their accuracy in both tasks. As indicated earlier, the data may be provided by entertainment or sports venues employing dozens of cameras recording people and thus providing unrehearsed and natural gesture data that can be processed for the purpose of teaching the system how to recognize genuine body movements. From collected information about the position and orientation of joints, limbs or other parts of a body during these performances, data may be created for artificial intelligent systems to learn these movements or categories of gestures which are subsequently used for detecting and recognizing movements of persons in the future.

In some aspects, the present disclosure relates to a method of identifying a gesture of a subject based on self-referenced gesture data compressed by principal joint variable analysis. The method may include a step of receiving, by a classifier of a system, a frame comprising a set of gesture data points. Each gesture data point identifying a location of a part of a body of a subject with respect to a reference point on the body of the subject. The method may further include the step of determining, by the classifier, that a subset of the set of gesture data points is sufficient to recognize a first gesture. The method may also include the step of storing, into a database of the system, the subset in reference to the first gesture. The method may also include the step of receiving, by a recognizer of the system, a new frame of new gesture data points, each new gesture data point identifying a location of a part of a body of a new subject with respect to a reference point on the body of the new subject. The method may further include the step of recognizing, by the recognizer, that the gesture of the new subject corresponds to the first gesture responsive to comparing at least one new gesture data point from the new frame to at least one gesture data point of the subset.

In some embodiments, the method comprises the step of determining, by the system, that the new subject performed the first gesture in response to the recognition. In some embodiments, the recognizer selects new gesture data points within a subset of the new gesture data points for identifying the first gesture, the new gesture data points in the new subset corresponding to the gesture data points of the subset. In further embodiments, the recognizer identifies, within a first threshold of accuracy that at least a first new gesture data point of the frame matches at least one gesture data point of the subset. In still further embodiments, the recognizer identifies, within a second threshold of greater accuracy than the first threshold of accuracy that at least a second new gesture data point matches at least a second gesture data point of the subset.

In some embodiments, the classifier receives, together with the frame, a second frame comprising a second set of gesture data points, the second set of gesture data points having gesture data values different from the data values of the set of gesture data points. The classifier may extract a second subset of the gesture data points, the second subset comprising the same gesture data points as the subset. In some embodiments, the reference point includes a waist of the body of the subject. In some embodiments, the reference point includes the mid-point of the chest of the subject. In further embodiments, the recognizer compares a new gesture data point corresponding to a location of a wrist of the new subject with respect to the new subject's waist to a gesture data point of the wrist, of the subject with respect to the subject's waist. In still further embodiments, the recognizer compares a new gesture data point corresponding to a location of an elbow of the new subject with respect to the new subject's mid-point chest to a gesture data point corresponding to a location of an elbow of the subject with respect to the subject's waist.

In some aspects, the present disclosure relates to a system for using self-referenced gesture data compressed by principal joint variable analysis to identify a gesture of a subject. The system may include a classifier of a system that receives a frame comprising a set of gesture data points. Each gesture data point identifying a location of a part of a body of a subject with respect to a reference point on the body of the subject and determining that a subset of the set of gesture data points is sufficient to recognize a first gesture. The system may store into a database of the system the subset in reference to the first gesture. The system may further include a recognizer of the system receiving a new frame of new gesture data points. Each new gesture data point identifying a location of a part of a body of a new subject with respect to a reference point on the body of the new subject. The recognizer may recognize that the gesture of the new subject corresponds to the first gesture responsive to comparing at least one new gesture data point from the new frame to at least one gesture data point of the subset.

In some embodiments, the system determines that the new subject performed the first gesture in response to the recognition. In further embodiments, the recognizer further selects the new gesture data points within a subset of the new gesture data points for identifying the first gesture, the new gesture data points in the new subset corresponding to the gesture data points of the subset. In further embodiments, the recognizer further identifies, within a first threshold of accuracy, that at least a first new gesture data point of the frame matches at least one gesture data point of the subset. In further embodiments, the recognizer further identifies, within a second threshold of greater accuracy than the first threshold of accuracy, that at least a second new gesture data point matches at least a second gesture data point of the subset. In still further embodiments, the classifier further receives, together with the frame, a second frame comprising a second set of gesture data points, the second set of gesture data points having gesture data values different from the data values of the set of gesture data points, and extracts a second subset of the gesture data points, the second subset comprising the same gesture data points as the subset.

In some embodiments, the reference point includes a waist of the body of the subject. In further embodiments, the reference point includes the mid-point of the chest of the subject. In yet further embodiments, the recognizer compares a new gesture data point corresponding to a location of a wrist of the new subject with respect to the new subject's waist to a gesture data point of the wrist of the subject with respect to the subject's waist. In still further embodiments, the recognizer compares a new gesture data point corresponding to a location of an elbow of the new subject with respect to the new subject's mid-point chest to a gesture data point corresponding to a location of an elbow of the subject with respect to the subject's waist.

BRIEF DESCRIPTION OF THE FIGURES

The following drawings correspond to the subject matter of the present disclosure:

FIG. 10C illustrates an exemplary embodiment of a mathematical representation of a feature matrix comprising the gesture data.

FIG. 12 illustrates an exemplary embodiment of a mathematical representation of self-referencing, of the gesture data.

FIG. 13 illustrates an exemplary embodiment of a mathematical representation of scaling and/or normalizing of the gesture data.

FIG. 14. Illustrates an exemplary embodiment of a mathematical representation of PCA collapsing of the gesture data.

FIG. 15 illustrates an exemplary embodiment of a mathematical representation of slow and fast motion vectors.

FIG. 16 illustrates an exemplary embodiment of a mathematical representation of a temporal vector.

DETAILED DESCRIPTION

The present disclosure provides systems and methods of detecting and recognizing movements and gestures of a body, such as a human body, using a gesture recognition system taught or programmed to recognize such movements and gestures. The present disclosure is also directed to systems and methods of teaching or programming such a system to detect and identify gestures and movements of a body, as well as various applications which may be implemented using this system. While for simplicity the present disclosure is generally divided into the following section, it should be understood that the features described in any section can be combined with those described in any other section of this specification.

Section A is generally directed to systems and methods of detecting body movements using gesture data.

Section B is generally directed to systems and methods of compressing gesture data based on principal joint variables analysis.

Section C is generally directed to systems and methods of compressing gesture data based on personal component analysis.

Section D is generally directed to systems and methods of compressing gesture data slow and fast motion vector representations.

Section E is generally directed to non-contact, hardware-free display interface using gesture data.

Section F is generally directed to systems and methods of adjusting gesture recognition sensitivity.

Section G is generally directed to systems and methods of improving detection by personalization of gesture data.

Section H is generally directed to systems and methods of detecting interpersonal interaction using gesture data.

Section I is generally directed to systems and methods of distributing gesture data samples via a web page.

Section J is generally directed to systems and methods of preparing gesture samples using a software application.

A. Systems and Methods of Detecting Body Movements Using Gesture Data

Figure 1:
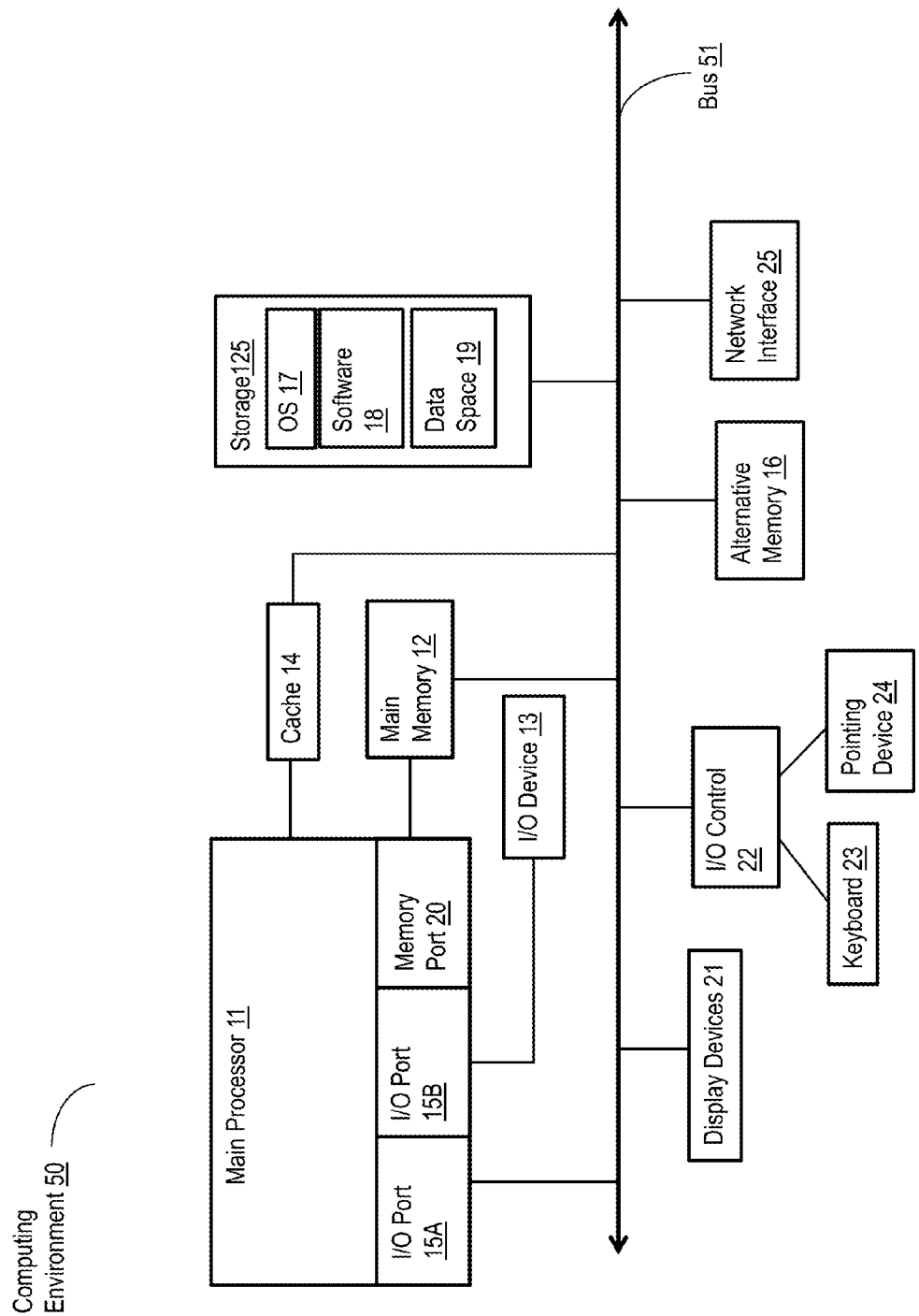
FIG. 1 illustrates a block diagram of an embodiment of a computing environment in which the features of the present invention are executed and implemented.

Referring now to FIG. 1, an embodiment of a computing environment 50 in which the features of the present invention may be implemented is illustrated. In brief overview, devices or systems described herein may include functions, algorithms or methods that may be implemented or executed on any type and form of computing device, such as a computer, a mobile device, a video game device or any other type and form of a network device capable of communicating on any type and form of network and performing the operations described herein. FIG. 1 depicts a block diagram of a computing environment 50, which may be present on any device or system, such as a remote crowding device or crowd sourcing system described later. Computing environment 50 may include hardware and combinations of hardware and software providing the structure on a computing device on which the embodiments of the present disclosure are practiced. Each computing device or a system includes a central processing unit also referred to as a main processor 11 that includes one or more memory ports 20 and one or more input output ports, also referred to I/O) ports 15, such as the I/O ports 15A and 15B. Computing environment 50 may further include, a main memory unit 12 which may be connected to the remainder of the components of the computing environment 50 via a bus 51 and/or may be directly connected to the main processor 11 via memory port 20. The computing environment 50 of a computing device may also include a visual display device 21 such as a monitor, projector or glasses, a keyboard 23 and/or a pointing device 24, such as a mouse, interfaced with the remainder of the device via an I/O control 22. Each computing device 100 may also include additional optional elements, such as one or more input/output devices 13. Main processor 11 may comprise or be interfaced with a cache memory 14. Storage 125 may comprise memory which provides an operating system, also referred to as OS 17, additional software 18 operating on the OS 17 and data space 19 in which additional data or information may be stored. Alternative memory device 16 may be connected to the remaining components of the computing environment via, bus 51. A network interface 25 may also be interfaced with the bus 51 and be used to communicate with external computing devices via an external network.

Main processor 11 includes any logic circuitry that responds to and processes instructions fetched from the main memory unit 122. Main processor 11 may also include any combination of hardware and software for implementing and executing logic functions or algorithms. Main processor 11 may include a single core or a multi core processor. Main processor 11 may comprise any functionality for loading an operating system 17 and operating any software 18 thereon. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; those manufactured by Advanced Micro Devices of Sunnyvale, Calif., or any computing unit for performing similar functions. The computing device may be based on any of these processors, or any other processor capable of operating as described herein.

Main memory unit 12 may include one or more memory chips capable of storing data and allowing any storage location to be directly accessed by the microprocessor 101, such as Static random access memory (SRAM), Flash memory, Burst SRAM or SynchBurst SRAM (BSRAM), Dynamic random access memory (DRAM), Fast Page Mode DRAM (PPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 12 may be based on any of the above described memory chips, or any other available memory chips capable of operating, as described herein. In some embodiments, the main processor 11 communicates with main memory 12 via a system bus 51. In some embodiments of a computing device comprising computing environment 50, the processor communicates directly with main memory 122 via a memory port 20.

FIG. 1 depicts an embodiment in which the main processor 11 communicates directly with cache memory 14 via a connection means, such as a secondary bus which may also sometimes be referred to as a backside bus. In other embodiments, main processor 11 communicates with cache memory 14 using the system bus 51. Main memory, I/O device 13 or any other component of the computing device comprising a computing environment 50 may be connected with any other components of the computing environment via similar secondary bus, depending on the design. Cache memory 14 however may typically have a faster response time than main memory 12 and may be include a type of memory which may be considered faster than main memory 12, such as for example SRAM, BSRAM, or EDRAM. Cache memory may include any structure such as multilevel caches. In some embodiments, the main processor 11 communicates with one or more I/O devices 13 via a local system bus 51. Various busses may be used to connect the main processor 11 to any of the I/O devices 13, such as a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 21, the main processor 11 may use an Advanced Graphics Port (AGP) to communicate with the display 21. In some embodiments, main processor 11 communicates directly with I/O device 13 via HyperTransport, Rapid I/O, or InfiniBand. In further embodiments, local busses and direct communication are mixed. For example, the main processor 11 communicates with I/O device 13 using a local interconnect bus while communicating with I/O device 13 directly. Similar configurations may be used for any other components described herein.

Computing environment 50 of a computing device may further include alternative memory, such as a floppy disk drive for receiving floppy disks such as 3.5-inch, 5.25-inch disks or ZIP disks, a CD-ROM drive, a CD-R/RW drive, a DVD-ROM drive, a BlueRay disc, a tape drive of any format, a USB device, a hard-drive or any other device suitable for storing data or installing software and programs. Computing environment 50 may further include a storage device 125 which may include one or more hard disk drives or redundant arrays of independent disks, for storing an operating system, such as OS 17, software 18 and/or providing data space 19 for storing additional data or information. In some embodiments, an alternative memory 16 may be used as the storage device 125. Additionally, OS 17 and/or the software 18 may be run from a bootable medium, for example, a bootable CD, such as KNOPPIX®, a bootable CD for GNU/Linux that is available as a GNU/Linux distribution from knoppix.net.

Computing environment 50 may include a network interface 25 to interface to a Local Area Network (LAN), Wide. Area Network (WAN) or the Internet through a variety of connections including, but not limited to, standard telephone lines, wired or wireless connections, LAN or WAN links (e.g., 802.11, T1, T3, 56 kb. X.25), broadband connections (e.g., ISDN, Frame Relay, ATM), or some combination of any or all of the above. The network interface 25 may comprise a built-in network adapter, network interface card, PCMCIA network card, card bus network adapter, wireless network adapter, USB network adapter, modem or any other device suitable for interfacing the computing device to any type of network capable of communication and performing the operations described herein.

Still referring to FIG. 1, I/O devices 13 may be present in various shapes and forms in the computing environment 50. Input devices may include joysticks, keyboards, mice, trackpads, trackballs, microphones, drawing tablets, gloves, video game components for inputting video game data or a video camera. Output devices may include video displays, speakers, transceivers for sending and receiving data. I/O devices 13 may be controlled by an I/O control 22. The I/O control 22 may control one or more I/O devices such as a keyboard 23 and a pointing device 24, e.g., a joystick, a mouse or an optical pen. I/O control 22 may also comprise an interface between an external detector, such as a video camera or a microphone and the computing device. I/O control 22 may enable any type and form of a detecting device, such as a video camera to be interfaced with other components of the computing environment 50. Furthermore, an I/O device 13 may also provide storage 125 and/or an alternative memory 16 for the computing device. In still other embodiments, the computing device may provide USB connections to receive handheld USB storage devices such as the USB Flash Drive line of devices manufactured by Twintech Industry, Inc. of Los Alamitos, Calif.

In some embodiments, the computing environment may comprise or be connected to multiple display devices 21. Display devices 21 may each be of the same or different type and/or form. I/O devices 13 and/or the I/O control 22 may comprise any type and/or form of suitable hardware, software, or combination of hardware and software to support, enable or provide for the connection and use of multiple display devices 21 or multiple detection devices, such as detector 105 described below.

In one example, computing device includes any type and/or form of video adapter, video card, driver, and/or library to interface, communicate, connect or otherwise use the display devices 21 or any I/O devices 13 such as video camera devices. In one embodiment, a video adapter may comprise multiple connectors to interface to multiple display devices 21. In other embodiments, the computing device may include multiple video adapters, with each video adapter connected to one or more of the display devices 21. In some embodiments, any portion of the operating system of the computing device may be configured for using multiple displays 21. In other embodiments, one or more of the display devices 21 may be provided by one or more other computing devices, such as computing devices connected to a remote computing device via a network.

In further embodiments, an I/O device 13 may be a bridge between the system bus 51 and an external communication bus, such as a USB bus, an Apple Desktop Bus, an RS-232 serial connection, a SCSI bus, a FireWire bus, a Fire Wire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

Computing environment may operate under the control of operating systems, such as OS 17, which may control scheduling, of tasks and access to system resources. The computing device may be running any operating system such as any of the versions of the Microsoft® Windows operating systems, the different releases of the Unix and Linux operating systems, an version of the Mac OS® for Macintosh computers, any embedded operating system, any real-time operating system, any open source operating system, any video gaming operating system, any proprietary operating system, any operating systems for mobile computing devices, or any other operating system capable of running on the computing, device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, Windows 7, all of which are manufactured by Microsoft Corporation of Redmond, Wash.; MacOS: manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device having the computing environment 50 may have any different combination of processors, operating systems, and input devices consistent with the device's purpose and structure. For example, in one embodiment the computing device includes a Treo 180, 270, 1060, 600 or 650 smart phone manufactured by Palm, Inc. In this embodiment, the Treo smart phone may be operated under the control of the PalmOS operating system and includes a stylus input device as well as a five-way navigator device. In another example, the computing device includes a Wii video game console released by Nintendo Co. operating an es operating system. In this embodiment, the I/O devices may include a video camera or an infrared camera for recording or tracking movements of a player or a participant of a Wii video game. Other I/O devices 13 may include a joystick, a keyboard or an RF wireless remote control device.

Similarly, the computing environment 50 may be tailored to any workstation, desktop computer, laptop or notebook computer, server, handheld computer, mobile telephone, gaming device, any other computer or computing product, or other type and form of computing or telecommunications device that is capable of communication and that has sufficient processor power and memory capacity to perform the operations described herein.

Figure 2:
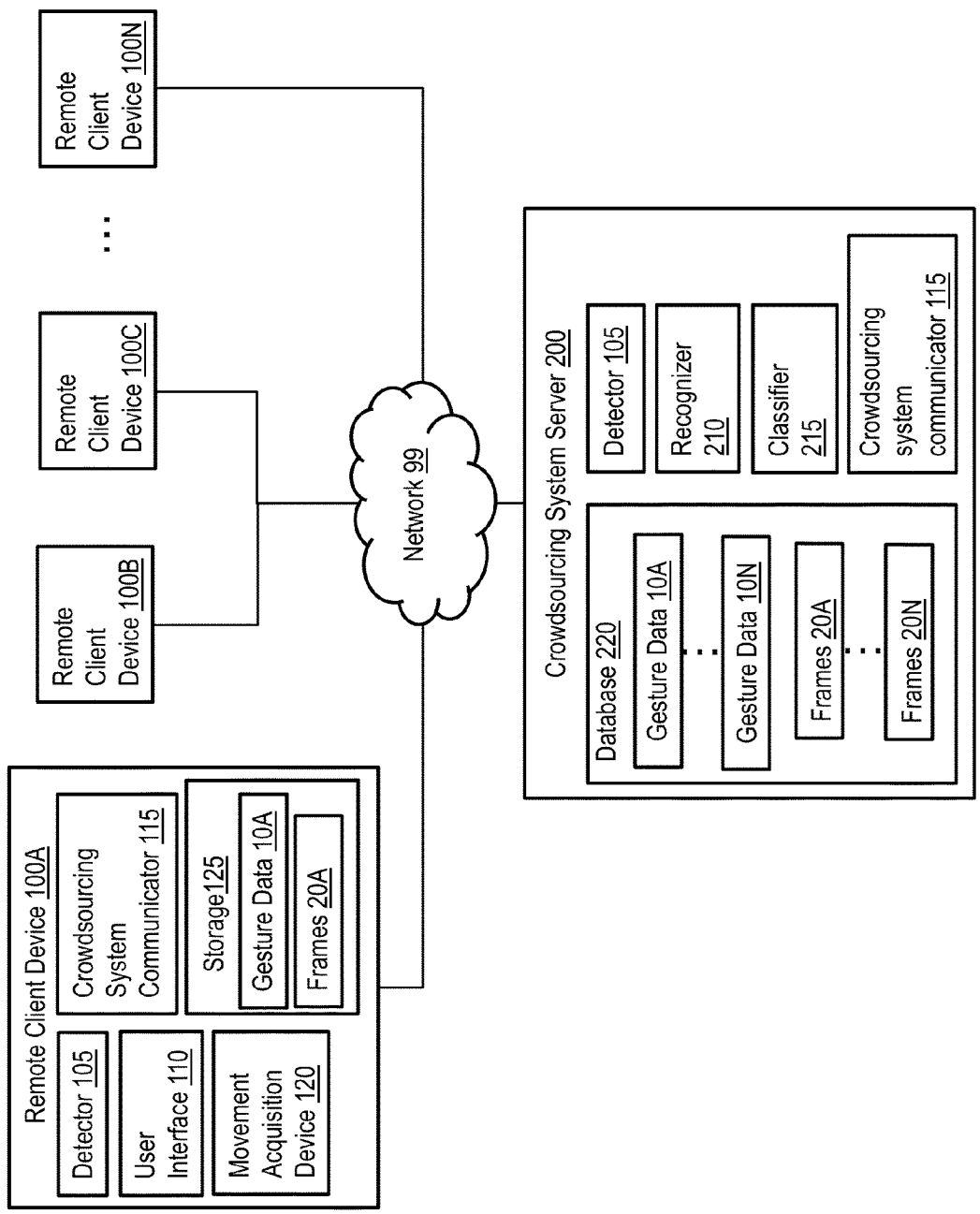
FIG. 2 illustrates a block diagram of an embodiment of a system for detecting movements of a subject using multi-dimensional gesture data.

Referring now to FIG. 2, an embodiment of a system for identifying a movement of a subject based on crowd sourcing data is displayed. FIG. 2A illustrates a remote client device 100A comprising a detector 105, a user interface 110, a crowdsourcing system communicator 115, a movement acquisition device 120 and a storage 125 which further comprises gesture data 10A and/or frames 20A. FIG. 2A also illustrates additional remote client devices 100B and devices 100C through 100N that communicate with a crowdsourcing system server 200 via network 99. Crowdsourcing system server 200 comprises a database 220 that includes gesture data 10A-N and frames 10A-N which are received from remote client devices 100A-N via the network 99. Crowdsourcing system server 200 further comprises a detector 105, a recognizer 210, a classifier 215 and a crowdsourcing system communicator 115.

In a brief overview, crowdsourcing system server 200 receives from a plurality of remote client devices 100A-N gesture data 10 and/or frames 20 which the remote client devices 100A-N collected via their own detectors 105, such as the video cameras. The gesture data 10 organized into frames 20 may include information identifying movements of body parts of persons performing specific actions or body motions. Gesture data 10 organized into frames 20 may include specific positions of certain body parts of a person (e.g. a joint on a person's body, such as a shoulder, an elbow, wrist or a knee, or other body parts, such as the chest, finger tips, palm of a hand, head, nose, lips eye pupils, waist center point, such as the waist point directly below the belly button etc) with respect to a particular reference point (e.g. a waist of the person depicted, or in some instances more accurately the waist location directly underneath the belly button of the person). Frames 20 may include collections of gesture data 10 points describing a location of a plurality of particular body parts with respect to the reference point. Classifier 215 on the server 200 may use gesture data 10 of the one or more frames 20 to process and "learn" to detect the particular body movement. Classifier 215 may assign each particular frame to a particular body movement for future detection and recognition. As the frames 20 may include a series of gesture data 10 identifying positions of each of the body parts of a person at a particular time point, the collection of frames may thus include and describe the entire movement of the subject. Each of the gesture data 10 points may be used by the system will learn to classify and identify the body movement. Upon processing by a classifier 215, once the same or similar movement is detected by a detector 105 in the future, a recognizer 210 may identify the given movement of the person using the classified frames 20 associated with this particular movement. As the database 220 of the crowdsourcing system server 200 is populated with frames 20 that include gesture data 10 gathered from various remote client devices 100A-N, the classifier 215 may classify and distinguish between an increasing number of body movements. As the result, with each additional data the classifier 215 processes and classifies, the system's capacity to recognize additional movements grows. Using crowdsourcing data from a large number of remote clients 100 may therefore quickly provide the system with the necessary gesture data 10 and frames 20 to quickly and efficiently populate the database 220 with valid data to be used for detection and prediction of body movements of various subjects in the future.

In a greater detail and still referring to FIG. 2, network 99 may comprise any type and form of medium through which communication between the devices 100 and system server 200 may occur. The network 99 may a local-area network (LAN), such as a company Intranet, a metropolitan area network (MAN), or a wide area network (WAN), such as the Internet or the World Wide Web. In one embodiment, network 99 is a private network. In another embodiment. Network 99 is a public network. Network 99 may refer to a single network or a plurality of networks. For example, network 99 may include a LAN, a WAN and another LAN network. Network 99 may include any number of networks, virtual private networks or public networks in any configuration. Network 99 include a private network and a public network interfacing each other. In another embodiment, network 99 may include a plurality of public and private networks through which information traverses en route between devices 100 and server 200. In some embodiments, devices 100 may be located inside a LAN in a secured home network or an internal corporate enterprise network and communicating via a WAN connection over the network 99 to the server 200 located at a corporate data center.

Network 99 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 99 may comprise a wireless link, such as an infrared channel or satellite band. The topology of the network 99 may be a bus, star, or ring network topology. The network 99 and network topology may be of any such network or network topology as known to those ordinarily skilled in the art capable of supporting the operations described herein.

A remote client device 100, such as device 100A, 100B, 100C through 100N, includes any type and form of a computing device comprising the functionality of a computing environment 50. Remote client device 100 may comprise hardware, software or a combination of hardware and software for gathering data, processing data, storing data and transmitting and receiving data to and from the crowdsourcing system server 200. Remote client device 100 may comprise applications, functions or algorithms for gathering, structuring and/or processing data from a detector 105. Remote client device 100 may include a video game system, such as a Nintendo Wii, a Sony Playstation or a Microsoft Xbox. Remote client device 100 may comprise a laptop computer or a desktop computer. Remote client device 100 may comprise a smartphone or any other type and form of a mobile device or any other type and form of a device capable of implementing the functionality described herein and/or communicating via a network.

Remote client device 100 may include a detector 105, a user interface 110, a movement acquisition device 120, a crowdsourcing system communicator 115, a recognizer 210 and/or any other components or device described herein. Remote client device 100 and any component of the device 100 may comprise a computing environment 50 or any functionality of the computing environment 50 to implement the functionality described herein.

Detector 105 may comprise any hardware, software or a combination of hardware and software fir detecting or recording information or data identifying, describing or depicting a movement of a person. Detector 105 may comprise any type and form of a device or a function for detecting visual data that may identify or describe a person, a position of a person or a movement of a person. Detector 105 may comprise a video camera or a camcorder. Detector 105 may be a streaming camera outputting a digital video stream to the remote client device 100A. Detector 105 may be an integral part of the device 100 or an independent device external to the device 100 and interfaced with the device 100 via a chord, a cable or a network 99. Detector 105 may also be internal to or external from the server 200. Detector 105 may comprise an infrared camera. Detector 105 may include a high definition or a high resolution digital camera or camcorder. Detector 105 may include a motion detector or an array of motion detectors. Detector 105 may include a microphone. Detector 105 may include any one or more of or any combination of an acoustic sensor, an optical sensor, an infrared sensor, a video image sensor and/or processor, a magnetic sensor, a magnetometer, or any other type and form of detector or system which may be used to detect, record or identify a movement of a person.

Detectors 105 may include any functionality for recording movements of specific body parts with respect to a reference point, such as for example a waist of the subject being recorded. In some embodiments, a detector 105 includes the functionality for recording a distance or a position of a fingertip of a hand of a person with respect to a reference point. In some embodiments, detector 105 includes the functionality for recording a distance or a position of a shoulder of a person with respect to a reference point. In further embodiments, detector 105 includes the functionality for recording a distance or a position of a hip of a person with respect to a reference point. In certain embodiments, detector 105 includes the functionality for recording a distance or a position of an elbow of a person with respect to a reference point. In some embodiments, detector 105 includes the functionality for recording, a distance or a position of a palm of a hand of a person with respect to a reference point. In further embodiments, detector 105 includes the functionality for recording, a distance or a position of a knee of a person with respect to a reference point. In some embodiments, detector 105 includes the functionality for recording a distance or a position of a heel of a person with respect to a reference point. In certain embodiments, detector 105 includes the functionality for recording a distance or a position of a toe of a person with respect to a reference point. In some embodiments, detector 105 includes the functionality for recording a distance or a position of a head of a person with respect to a reference point. In some embodiments, detector 105 includes the functionality for recording a distance or a position of a neck of a person with respect to a reference point. In further embodiments, detector 105 includes the functionality for recording a distance or a position of a pelvis of a person with respect to a reference point. In certain embodiments, detector 105 includes the functionality for recording a distance or a position of a belly of a person with respect to a reference point.

The reference point may be any given portion or location of a subject being recorded. In some embodiments, the reference point with respect to which all the other body parts are identified or measured includes a frontal midsection of the person's waist. In some embodiments, the reference point is a backside midsection of the person's waist. The reference point may be the center point of the person's waist depending on the orientation of the person with respect to the detector 105. In other embodiments, the reference point may be a person's head or a person's chest or a person's belly button. The reference point may be any portion of the human body referred to herein. Depending on the design, the reference point may be chosen to be any pan or portion of a human body picked such that this location minimizes the errors in detection of the distance or relation of the position of some body pans to the reference point.

User interface 110 may comprise any type and form of interface between the user of the remote client device 110 and the device 100 itself. In some embodiments, user interface 110 includes a mouse and/or a keyboard. User interface may comprise a display monitor or a touchscreen for displaying information to the user and for enabling the user interaction with the device. In further embodiments, user interface 110 includes a joystick. In certain embodiments, user interface 110 includes a game tailored video game tool that allows the user to control data inputs to the video game or participate in the video game. User interface 110 may include functionality for the user to control the functionality of the remote client device 100. User interface 110 may comprise the functionality for controlling the gesture data 10 or data frame 20 acquisition and/or storage. User interface 110 may include the controls for the user to initiate the process of recording movements of the users via the detector 105.

Movement acquisition device 120 may comprise any hardware, software or a combination of hardware and software for acquiring movement data. Movement acquisition device 120 may comprise the functionality, drivers and/or algorithms for interfacing with a detector 105 and for processing the output data gathered from the detector 105. Movement acquisition device 120 may include the functionality and structure for receiving data from any type and form of detectors 105. For example, a movement acquisition device 120 may include the functionality for receiving and processing the video stream from a detector 105. Movement acquisition device 120 may include the functionality for processing the output data to identify any gesture data 10 within the output data. Movement acquisition device 120 may be interfaced with a detector 105, may be integrated into the detector 105 or may be interfaced with or comprised by any of the remote client device 100 or the crowdsourcing system server 200. Movement acquisition device 120 may be integrated with or comprised by any of the classifier 215 or recognizer 210.

Movement acquisition device 120 may comprise any functionality for extrapolating the gesture data 10 from the video data stream output and for forming frames 20. Movement acquisition device 120 may use gesture data 10 extrapolated from a particular image of a digital camera or a digital video camera and form or create a frame 20 comprising a collection of gesture data 10. In some embodiments, movement acquisition device 120 receives a video of a movement of a person and from the received data extracts the gesture data 10. Further, movement acquisition device 120 extracts from the received data one or more frames 20 depicting or identifying the particular body movement. Movement acquisition device 120 may comprise the functionality for storing the gesture data 10 and/or frames 20 into the storage 125 or into the database 220. As the movement acquisition device 120 may exist on the remote client device 100 or the server 200, the gesture data 10 and/or frames 20 extrapolated or created by the movement acquisition device 120 may be transmitted over the network 99 to and from the clients 100 and the server 200.

Crowdsourcing system communicator 115 may comprise any hardware, software or a combination of hardware and software for enabling and/or implementing the communication between the remote client device 110 and the crowdsourcing, system server 200. Crowdsourcing system communicator 115 may include a network interface 25 and/or any functionality of a network interface 25. Crowdsourcing system communicator 115 may comprise functionality to establish connections and/or sessions for communication between the devices 110 and server 200. Crowdsourcing system communicator 115 may include the functionality to utilize a security protocol for transmitting protected information. Crowdsourcing system communicators 115 may establish network connections between devices 100 and the server 200 and exchange the gesture data 10 and/or frames 20 over the established connections. Crowdsourcing system communicator 115 may include the functionality for transmitting detector 105 data, such as the video stream data or detector output data across the network 99. Crowdsourcing system communicator 115 may include an functionality to enable the functions and processes described herein to perform the functions described.

In addition to the aforementioned features, storage 125 may include any hardware, software or a combination of hardware and software for storing, writing, reading and/or modifying gesture data 10 and/or frames 20. Storage 125 may comprise any functionality for sorting and/or processing gesture data 10 and frames 20. Storage 125 may comprise the functionality for interacting with a movement acquisition device 120, a recognizer 210 and/or a classifier 215 to allow each of these components to process the data stored in the storage 125.

Gesture data 10 may be any type and form of data or information identifying or describing one or more features of a movement of person. One or more features of a movement of a person may include a position or a location of a human body or a portion of a human body. The features of the movement, such as the position or location of a particular body part may be expressed in terms of coordinates. The features of the movement may also be expressed with respect to particular specific reference point. For example, gesture data 10 may describe or identify a position or a location of a particular body part of a subject with respect to a reference point, wherein the reference point may be a specific body part of the same subject. In some embodiments, gesture data 10 comprises data or information identifying or describing a movement of a human body or a portion of a human body. Gesture data 10 may comprise information about a location of a particular point of a human body with respect to a reference point. In some embodiments, gesture data 10 identifies a distance between a particular point of the human body and a reference point, the reference point being a point on the body of the subject recorded. Gesture data 10 may comprise any one of or any combination of: scalar numbers, vectors, functions describing positions in X, Y and/or Z coordinates or polar coordinates. Detector 105 may record or detect frames identifying self-referenced gesture data in any number of dimensions. In some embodiments, gesture data is represented in a frame in a two dimensional format. In some embodiments, gesture data is represented in a three dimensional format. In some instances, gesture data includes vectors in x and y coordinate system. In other embodiments, gesture data includes vectors in x, y and z coordinate system. Gesture data may be represented in polar coordinates or spherical coordinates or any other type and form of mathematical representation. Gesture data may be represented as a distance between a reference point and each particular feature represented in the frame in terms of sets of vectors or distances represented in terms of any combination of x, y and/or z coordinates. Gesture data 10 may be normalized such that each gesture data 10 point is ranged between 0 and 1.

Gesture data 10 may include a function that describes a location or a position of a particular point of the human body with respect to a waist of the same human body. For example, gesture data 10 may include information identifying a location or a distance between a fingertip of a hand of a person and a reference point, in some embodiments, gesture data 10 includes information identifying a location or a distance between a hip of a person and a reference point. In certain embodiments, gesture data 10 includes information identifying a location or a distance between an elbow of a person and a reference point. In some embodiments, gesture data 10 includes information identifying a location or a distance between a palm of a person and a reference point. In further embodiments, gesture data 10 includes information identifying a location or a distance between a finger of a person and a reference point. In some embodiments, gesture data 10 includes information identifying a location or a distance between a knee of a person and a reference point. In some embodiments, gesture data 10 includes information identifying a location or a distance between a heel of a person and a reference point, in certain embodiments, gesture data 10 includes information identifying a location or a distance between a toe of a person and a reference point. In some embodiments, gesture data 10 includes information identifying a location or a distance between a head of a person and a reference point. In further embodiments, gesture data 10 includes information identifying a location or a distance between a neck of a person and a reference point, in some embodiments, gesture data 10 includes information identifying a location or a distance between a pelvis of a person and a reference point. In certain embodiments, gesture data 10 includes information identifying a location or a distance between a belly of a person and a reference point.

A frame 20 may comprise any collection or compilation of one or more gesture data 10 points from a single image, single digital video frame or from data detected or collected by the detector 105 in a single instance. Frame 20 may comprise a file containing numbers and values that identify the gesture data 10 values. A frame 20 may include a compilation of information identifying one or more locations of body parts of the subject with respect to a reference point. A frame 20 may include a location or a distance between a head of a person and a reference point and the information identifying a location or a distance between a heel of the person and the same reference point. Frame 20 may include any number of entries and any combination of entries of any one of or combination of parts of human body measured, identified or detected with respect to the reference point. In some embodiments, a single frame 20 includes data about each of: a shoulder, a left hip, a right hip, a left elbow, a right elbow, a left palm, a right palm, fingers on the left hand, fingers on the right hand, a left knee, a right knee, a left heel, a right heel, a left toe, a right toe, the head, the neck, the pelvis and the belly. Any combination of or compilation of these data points may be described in terms of their distance or reference from the same reference point. In some embodiments, the reference point is the waist of the person. In further embodiments, the reference point is the center frontal waist point. In other embodiments, the reference point is the rear frontal waist point. However, the reference point may also be any other part of the human body, depending on the system design. The frame 20 may therefore include any number of separate gesture data 10 points. In some embodiments, only a left heel, the head and the right knee may be used for a frame 20 to describe a particular movement of a person, whereas in a separate embodiment a right shoulder, a left hip, the right heel and the left toe may be sufficient to accurately describe another movement of the human body. Depending on the decisions made by the classifier 215, frames 20 for identifying, different movements may include different gesture data 10 points. Similarly, for some movements only a single frame 20 may be sufficient, while for other movements two or more frames 20 may be used to classify or identify the movement.

Classifier 215 may comprise any algorithms, programs, logic circuits or functions for learning or differentiating some movements of the human body from other movements of the human body based on the gesture data 10 and/or frames 20. Classifier 215 may comprise the functionality for receiving output data from a detector 105 and extrapolate relevant information for identifying a movement. For example, classifier 215 may comprise the means to extrapolate gesture data 10 and/or frames 20 in a manner in which they can be used to be analyzed and compared with other gesture data 10 and frames 20. Classifier 215 may include hardware, software or a combination of hardware and software for analyzing and classifying gesture data 10 and/or frames 20. Classifier may include movement acquisition device 120 or any embodiment of the movement acquisition device 120. Classifier 215 may comprise the functionality to analyze, study and interpret information in the gesture data 10 and differentiate between the information in a gesture data 10 point involving a first body movement from the information in the gesture data 10 point involving a second body movement. Classifier 215 may comprise the logic and/or functionality to identify differences between the gesture data 10 involving, separate body movements. Classifier 215 may comprise the logic and/or functionality for differentiating or distinguishing between two separate body movements based on the differences in gesture data 10 in one frame 20 from the gesture data 10 in another frame 20.

Classifier 215 may develop, create and store instruction files or algorithms that can be used to distinguish a first body movement from a second body movement. The distinguishing may be accomplished later by a recognizer 210 based on the differences between gesture data 10 in one frame 20 corresponding to the first movement from the gesture data 10 in another frame 20 corresponding to the second movement. Classifier 215 may search through the frames 20 and/or gesture data 10 corresponding; to a first movement and compare the frames 20 and/or gesture data 10 of the first movement with the frames 20 and/or gesture data of a second movement distinct from the first movement. Classifier 215 may identify specific gesture data 10 with each of the frames 20 which are most relevant in differentiating between the first movement and the second movement Classifier 215 may select the most relevant frames 20 of a particular movement for differentiating most accurately this particular movement from all the other frames 20 associated with other movements. The one or more frames 20 identifying a movement that classifier 215 identifies as the most suitable one or more frames 20 for identifying the given movement may be provided to the recognizer in association with the movement so that the recognizer 210 may use these one or more frames 20 for identifying the same movement in the future.

Recognizer 210 may comprise any hardware, software or a combination of hardware and software for identifying or differentiating a body movement of a person. Recognizer 210 may include algorithms, programs, logic circuits or functions for using the gesture data 10 and/or frames 20 classified or processed by the classifier 215 to identify a particular movement of the person. In some embodiments, recognizer 210 utilizes a file, a function or a logical unit created or developed by the classifier 215 to identify a particular movement from other movements. Recognizer 210 may include any functionality for receiving and reading incoming video stream data or any other type and form of output from a detector 105. Recognizer 210 may further include any functionality for analyzing and/or interpreting the incoming data from the detector 105 and identifying and extrapolating the gesture data 10 from the detector 105 output data. Recognizer 210 may further include any functionality for comparing, the gesture data 10 or frame 20 from the data received from the detector 105 and identifying a movement of a person based on the comparison of the freshly received gesture data 10 from the detector and the gesture data 10 and/or frames 20 classified by the classifier 215 previously.

Recognizer 210 may include the functionality for interacting with detector 105 in a manner to receive the data from the detector 105, extrapolate any gesture data 10 and process the gesture data into frames 20, and compare the extrapolated gesture data 10 and/or frames 20 to gesture data and/or frames 20 stored in database 220. Frames 20 stored in the database 220 may include the gesture data 10 that was processed and analyzed by the classifier 215 previously. Frames 20 classified by the classifier 215 may be used by the recognizer 210 to recognize that the frame 20 extrapolated from the data from the detector 105 matches a stored frame 20 associated with a particular movement of a person.

Database 220 may comprise any type and form of database for sorting, organizing and storing gesture data 10 and/or frames 20. Database 220 may include a storage 125 and any functionality of a storage 125. Database 220 may further include any functions or algorithms for organizing or sorting the gesture data 10 into frames 20. Database 220 may further include the functionality for creating frames 20 from one or more gesture data 10 points for a particular movement. Database 220 may include the functionality for interacting with classifier 215, recognizer 215, detector 105 and crowdsourcing system communicator 115. Database 220 may include the functionality to share the data stored in the database 220 with the system server 220 or any remote client device 100, depending on the arrangement and configuration.

Figure 3:
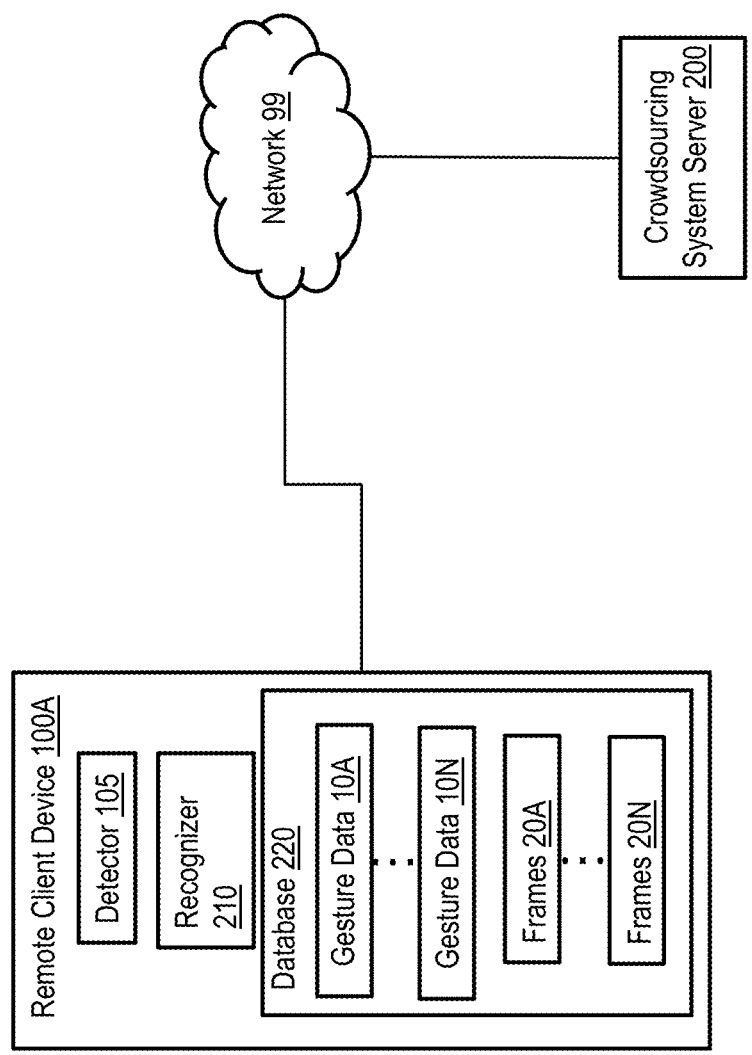
FIG. 3 illustrates a block diagram of another embodiment of a system for detecting movements of a subject using multidimensional gesture data.

Referring now to FIG. 3, another embodiment of a system for identifying a movement of a subject based on crowd sourcing data is displayed. FIG. 3 illustrates a system in which in addition to the components that remote client devices 100 may include in FIG. 2, a remote client device 100 may also include the recognizer 210 and database 220. In this embodiment, the remote client device 100A has the functionality to recognize and/or identify body movements recorded or detected via detector 105. For example, remote client 100 may use a detector 105, such as a digital camera for instance, to record a person moving. Recognizer 210 of the remote client device 100 may alone or in cooperation with movement acquisition device 120, extrapolate one or more frames 20 that include gesture data 10. Recognizer 210 may then compare the extrapolated one or more frames 20 against frames 20 stored in database 220. In embodiments in which remote client device 100 does not include the entire database 220, remote client device may transmit the extrapolated frame 20 over the network 99 to the server 200 to have the recognizer 210 at server 200 identify a match corresponding to a frame of database 220 corresponding to a particular movement. In other embodiments, database 220 of the client device 100 may be synchronized with database 220 of the server 200 to enable the client device 100 to identify movements of the subject recorded or detected via detector 105 independently and without the interaction with the server 200.

Figure 4:
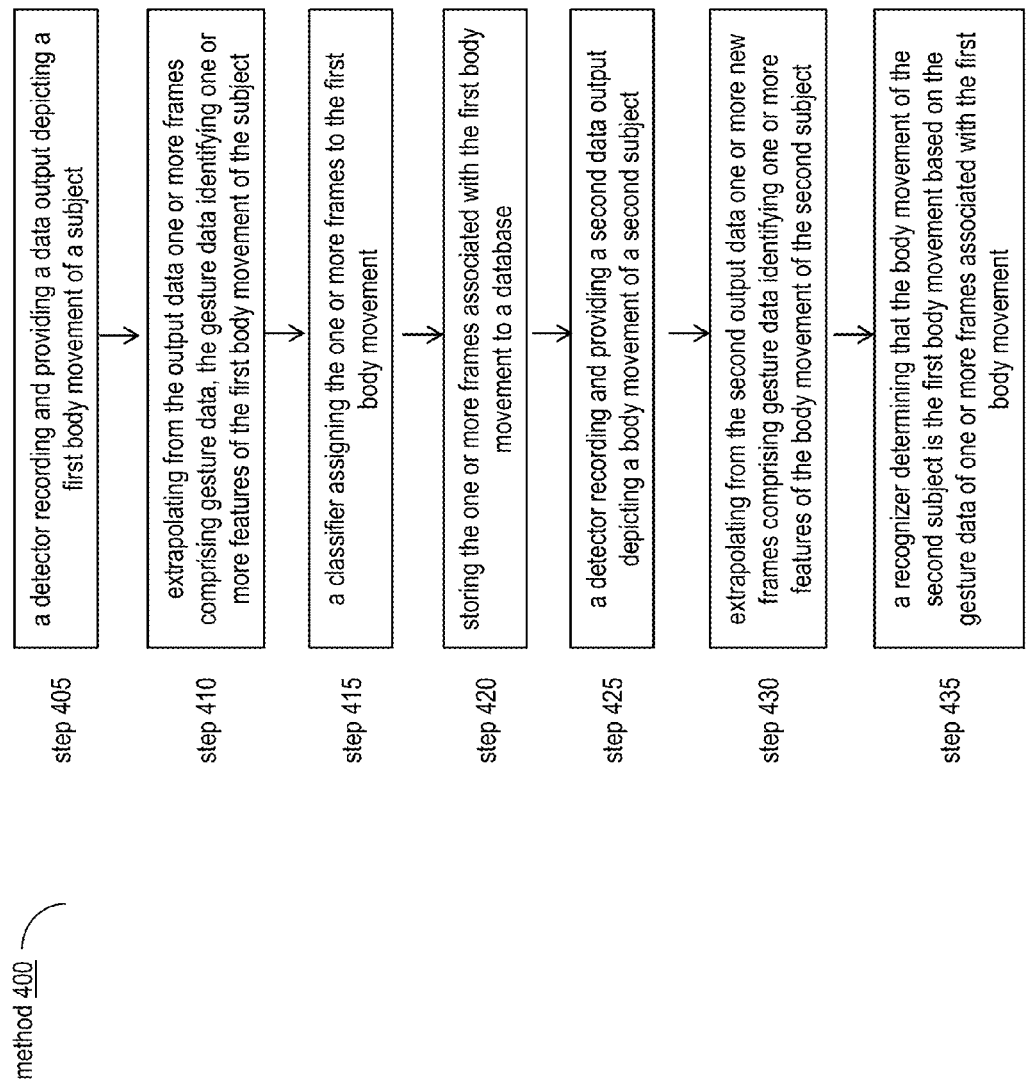
FIG. 4 illustrates a flow diagram outlining steps of a method of detecting movements of a subject using multidimensional gesture data.

Referring now to FIG. 4, an embodiment of a method of steps of identifying a movement of a subject based on data is illustrated. In brief overview, at step 405, a detector 105 records or provides a data output depicting a first body movement of a subject. At step 410, a component of the system extrapolates from the output data one or more frames comprising gesture data, the gesture data identifying One or more features of the first body movement of the subject. At step 415, a classifier of the system assigns the one or more frames to the first body movement. At step 420, one or more frames are stored with the first body movement to a database. At step 425, a detector records a second data output depicting a body movement of a second subject. At step 430, a component of the system extrapolates from the second output data one or more new frames comprising gesture data identifying one or more features of the body movement of the second subject. At step 435, a recognizer of the system determines that the body movement of the second subject is the first body movement based on the gesture data of one or more frames associated with the first body movement.

In further detail, at step 405 a detector 105 records a movement of a subject and provides a data output depicting or describing the first body movement of the subject Detector 105 may be a detector 105 of any of the remote client devices 100 or the detector 105 of the server 200. In certain embodiments, client devices 100 transmit the data output from their detectors 105 to the server 200. A detector may comprise a digital video camera recording movements of a person in a series of digital images or digital frames. Detector may record and provide a digital video stream. In some embodiments, the detector records data that identifies movements of the person using coordinates and values. In further embodiments, the detector records positions of particular body points of the subject with respect to a reference point. The reference point may be a designated point on the subject's body. In some embodiments, the detector provides the raw images, such as for example digital images to the system. In other embodiments, the detector extrapolates the relevant gesture data from the images and provides the extrapolated gesture data from each frame to the system. Depending on the system design and preferences, the detector may provide the frames of digital images or frames of extrapolated gesture data to the system for further processing.

Detector 105 may be a camera, such as a Microsoft Kinect Camera which may record frames of self-referenced gesture data. Detector 105 may be a camera deployed on a football stadium, baseball stadium, soccer stadium, airport or any other crowded venue and may record the crowd passing by. Detector 105 may provide a stream of frames that may include self-referential gesture data of one or more subjects recorded in the frames. Self-referential gesture data may include gesture data identifying locations or positions of various body parts of a subject in reference to a body point of the subject itself.

In some embodiments, the detector records or detects a person throwing a ball. In some embodiments, the detector records or detects a person walking. In some embodiments, the detector records or detects a person running. In some embodiments, the detector records or detects a person attempting to strike someone or something. In some embodiments, the detector records or detects a person pulling, carrying or lifting an object. In some embodiments, the detector records or detects a person walking with an unusually nervous demeanor. In further embodiments, the detector records or detects a person yelling. Detector may record any movement or action a person may do in any given situation and under any set of circumstances.

At step 410, one or more frames comprising gesture data describing the movement of the subject are extrapolated from the output data provided by the detector. Depending on the system design, any one of a detector 105, a movement acquisition device 120 or classifier 215 may perform this task. In some embodiments, Microsoft Kinect Camera, records the subject and comprises the functionality, such as the movement acquisition device 120 functionality within itself, to extrapolate the gesture data from the frames. The gesture data from the extrapolated one or more frames may identify one or more features of the first body movement of the subject. In some embodiments, a feature of the gesture data identifies a position or a location of a left and/or right shoulder of the subject. In further embodiments, the feature identifies a position or a location of a left and/or right hip of the subject in further embodiments, the feature identifies a position or a location of a left and/or right elbow of the subject. In further embodiments, the feature identifies a position or a location of a left and/or right palm of the subject's hand. In further embodiments, the feature identifies a position or a location of the fingers on the left and/of right hand of the subject. In some embodiments, the location may be one of the set of fingers, whereas in other embodiments a location of each of the fingers may be individually identified. In further embodiments, the feature identifies a position or a location of a left and/or right knee of the subject. In further embodiments, the feature identifies a position or a location of a left and/or right heel of the subject. In further embodiments, the feature identifies a position or a location of the toes on left and/or right leg of the subject. In further embodiments, the feature identifies a position or a location of a head of the subject. In further embodiments, the feature identifies a position or a location of a neck of the subject. In further embodiments, the feature identities a position or a location of the pelvis of the subject. In further embodiments, the feature identifies a position or a location of the belly of the subject. In further embodiments, the feature identifies a position or a location of the waist of the subject.

Each of the features of the gesture data 10 identified may be self-referenced, such as to identify the location or the position of the subject identified with respect to a particular reference point within the frame. In some embodiments, the features are identified with respect to the position or location of the waist of the person. In other embodiments, the features are identified with position or location of the left shoulder or the right shoulder of the person. In yet other embodiments, the features are identified with position or location of the left hip or the right hip of the person. In yet other embodiments, the features are identified with position or location of any of the left or right palms of the person. In yet other embodiments, the features are identified with position or location of any of the fingers of the person on either of the hands. In yet other embodiments, the features are identified with position or location of any of the knees of the person on either of the legs. In yet other embodiments, the features are identified with position or location of any of the heels of the person on either of the legs. In yet other embodiments, the features are identified with position or location of any of the toes of the person. In yet other embodiments, the features are identified with position or location of the head of the person. In yet other embodiments, the features are identified with position or location of the neck of the person. In yet other embodiments, the features are identified with position or location of the pelvis of the hips of the person. In yet other embodiments, the features are identified with position or location of the belly of the person. In still further embodiments, the features are identified with the position of the chest of the person.

Still in connection with step 415, extrapolation of the one or more frames may comprise storing, formatting or organizing gesture data 10 into frames 20. In some embodiments, frames 20 are created by compiling gesture data 10 into files. In further embodiments, extrapolation of the one or more frames includes creating frames 20 from each digital image frame, where the frame 20 comprises gesture data 10 collected from the digital image flame. In further embodiments, frame 20 includes a file of gesture data 10, wherein the gesture data 10 entries comprise numbers and values identifying the location of each of the given body parts with respect to a predetermined reference point.

At step 415, a classifier 215 processes the one or more frames and assigns the one or more frames to a particular body movement. The classifier 215 may use any learning functionality and/or algorithm described herein to process the one or more frames, learn the movement, identify the features of the gesture data of the frames corresponding to the movement that identify the movement from any other movements and assign the frames and/or gesture data to the distinguished movement. In some embodiments, the classifier determines that the one or more frames identifies a movement that was never identified before. The classifier may assign the one or more frames with the new movement, thereby adding this new movement to the database. In some embodiments, the classifier determines that the same or a substantially similar movement is already identified and stored in the database 220. If the classifier identifies that the same or similar movement is already represented, the classifier may modify the one or more frames stored with some gesture data from the new frames which may be more suitable and more accurately represent the movement. In some embodiments, classifiers assigns one or more assembled frames comprising gesture data that identifies the particular movement, to the particular movement by associating the one or more frames with the movement in the database.

At step 420, the database 220 stores the one or more frames associated with the particular body movement in association with the particular body movement. In some embodiments, database 220 marks the one or more frames to identify the particular body movement. In some embodiments, database 220 sorts the frames 20 stored in accordance with the movements they identify. In further embodiments, database 220 comprises a set of name-value pairs, wherein the frames are assigned particular values corresponding to the particular movement. In further embodiments, the database stores a single frame in association with the particular movement. In yet further embodiments, the database stores two, three, four, five, six, seven, eight, nine or ten frames in association with the particular movement. In yet further embodiments, the database stores any number of frames in association with the particular movement, such as for example hundreds of frames. In still further embodiments, database 220 may store one or more frames that are modified by the classifier in view of the new gesture data the classifier determines that should be included in the existing stored frames associated with the particular movement.

At step 425, a detector records and provides a second data output depicting a body movement of a second subject. In some embodiments, the detector is a detector of a remote client 100. In other embodiments, the detector is a detector of the server 200. A detector may comprise a digital video camera recording movements of a person in a series of digital images or digital frames. Detector may record and provide a digital video stream. In some embodiments, the detector provides the data output to a recognizer 210. In other embodiments, the detector provides the data output to a movement acquisition device 120. Detector may record or detect any movement such as the movements described at step 405.

At step 430, one or more new frames from the second output data comprising the new gesture data identifying, a movement of a second subject are extrapolated from the second output data. In addition to all the steps performed at step 410, at step 430 any one of a movement acquisition device 120 or a recognizer 210 may perform the extrapolating. As with the embodiments described, at step 410, the new gesture data from the extrapolated one or more new frames may identify one or more features of new body movement of the second subject. The new body movement of the second subject may include any one or more of the embodiments or features of the first movement at step 410. In some embodiments, the new movement is the same as the first movement. In other instances: the new movement is a different movement from the first movement at step 410. As with the features of the gesture data at step 410, the new gesture data may identify the locations or positions of any of the person's shoulders, hips, elbows, fingers, knees, toes, head, neck, pelvis, belly, chest and/or waist. Also as with the gesture data at step 410, the new gesture data of the new one or more frames may be identified with respect to a reference point, such as any of the person's shoulders, hips, elbows, palms, fingers, knees, heels, toes, head, neck, pelvis, belly, chest and/or waist. The new one or more frames may be extrapolated from one or more digital images or digital frames of a digital video camera recording the movement.

At step 435, a recognizer of the system determines that the body movement of the second subject is the particular first body movement previously classified by the classifier 215 at step 415 and stored in the database at step 420. In some embodiments, the recognizer determines that the body movement of the second subject is the same or substantially similar to the first body movement. In further embodiments, the recognizer makes the determination based on determining that the gesture data from one or more new frames of the second movement is the same or substantially similar to the gesture data of the first movement stored in the database. In some embodiments, the recognizer determines that one or more of the features of the new gesture data of the one or more new frames matches the one or more features of the gesture data of the first movement stored in the database to within a particular threshold. In some embodiments, the features of the new gesture data matches the features of the gesture data of the stored first body movement to within the threshold of plus or minus a particular percentage of the values identifying, the feature. For example, the features of the new gesture data may match the features of the gesture data stored in the database to within any error range of between 0 and 99%. For example, the feature of the new gesture data may match the features of the gesture data stored in the database to within 0.1%, 0.2%, 0.5%, 0.8%, 1%, 1.5%, 2%, 2.5%, 4%, 5%, 6%, 7%, 8%, 9%, 10%, 12%, 14%, 16%, 20%, 25%, 30%, 40% or 50%. The threshold may computed by comparing all of the values of the gesture data frame. The threshold may also be computed by on a per data point basis, such as for example the right foot matches within 0.1%, right ankle matches within 3.1%, left knee matches within 2.8%. The threshold may be a single threshold for each joint for all values, or the threshold may vary for each joint data point of each gesture. In some embodiments, the threshold to within which the match is identified is the same for all features of the gesture data. In other embodiments, the threshold to within which the match is identified is different for different features of the gesture data.

Still in connection with step 435, in one example, a match between the new one or more frames of the second subject's movement and the one or more frames stored in the database is identified based on the determining, that between the two sets of frames, the locations of the fingers, heels, knees and elbows matches within 2.5%. In another example, a match between the new one or more frames of the second subject's movement and the one or more frames stored in the database is identified based on determining that between two sets of frames, the locations of the head, hips and heels match within 1% and palms, elbows and knees are matching within 3.8%. In some embodiments, in response to determining that a match between the gesture data of the two one or more frames is found, the recognizer determines that the body movement of the second subject is the first body. The recognizer thereby recognizes the movement of the second subject based on the data stored in the database.

In some aspects, the present disclosure is to a set of particular detailed embodiments that may be combined with any other aforementioned embodiments to create the systems and methods disclosed herein. In one aspect, the disclosure addresses a set of experiments that are grounded around the realistic limitation of global bandwidth, complexity and diverseness of the mannerisms of the human gesture condition. The proposed research may be using components, such as the Microsoft Kinect camera developed by PrimeSense. In some aspects of testing, 20 complex gestures may be trained, programmed to the system and recognized by the system at a mean of 98.58% based on 607220 samples.

Gestures may be viewed as an important aspect of body language and may be used every day in communications between people. For many people, it may be difficult to avoid making some kind of gesture when communicating face to face with another person. Gestures can convey messages easily and seemingly wordlessly. Being able to consistently and rapidly assess and perform gestures may form the basis of many forms of entertainment, including games that can be either cooperative or competitive in nature. Gestures can represent a variety of different things, from abstract ideas and emotions to representations of more concrete things such as intentions, people, places or things. Finding a way to differentiate between these forms of communication accurately using a detection based system has been rather difficult, in the past.

Machines may have the potential to successfully classify a gesture quicker and more efficiently than a human being through a process, such as a machine learning. In the process such as the machine learning, a machine is taught a way to recognize gestures. The potential for machine-based intelligence to categorize and detect different types of gestures may be used to expand the worlds of electronic communication, interactive entertainment, and security systems.

What actually may define a gesture, and what that gesture may mean may be very subjective. Gestures may include any sequence of movements of a human body as well as physical configurations or positions of the human body at a particular time. In some instances, gestures include a particular position of a human body at a particular instant or a specific point in time. Multitude of such particular positions through time may make up a sequence of movements. Specifically, the orientation or position of one or more body parts of a human body at a particular time as well as the movement of certain body parts—or joints—of the human body through time may define a gesture.

From retrieved data about the positioning and movement of the joints during gestures acted out by people, it is possible to use artificially intelligent means to learn from this information to predict consecutive frames of a gesture and interpret what future gestures could possibly represent. The idea that the process of gesture recognition can be performed by machines not only offers the convenience of automation and speed, but also opens up the potential for artificial systems to participate in gesture-based communication and entertainment. Towards this goal, some form of artificial intelligence is required to know about what categories of gestures exist and go about predicting them from contextual (e.g. visual) cues observed from human performers.

Being able to quickly and concisely interpret and perform gestures in many cases can be made into a social and co-operative for competitive) game. In one such game, players engage in a gesture-based game by either attempting to perform gestures or recognizing which gestures are being performed by others; attempting to maximize their accuracy in both tasks. From collected information about the position and orientation of joints during gestures performed by humans, it is possible to employ artificial intelligent systems to learn from this data and make predictions about future, unseen joint information and the type of gesture that it most likely represents. Using such games in which multitude of players act out different body movements, gesture data may be generated and transmitted to the back end crowdsourcing server to be processed by classifiers and to be used for quick and efficient population and refinement of the database of gesture movements.

In the present embodiment, we particularly focus on tests and experiments regarding machine-learning algorithms that involve classification.

The original research problem was to begin the testing of a dynamic gesture recognition system that could understand complex hand gestures. Originally for our goal, many technical hurdles presented themselves: 1) Choose an approach for the segmentation of hand gestures. 2) Come up with a descriptor to pass on the segmented data effectively to an intelligent system for classification. 3) Once classified, a recognition system, whether real-time or beyond real-time, needs to shows signs of measurable recognition by way of an intelligent system.

One of the challenges in this research has been that comparing results with that of other researchers in the field is very difficult due to the unrepeatability of similar test conditions, arising from the diversity in acquisitioning hardware and environmental conditions. Enter Microsoft Kinect Camera that is currently the fastest selling, consumer electronics device and boasts an RGB camera, IR depth camera, and onboard segmentation. This camera may be an embodiment of our detector.

We may build gesture prediction models based on several different classification algorithms. This process may begin first with gathering examples of gestures for the purposes of training each classifier. This data set may be referred to as training data, and may include gesture data in the form of joints as captured and recorded by a specialized stereoscopic camera (the Kinect device). This data may then be aggregated and transformed for optimal classification, before the classifier model is built and finally tested on a subset of the data collected.

Figure 5:
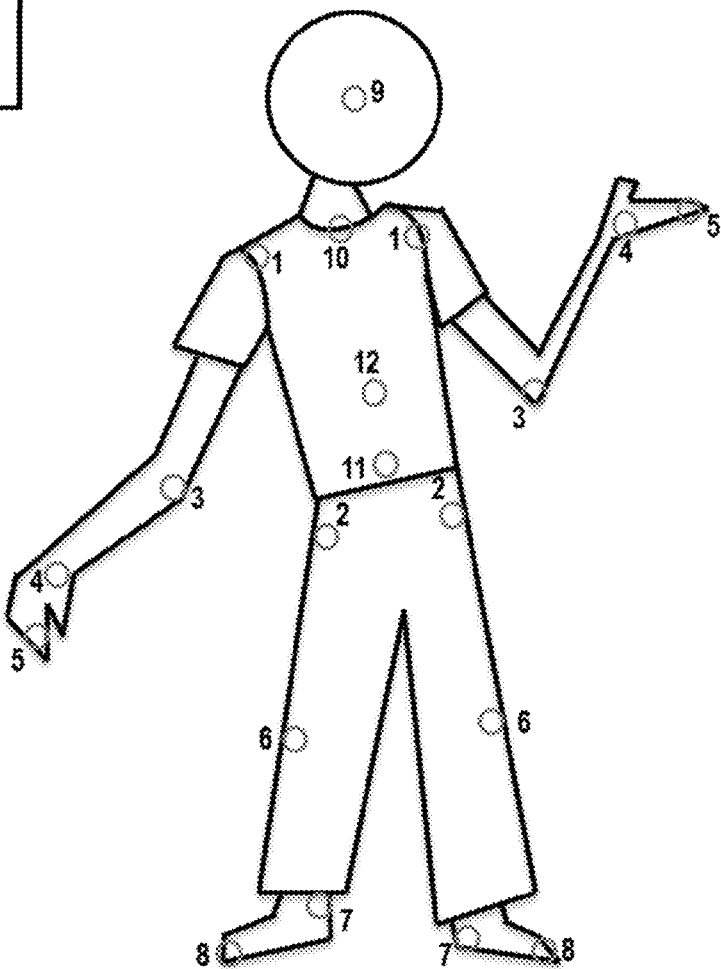
FIG. 5 illustrates an embodiment of a subject along with feature points referring to locations on the subjects body that are identified by the gesture data.

Referring now to FIG. 5, an illustration of a subject or a user with two arms, two legs and a head is illustrated. FIG. 5 comprises circles of body points which are to be tracked or monitored. For the purpose of our experimentation, a Microsoft Kinect SDK Beta1, 1.1 and 1.2 may be used in an XNA 4.0 environment. The original skeleton algorithm may be used as a starting, point. The data presented later may not be conditional on the Kinect hardware; all algorithms described may be applicable to any camera or any other type and form of a detector. The camera may include a segmentation algorithm that approximates a skeleton within a body (human or animal), be it the whole body, or something more detailed, like the hands of the human body, a tail of a dog, and similar body parts of a person or an animal. In some embodiments, such capability may be removed from the camera and be included in other components of the system described earlier.

In one embodiment, presented is a hierarchical 3D shape skeleton modeling technique which is very promising for learning skeletons of many 3D objects, including people, hands, horses, octopoda and planes. Being piecewise geodesic, the segment borders are smooth and non-twisting." A similar outcome may be achieved in a different embodiment in which the method is based on a curved skeleton representing the object's interior, which produces both a surface segmentation and a corresponding volumetric segmentation. FIG. 5 illustrates an approximation of the body shape of a single user. The Kinect camera may be designed to segment a user like this without the need for any type of calibration gesture.

The approach used in another embodiment may use the process as pose recognition, which may utilize only a single frame depth image. The technique of such an embodiment may be as follows: First, a deep randomized decision forest classifier is trained to avoid over-fitting by using hundreds of thousands of training images. Second, discriminative depth comparison image features yield the 3D translation invariance. Third, spatial modes of the inferred per-pixel distributions are computed using mean shift. The outcome is the 3D joint points. The mean shift is for feature space analysis, based on a multivariate kernel density estimator.

The stock Kinect camera may natively sample at 30 fps but can be modified to operate at 60 fps or any other rate. In one embodiment, the full segmentation can operate at 200 fps. In a further embodiment, a technique may be used to recognize gesture data at up to 600 fps. In further embodiments, an approach may be used which prioritizes accuracy of complex gestures, speed of recognition, and compression requirements. The supplemental data may begin with the assignment of 15 varied base characters, though this technique may add associations. In a further embodiment, our starting point may be first to sample in an invariant approach by beginning with a simple constant, the waist. All joints of the subject may be calculated as special references from this point. The position of each joint may be normalized to minimize variance in a user's size and/or reduce error.

In some embodiments when attempting to recognize complex gestures, descriptors, including motion descriptors, and shape descriptors like Extended Gaussian Images, Shape Histograms, D2 Shape Distributions, and Harmonics may be used. In one embodiment, a harmonic shape descriptor starting from the center mass may be used. In other embodiments, an elevation descriptor by taking the difference between the altitude sums of two successive concentric circles of a 3D shape may be used.

Figure 6A:
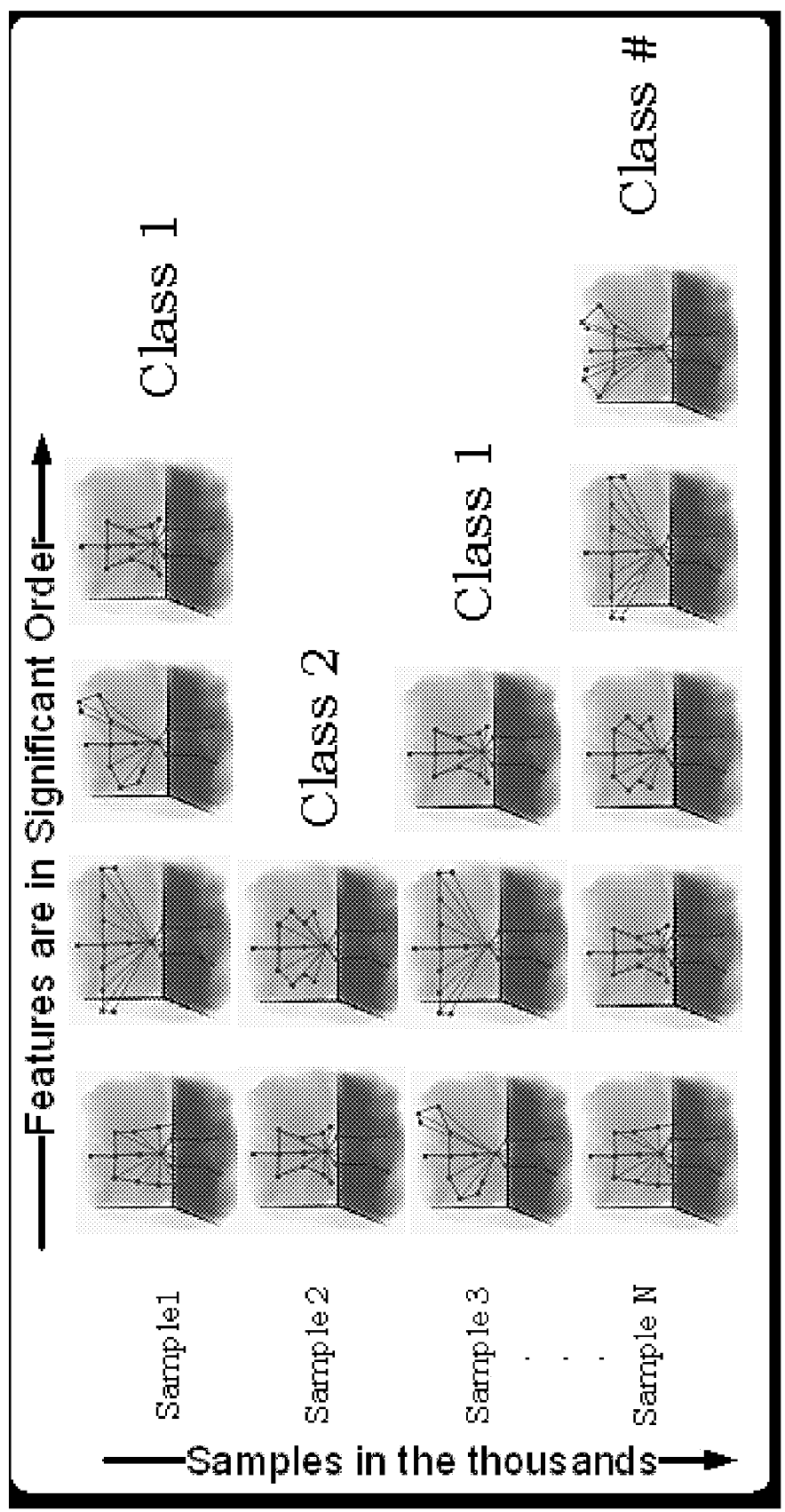
FIGS. 6A, 6B and 6C illustrate examples of classes and illustrations of various data points included in a frame.
Figure 6B:
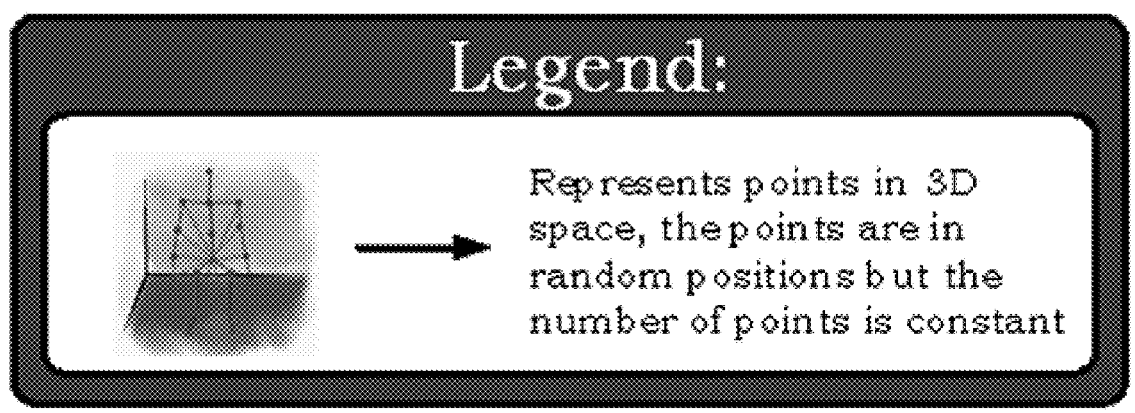
Figure 6C:

Referring now to FIGS. 6A, 6B and 6C, an embodiment of a system and system data is illustrated. In brief overview, FIG. 6A illustrates locations of body components with respect to a reference point for various different classes of movements. This is the point at which the space for the gesture data may be defined. In some embodiments, an assumption may be made that joint values are a constant in the learning process. Joint values can be any number of joints that is predefined before being handed to the learning/classification portion. There may be any number of gesture samples and any number of gesture classes. Gesture samples may vary in length even within the same class. FIG. 6B illustrates a representation in 3D space corresponding to the embodiments illustrated in FIG. 6A. FIG. 6C illustrates data points of gesture data for various points of the human body in 3D.

A free public database that includes enough diversity between full body gestures or hand gestures that include pre-segmented data may not initially be available and may need to be built and populated with gesture data. Creation of a custom full body gesture database may be needed to carry on the research. A virtual version of the game Charades may be used to collect gesture data. Data may be collected via network 99 from hundreds or thousands of players operating devices 100 and playing this game worldwide. For the purposes of an experiment, a set of twenty gestures are selected mostly randomly out of a classic commercial version of Charades. The game may be formatted in a way that the length of a gesture is trimmed by way of supervised learning, meaning another user may be used to play the game. When the second user accurately guesses the gesture by vocally naming it (voice recognition was used), this signifies the end point of the gesture. Table 1, shown below alphabetically lists the 20 gestures used in the database for the purposes of testing the system. In some embodiments, it may the gestures may be open to interpretation. Of the 20 separate gestures (i.e. classes), for the purposes of the experiment, at least 50 full samples of each gesture may be sampled.

TABLE 1

Gesture data collected for training, testing, real-time recognition and prediction

| Air Guitar | Crying | Laughing |
| Archery | Driving | Monkey |
| Baseball | Elephant | Skip Rope |
| Boxing | GESTURES | Sleeping |
| Celebration | Fishing | Swimming |
| Chicken | Football | Titanic |
| Clapping | Heart Attack | Zombie |

The Kinect detector may sample user "gesture" information from the IR depth camera. The data coming from the camera may be oriented relative to its distance from the Kinect. This orientation may become problematic when searching for the solution to universal truths in gestures. A normalization technique may be developed and used that converts all depth and position data into vectors relative to a single joint presumed most neutral. The waistline of a subject, such as the subject in FIG. 5, may be selected as the reference point.

Figure 7:
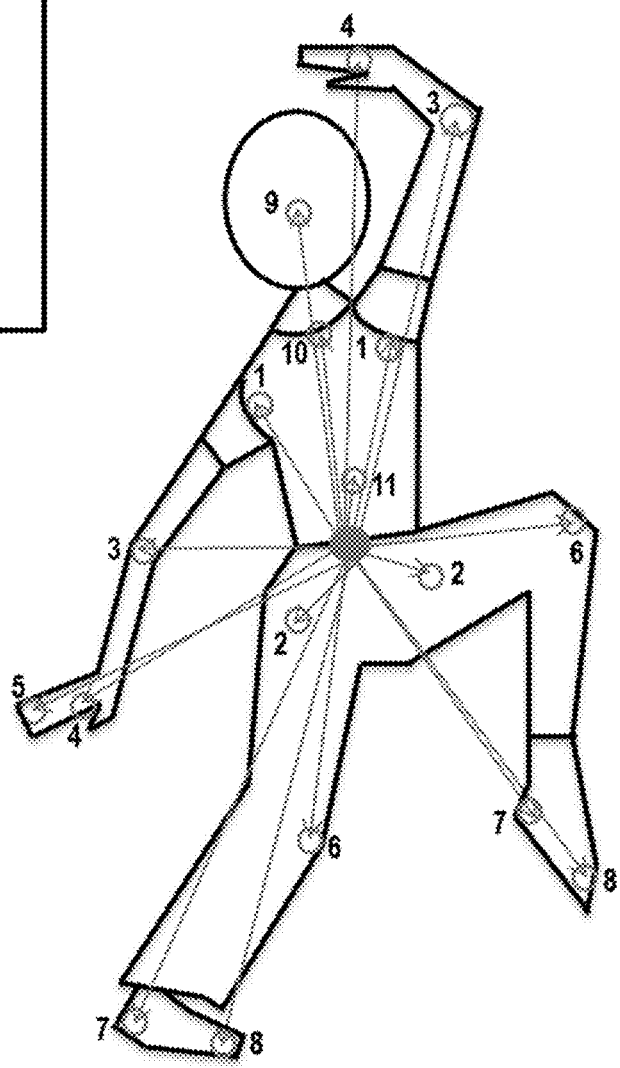
FIG. 7 illustrates an embodiment of a subject with gesture data illustrated in connection with a reference point on the subject's body.

Referring now to FIG. 7, an illustration of a subject studied is illustrated. In brief overview, the subject's shoulders, hips, elbows, palms, fingers, knees, heels, toes, head, neck and pelvis are indicated with respect to the subject's waist. In this embodiment, the result includes positive and negative x, y, and z-axis values. Data scaling is later described and may be used to eliminate negative numbers. In some embodiments, data scaling is used to eliminate the negative numbers. Additionally, normalization is used to normalize all values to values between 0 and 1.

In some embodiments, the data needed to be sampled out of the Kinect is sampled through a middleware developed in-house. In some embodiments, a full gesture is made up of 1200 to 2000 frames. This may be viewed as oversampling. In some embodiments, an approach of eliminating redundant frames from the one or more frames (such as the 1200-2000 frames) is used in order to use a smaller number of frames. In some embodiments, it is safe to eliminate any redundant frames as the detector, such as the Kinect camera, data samples to the 8th decimal place on each joint. In such embodiments, it may be uncommon for the camera to sample two identical frames in a row as the circuit noise alone would prevent this from occurring. In some embodiments, the average temporal length of each gesture in the database is 200-300 frames.

Figure 8A:
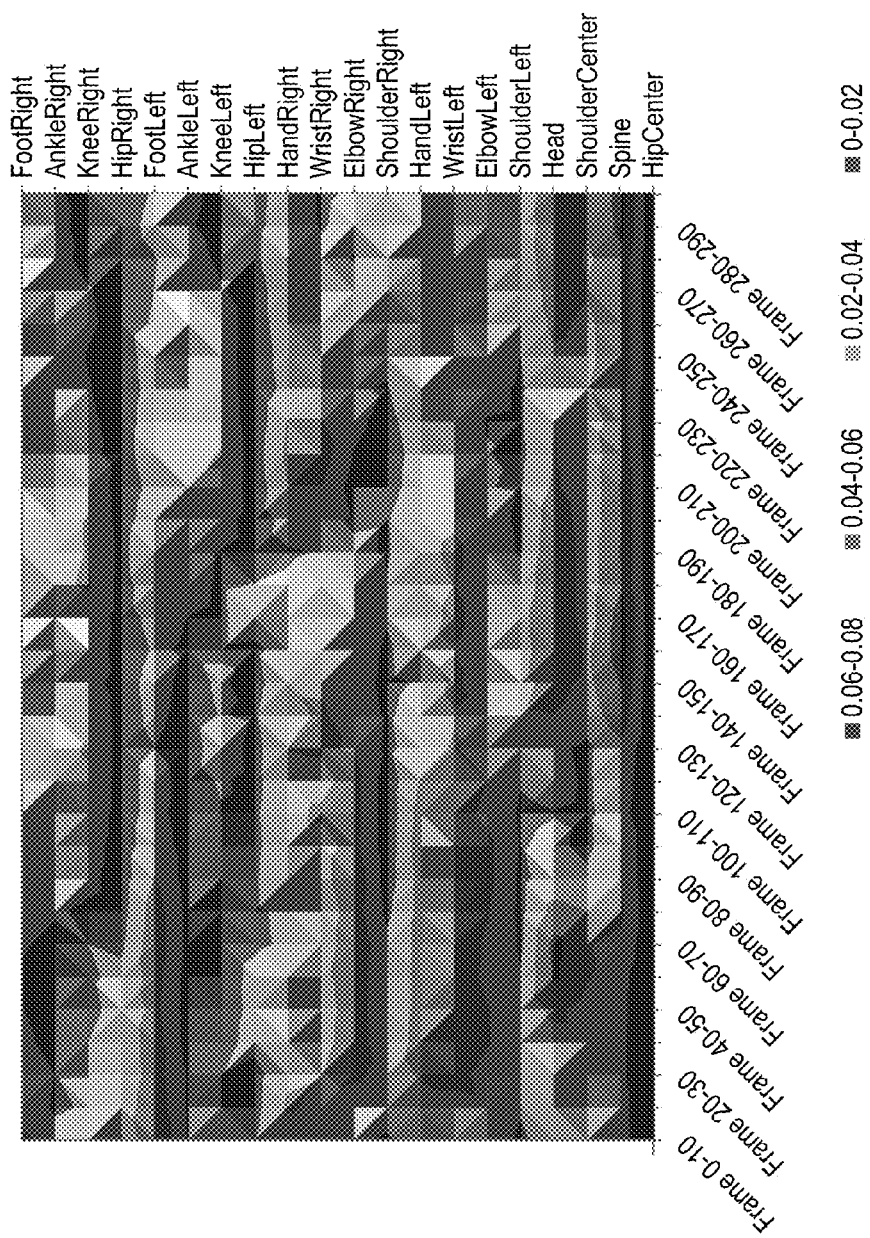
FIG. 8A illustrates an embodiment of a collection of frames in which gesture data identifies positions of the subject's body parts through a movement of frames in time.

Referring now to FIG. 8A, an embodiment of an overhead view of a 3D plot of a single gesture's set of frames is illustrated depicting the frames changing through time. FIG. 8A therefore depicts features of gesture data, including: a right foot, a right ankle, a right knee, a right hip, a left foot, a left ankle, a left knee, a left hip, a right hand, a right wrist, a right elbow, a right shoulder, a left hand, a left wrist, a left elbow, a left shoulder, the head, the center shoulder, the spine and the hip center of the person. FIG. 8A illustrates these gesture data points moving through approximately 300 frames. As shown in FIG. 8A data is illustrated as moving through frames 0 through 290, as for example in frames 0-10, 20-30, 40-50, 60-70, 80-90, 100-110, 120-130, 140-150, 160-170, 180-190, 200-210, 220-230, 240-250, 260-270 and 280-290. FIG. 5A may refer to each one of the frames between 0-290 or selections of frames between 0-290, leaving some frames out.

Figure 8B:
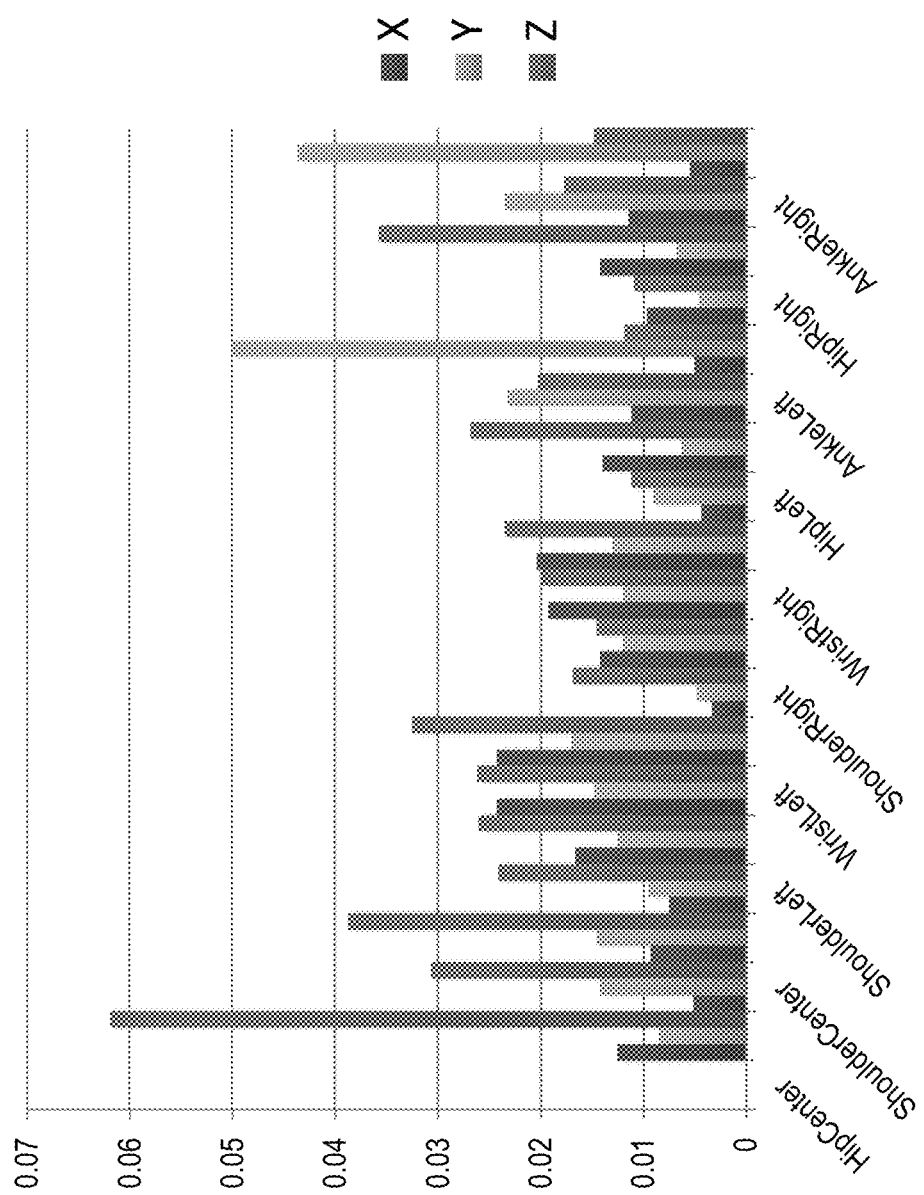
FIG. 8B illustrates an embodiment of a collection of gesture data points within a frame in which a subject is depicted in a particular position.

In reference to a dataset similar to the one depicted in FIG. 5A, for experimentation purposes, a matrix of size N rows and 60 columns of floating point numbers may be used as input. Output may include a column vector of integers denoting class ID. Each input column (each of the 60 features) may be scaled across all samples to lie in range. FIG. 8B illustrates a scaled plot of a series of frames depicting movements of the subject in FIG. 7 with normalized vectors. Data scaling may be applied to diversify the learning algorithm testing and improve gesture compression for transmission over the network. Data scaling of getting rid of negative values and/or normalizing values between 0-1 may enables the usage of a specialized compression technique for transmitting this particular type of data over the network 99, thereby enabling a more efficient communication and data exchange between the devices 100 and the server 200.

One of the equations that may be used for data scaling may be a normalization vector equation as follows:

$$\hat{u} = \frac{u}{\|u\|}$$

Learning and recognition may work in collaboration. Recognition systems may use several types of intelligent systems to recognize patterns between classes (in our case gesture classes). In one example, a Nintendo's Wii remote control may be used. The approach may involve using the handheld device's two 3D accelerometers to learn two different gestures moving through time (our experiments use 20 3D points.) in such an example, a Self-Organizing Map (SOM) may be used to divide the sample data into phases and a SVM to learn the transition conditions between nodes. In such an embodiment, the supervised system may score an accuracy of 100 percent for class one and 84 percent for class two. The unsupervised system may score an accuracy of 98 percent for class one and 80 percent for class two.

In another embodiment: the experiment may also involve the Wii but the gesture classes may be increased to 12 with 3360 samples. The user dependant experiments in such embodiments may score an accuracy of 99.38% for the 4 direction gestures and 95.21% for all the 12 gestures. The user independent version may score an accuracy of 98.93% for 4 gestures and 89.29% for 12 gestures.

In some embodiments, a gesture recognition approach for small samples sizes is used. For some experiments, a set of 900 image sequences of 9 gesture classes may be used. Each class may include 100 image sequences. In some embodiments, more classes and less complete samples may be utilized. A Scale-Invariant-Feature-Transform (SIFT) may be used as a descriptor while a scalar vector machine (SVM) may be used for the learning. Multiple other approaches may be shown and accuracy may be 85 percent out of 9 separate experiments.

In some embodiments, an SVM Radial Basis Function classifier is used as the classifier of the system. The Radial Basis Function (RBF) SVM classifier may be non-linear and the corresponding feature space may be referred to as a Hilbert space of infinite dimensions defined as:

$$k(x_i, x_j) = \exp(-\gamma \|x_i - x_j\|^2) \quad \text{Equ.2}$$

for $\gamma > 0$

Equation 1 Gaussian radial basis function

The RBF Kernel, grid search for parameters may include:

A. Cost controls which may have the trade-off between allowing training errors and forcing rigid margins. Cost may vary between 0.1 and 7812.5, scaling by 5 each time. There may be a soft margin that may permit some misclassifications. Increasing, the Cost may increase the cost of misclassifying points and may force the creation of a more accurate model that may not generalize well.

B. Gamma may be varied between 1e-5 to 113, scaling by 15 each time. The gamma parameter may determine the RBF width.

In one embodiment, a prediction may be obtained for Cost value of anywhere between 200 and 500, such as about 312.5 and Gamma value of about anywhere between 0.2 and 0.8, such as about 0.50625.

Table 2, illustrated below, presents a performance table of an embodiment of the present disclosure using the RBF.

TABLE 2

RBF Kernel performance Table for Gamma and Cost

| Gamma/Cost | 0.1 | 0.5 | 2.5 | 12.5 | 62.5 | 312.5 | 1562.5 | 7812.5 |
|---|---|---|---|---|---|---|---|---|
| 0.00001 | 11.9088 | 11.0895 | 11.0895 | 11.0895 | 11.0895 | 28.017 | 65.6136 | 83.3715 |
| 0.00015 | 11.9088 | 11.0895 | 11.0895 | 11.9163 | 48.0545 | 80.878 | 89.702 | 93.8928 |
| 0.00225 | 11.9088 | 11.0895 | 37.1109 | 72.714 | 88.26 | 93.2538 | 95.5032 | 96.3559 |
| 0.03375 | 29.7226 | 67.0234 | 85.2106 | 92.8481 | 96.1389 | 96.9349 | 96.808 | 96.7915 |
| 0.50625 | 83.73 | 93.0102 | 96.5956 | 98.0217 | 98.3722 | 98.1005 | 97.8376 | 97.8376 |
| 7.59375 | 73.5057 | 92.8436 | 95.8249 | 95.921 | 95.9305 | 95.8808 | 95.8312 | 95.8312 |
| 113.90625 | 11.3813 | 19.893 | 40.9047 | 40.9047 | 40.9047 | 39.7976 | 38.6905 | 38.6905 |

In some embodiments: the SMV Poly setting may be used. The Poly or Polynomial SVM classifier may be a non-linear and a hyperplane in the high-dimensional feature space, which may be defined as:

$$k(x_i, x_j) = (x_i \cdot x_j)^d \quad \text{Equ.3}$$

Equation 2 Homogeneous Polynomial $$k(x_i, x_j) = (x_i \cdot x_j + 1)^d \quad \text{Equ.4}$$

Equation 3 Inhomogeneous polynomial

In such an embodiment, the Polynomial Kernel Grid Search Parameter values may include:

A. Cost varied between 0.1 and 7812.5, scaling by 5.

B. Gamma which may serve as inner product coefficient in the polynomial. Gamma ma be varied between 1e-5 and 113.90625, scaling by 15.

C. Degree of polynomial varied between 0.01 and 4, scaling by 7.

D. Coeff 0 varied between 0.1 and 274.4, scaling by 3.

In one embodiment, a prediction of 97.64% may be obtained with a Cost value of between 0.3 and 0.7, such as for example 0.5, Gamma values of between 0.3 and 0.7, such as for example 0.50625, Degree of between 3.0 and 4.0, such as for example 3.43, and coeff 0 of between 0.05 and 0.3, such as for example 0.1

Random Trees Parameter Selection may include:

A. Tree Height varied between 2 and 64, scaling by 2.

B. Features considered varied between 4 and 12, with a multiple step of 2.

In one embodiment, a prediction of 98.13% may be obtained for Max Tree Height 32 and 1.0 random Features.

| Features/Max Tree Height | 2 | 4 | 8 | 16 | 32 | 64 |
|---|---|---|---|---|---|---|
| 4 | 24.38 | 46.72 | 90.09 | 97.73 | 97.89 | 97.89 |
| 6 | 26.27 | 46.48 | 89.51 | 97.92 | 97.97 | 97.97 |
| 8 | 27.93 | 45.19 | 89.36 | 98.01 | 98.11 | 98.11 |
| 10 | 30.32 | 46 | 89.25 | 98.03 | 98.13 | 98.13 |
| 12 | 31 | 44.89 | 89.16 | 97.95 | 98.02 | 98.02 |

Table 3 (above) illustrates an embodiment of performance table with max tree height vs. features Referring now to the results in Table 4 (below), an embodiment is illustrated in which the system uses 70% random training and 30% testing. In one experiment, settings of various embodiments described earlier, including RBF kernel, Polynomial kernel and Random Tree are tested with 10 fold cross validation on the full dataset. The results of this testing are as presented below.

TABLE 4

Comparative results of embodiments of RBF, Polynomial, and Random Tree recognition results based on 70% random training and 30% random testing.

| | | RBF | | POLY | | RandTREE | |
|---|---|---|---|---|---|---|---|
| | Samples | Correct | Correct % | Correct | Correct % | Correct | Correct % |
| Run 1 | 61078 | 60323 | 98.76% | 60304 | 98.73% | 60491 | 99.04% |
| Run 2 | 62411 | 60486 | 96.92% | 59974 | 96.10% | 59202 | 94.86% |
| Run 3 | 62689 | 62339 | 99.44% | 61712 | 98.44% | 62358 | 99.47% |
| Run 4 | 59519 | 59041 | 99.20% | 58994 | 99.12% | 59013 | 99.15% |
| Run 5 | 64364 | 64112 | 99.61% | 63982 | 99.41% | 63873 | 99.24% |
| Run 6 | 58186 | 57681 | 99.13% | 57538 | 98.89% | 57551 | 98.91% |
| Run 7 | 64948 | 64006 | 98.55% | 63948 | 98.46% | 64484 | 99.29% |
| Run 8 | 63074 | 62671 | 99.36% | 62315 | 98.80% | 62764 | 99.51% |
| Run 9 | 53703 | 52425 | 97.62% | 52336 | 97.45% | 53321 | 99.29% |
| Run 10 | 57248 | 55519 | 96.98% | 55224 | 96.46% | 55508 | 96.96% |
| Total | 607220 | 598603 | 98.58% | 596327 | 98.21% | 598565 | 98.57% |

As the results may be presented in terms of various movements or gestures performed by the subjects and the rate of correct predictions for the given embodiments. Table 5 (shown below) presents data collected for the embodiments discussed where the scaled (and/or normalized) data is compared to the non-scaled (and/or non-normalized) data.

TABLE 5

Comparative results for RBF with and without scaling.

| | Scaled | | Not Scaled | |
| --- | --- | --- | --- | --- |
| Gesture | Correct Prediction | Correct Prediction % | Correct Prediction | Correct Prediction % |
| AirGuitar | 7336 | 99.46% | 7356 | 99.73% |
| Archery | 6606 | 100.00% | 6606 | 100.00% |
| Baseball | 3106 | 100.00% | 3106 | 100.00% |
| Boxing | 6128 | 100.00% | 6128 | 100.00% |
| Celebration | 1006 | 94.37% | 936 | 87.80% |
| Chicken | 3967 | 98.14% | 3437 | 85.03% |
| Clapping | 8006 | 100.00% | 7847 | 98.01% |
| Crying | 2887 | 96.01% | 2776 | 92.32% |
| Driving | 6518 | 100.00% | 6518 | 100.00% |
| Elephant | 1585 | 100.00% | 1585 | 100.00% |
| Football | 1621 | 100.00% | 1621 | 100.00% |
| Heart Attack | 1910 | 98.96% | 1895 | 98.19% |
| Laughing | 1747 | 99.15% | 1752 | 99.43% |
| Monkey | 1143 | 96.86% | 1140 | 96.61% |
| SkipRope | 943 | 77.11% | 1063 | 86.92% |
| Sleeping | 1816 | 100.00% | 1720 | 94.71% |
| Swimming | 1073 | 100.00% | 1073 | 100.00% |
| Titanic | 1290 | 100.00% | 1290 | 100.00% |
| Zombie | 2767 | 100.00% | 2767 | 100.00% |
| Overall | 61455 | 98.96% | 60616 | 97.61% |

Figure 9:
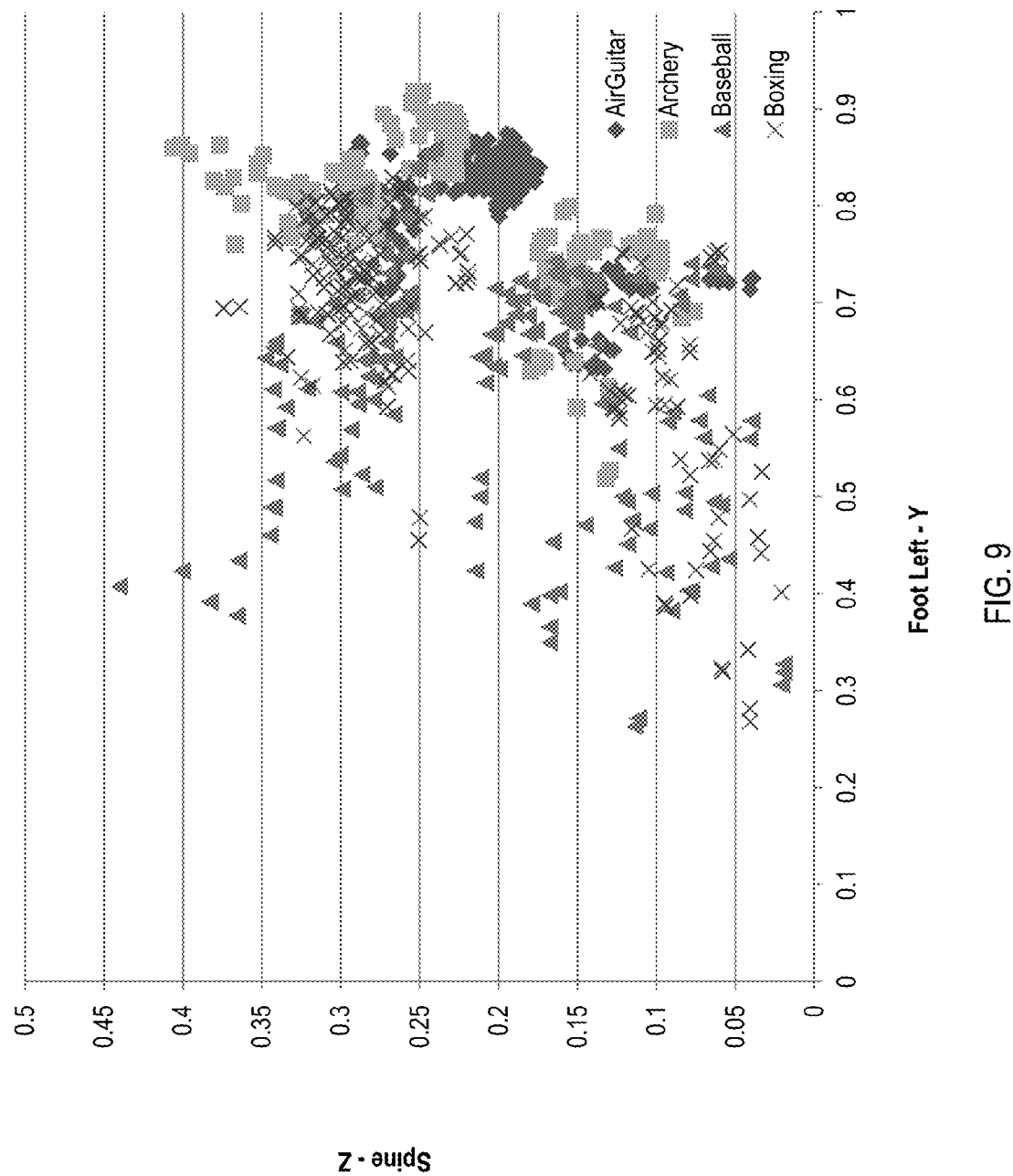
FIG. 9 illustrates an embodiment of data collected in an experiment.

Referring now to FIG. 9, data collected for an embodiment in which RBF SVM is used is illustrated. FIG. 9 shows a plot of the first 4 alphabetical classes. These results are plotted in two dimensions, using values from the z-axis of the spin and the y-axis of the left foot. These axes were selected because the recognition system was prioritizing these points for accurate identification. FIG. 9 therefore shows support vectors in feature space. In this particular test and for this particular embodiment of the invention, a Y co-ordinate of left foot and a Z co-ordinate of a spine are found to be the most useful features while classifying gestures of various body parts.

In some embodiments, to speed up the system in terms of real-time recognition implementations a technique may be used in which display recognition results for only five of the 20 gestures are used, while the other 15 were grouped together as an "idle" gesture. In further embodiments, averaging the gesture over several frames, such as 10 frames at a time, creating a fixed minimum threshold, repeating this process 2-3 times, and averaging those results under another minimum threshold may be used before providing a recognition value.

The above discussed embodiments of systems and methods present series of approaches to complex real-time gesture recognition. These approaches may be used with any type and form of detectors, such as depth cameras, RGB cameras, or mark based tracking. The results of the tests show, in some embodiments, accuracy of greater than 98 percent. The embodiments may comprise a number of different learning algorithms (i.e. three different classifiers and/or recognizers).

While the system may operate entirely using gesture data points based on locations of joints and other body parts as represented in the Cartesian coordinate system, it is possible, and relatively simple, to represent the data using other coordinates, including the polar coordinates.

One such technique may include using representations of gesture data points which instead of locations, represent velocities between the frames of data. In such instances, the system would use an initial location and then simply represent each successive frame in terms of vector velocities representing movements of each particular gesture data point with respect to the position of the same gesture data point in a prior frame.

As another alternative, the system may also be represented using gesture data point angles. For example, if gesture data illustrates joints of a human body, each joint may be represented not in terms of X, Y and Z, but rather in terms of angles between the joints. As such, the frame may use only a single location and represent all the other gesture data points in terms of angular coordinates with respect to the single location. In such embodiments, the gesture data points may be represented as vectors with angles and magnitude.

Similarly, another way to represent the data may involve taking angles of the gesture data points and recording the velocity of the movements between the frames. However, any of these ways of representing the gesture data may involve simple mathematical transformations of different ways of representing points in a two dimensional space. One of ordinary skill in the art will recognize that representing the data in terms of Cartesian coordinate system, polar coordinate system, vectors between the frames or any combination thereof, involves simple mathematical variations to represent the same data.

B. Systems and Methods of Compressing Gesture Data Based on Principal Joint Variables Analysis In addition to the aforementioned embodiments, the present disclosure also relates to systems and methods of compressing, and more efficiently processing, gesture data using Principal Joint Variables Analysis (PJVA). As a frame of gesture data may include any number of features of gesture data, some of these gesture data features within a frame may be more relevant for determining a particular movement than other gesture data features. For example, when a system for identifying movements is detecting or determining a movement of a subject waving her hand, some gesture data features, such as those of right and left hands and right and left elbows, may be given more importance and weighted more heavily by the system than gesture data features of ankles, toes and knees. In these instances, when a determination of a movement depends more heavily of one group of body parts and joints, gesture data features of the more relevant body pans and joints may be selected and weighted more than others. In some instances, gesture data features that are not relevant for the determination of a particular movement or action may be completely deleted from the gesture data frames and may be left in the gesture data frames but not included in the processing during the detection process.

In one example, a frame of gesture data is meant to enable the system to identify movement of a subject pointing with her finger at a particular direction. In such an instance, the frame for identifying the pointing movement may exclude gesture data features of toes, ankles and knees and focus entirely on the gesture data features of the joints and body parts of the upper body. These determinations of weighing or prioritization of some gesture data features over others and/or truncation of the gesture data frames to exclude some less relevant gesture data features may be referred to as the Principal Joint Variables Analysis ("PJVA").

Using the PJVA, processing speed of the system detecting subject's body movements may be significantly increased as the system needs to process only some gesture data features and not all to detect body movements. Moreover, in the instances where the PJVA leads to weighing some gesture data features more heavily than others, the system may also improve its accuracy of the detection by relying more heavily on the most relevant body parts for a particular movement than the less relevant body parts. In addition, in the instances where the PJVA leads to the system truncating frames of gesture data by deleting the irrelevant gesture data features, the size of data may be compressed because the frames for identifying gesture data are in this instance truncated and smaller than the original. PJVA may therefore be used by the system to speed up the processing, compress the gesture data as well as improve the accuracy of the system for detecting body movements.

In some embodiments, PJVA may be implemented by the system during the learning phase, thereby enabling the system to learn to recognize a movement or a gesture by using PJVA in the learning phase. PJVA compressed data may be stored in the database in a manner where only the relevant gesture data features are included. The non-relevant data that was extracted from the frames during the learning phase may be filled in with constants, such as zeros, or with random numbers. Meta data and/or data headers may include instructions helping the system understand which are relevant gesture data features and which are not Meta data and/or data headers may also provide information to the system in terms of the weights to be included for each gesture data feature of the frame.

In one instance, a gesture may be described by 10 frames of three-dimensional data, each frame therefore comprising a matrix having three columns corresponding to X, Y and Z axis and each column comprising about 10 rows, each row corresponding to particular gesture data feature ("GDF"). Each GDF may correspond to a particular joint or a specific portion of human body, such as the forehead, palm of a hand, left elbow, right knee, and similar. Since dimensions of the frame correspond to the X, Y and Z, each row corresponding to a GDF entry may represent the GDF as a vector in terms of X, Y and Z coordinates. In such an embodiment in which a gesture recognition file includes a set of 10 frames of three-dimensional data where each dimension includes 10 GDF entries, the total number of GDFs to be calculated by the system may be expressed as:

GDFs=(10 frames)×(3 dimensions/frame)×(10 GDFs/dimension)=300 GDFs in total.

Therefore, for 10 frames of three-dimensional matrices of 10 GDFs (joints) the system would need to calculate or keep track of a total of 300 GDFs.

In comparison, when the system utilizes a PJVA technique to crop or extract the GDFs that are not relevant to a particular gesture, the system may use a larger number of frames, thereby improve the accuracy of the detection or recognition file while overall compressing the file size because of the reduction of the number of overall total GDFs and speeding up the processing. For example, when using PJVA, the system may instead of 10 frames use 15 frames of three-dimensional gesture data and instead of 10 GDFs per each dimension, extract 5 that are not needed and only use 5 relevant GDFs. In such an instance, the overall number of GDFs of 15 three-dimensional gesture data sets utilizing only the relevant GDFs, may be calculated as:

GDFs=(15 frames)×(3 dimension/frame)×(5 GDFs/dimension)=225 GDFs in total.

Therefore, by using the PJVA, the system may compress the overall data while still improving the accuracy of the detection or recognition and the speed with which the data may be calculated or processed.

The present disclosure also relates to systems and methods of determining when and how to apply the PJVA compression on the gesture data. A PJVA function may be included, in the system having the functionality to determine which GDFs to keep and which to exclude based on the variance of the GDFs through frames of data. Using variance of the GDF values from frame to frame may be referred to as the variance analysis, and may be employed in the PJVA as well as the PCA described below.

As some gestures may rely heavily on some parts of the subject's body, while not relying on others, a PJVA function may determine whether or not to utilize PJVA and for which of the GDFs in the matrix to utilize the PJVA. This determination may be done based on the variance of the GDFs from frame to frame. In one example, a PJVA function may analyze a set of frames of gesture data. Once the PJVA function determines that some specific. GDFs vary through the frames more than others, the PJVA function may assign a greater weight to those GDFs that are varying through frames more. Therefore, GDFs that change or vary through frames less may be assigned a smaller weight and GDFs that change or vary through frames more may be assigned a larger weight. The weight assignment may be done based on the variance analysis. In one embodiment, a threshold weight may be established by which the GDFs having weight below the threshold weight may be extracted and the GDFs at or above the threshold weight may be kept and used for the determination. The determination of variability of GDFs through frames may be determined by variance from a mean value, a standard deviation from the mean or an average change of the GDFs from frame to frame.

Alternatively, even regardless of whether or not the PJVA function excludes any of the GDFs from the matrices, the weights assigned may be used by system to more heavily focus on those GDFs that are varying more through time, thereby focusing more heavily on the changes of movements of particular joints and improving accuracy of the detection or recognition of gestures. By multiplying the gesture data by the assigned weights, and using weighted gesture data, the system may give greater credence to those GDFs that vary more through time. As GDFs with greater variance between the frames of data may provide more relevant information about the gesture or movement than those with smaller variance, the overall detection and recognition accuracy may increase as the result of using the weighted GDFs.

In some embodiments, PJVA function may determine which GDFs to extract or exclude from the matrices based on standard deviation or variance of GDFs through a set of frames. For example, the PJVA function may determine a standard deviation or a variance for each GDF through the set of frames. This determination may be done by determining a mean of the GDF values through the frames and then determining variance and/or standard deviation of that GDF value through the frames. Therefore, a GDF corresponding to a left knee may be described by particular set of values in X, Y, and Z directions per each frame. If the GDF corresponding to the left knee has a variance or a standard deviation from the mean value that is above a certain variance threshold, the GDF may be kept in the set. If however, this GDF has a variance or standard deviation that is below the variance threshold, then this GDF may be extracted and not included in the PJVA compressed gesture data set.

GDF variances may be determined for the GDF value as a Whole or for each dimension components separately. For example, the system may use a single variance for a single GDF taking in consideration all three dimensions (X, Y and Z values) or it may determine the variance of the GDF value in X direction separately from the variances of GDF values in Y direction and Z direction. In instances where the GDF variance is done for each dimension individually, each GDF value would may have three mean values and three variance values. In instances in which the GDF variance is done for the GDF value alone, there might be only a single mean value and a single variance value for each GDF value.

During the process of compression, PJVA function may utilize: the variance threshold to determine which GDF values to keep in the matrix and Which to extract from it. In some embodiments, the variance threshold may equal to sigma, or one standard deviation from the mean. In other embodiments, the variance threshold may equal to two sigma, or two standard deviations from the mean. In further embodiments, the variance threshold may be set to three sigma, four sigma, five sigma or any other integer of fraction of sigma between 0 and 100. Naturally, as the variance threshold is set to a higher sigma value, only the GDFs with higher variance may be kept in the PJVA compressed gesture data set. Alternatively, a separate low-variance threshold may be set up to determine which low variance GDF values can be safely extracted. Using one or more variance thresholds as a determining factor with respect to which GDFs to keep in a matrix of gesture data and which to exclude, the PJVA function may then limit all the GDFs that are remaining more static through the frames, thereby not substantially contributing to a particular gesture. This way. PJVA function may only keep those GDF values that provide more information about the particular movement, sometimes significantly compressing the size of gesture data matrix, and speeding up the processing time.

C. Systems and Methods of Compressing Gesture Data Based on Personal Component Analysis The present disclosure also relates to systems and methods of compressing and/or improving gesture data processing and accuracy based on Principal Component Analysis ("PCA"). PCA may be implemented alone or in combination with the PJVA. PCA may entail a technique in which three-dimensional data, describing movements of gesture data features in terms of X, Y and Z coordinates is collapsed from the three-dimensional data set into a two-dimensional or single-dimensional data set. For example, when a particular gesture data set includes GDFs whose change in a particular axis, such as for example X-axis, is greater or more important than changes in Z-axis or Y-axis, then this data set can be collapsed from X-Y-Z three-dimensional data set into an X-axis single-dimensional data set. In such an instance, Y and Z axis data may be entirely erased or filled in by constants, such as a zero, while the X-axis values are modified to include data that is reduced from three dimensions down to a single dimension. X-axis values; may therefore be modified after the Y and Z axis are excluded, to more accurately represent or approximate the information that prior to this matrix transformation used to be represented in what is now the erased V and Z dimension values. In such embodiments, PCA can be used to compress the data by more heavily relying only on the axis of greater importance and mostly ignoring data from the other one or two axis which are of lesser importance. In some embodiments, the axis of greater importance may be the axis along which most changes in GDFs takes place from frame to frame.

Principal component analysis or PCA, may be a linear projection operator that maps a variable of interest to a new coordinate frame in which the axis represents maximal variability. Expressed mathematically, PCA transforms an input data matrix X (N×D, N being the number of points, D being the dimension of data) to an output Y (N×D', were often D'≤D). PCI transformation of the 3 dimensional matrix down to a single dimensional matrix may be done via the following formula: Y=XP, where P(D×D') is the projection matrix of which each column is a principal component (PC), and these are unit vectors that bear orthogonal directions. PCA may be a handy tool for dimension reduction, latent concept discovery, data visualization and compression, or data preprocessing in general.

With respect to using PCA in the system, while collapsing data may theoretically cause more errors when the data is relevant, if the system may ensure that the expelled data is not relevant or that it is substantially less important, then collapsing data from a three dimensional matrix down to a single dimensional one may not introduce a significant amount of errors. In order to determine which axis to collapse, a PCA function may be deployed to implement the PCA methodology. PCA function, in one embodiment, may implement the PCI methodology by using the above described variance analysis. For example, when a frame is represented by an X-Y-Z three-dimensional matrix of gesture data features and when variance of data in one or two of the three dimensions greatly exceeds the variance of data in the other one or two remaining dimensions, then the three-dimensional matrix may be collapsed into a one-dimensional or a two dimensional matrix, thereby reducing the size of the gesture data. This PCA process may be completed during the training or learning phase, thereby enabling the data in the data base to be collapsed and compressed. Additionally. PCA may also be done in the recognition phase as well, thereby enabling the newly extracted frames of data to be compared against the gesture data from the database when collapsed and compressed along the axis of greater importance.

Because PCA compresses the data, it speeds up classification as well as the processing. In embodiments in which the data is compressed from a three-dimensional matrix down to a single dimensional matrix, while some less significant error may be introduced by losing ⅔ of the data: additional frames may be added to improve the overall accuracy despite the fact that the data is overall compressed. So for example, if 8 frames of single-dimensional collapsed data are used for gesture recognition, despite the fact that these 8 frames are collapsed, they may still provide more accuracy than 4 frames of the non-collapsed three-dimensional data. Moreover, if we consider that 8 single dimensional frames are smaller than 4 three dimensional frames by about ⅓, we can notice the significant compression even when the accuracy improves, or at least compensates for the errors introduced. Therefore, the system may benefit by using a larger number of frames to detect or recognize a gesture or a body movement while sacrificing some accuracy per frame. However, since each additional frame provides more accuracy than collapsed singe-dimensional data set takes away, over all the accuracy improves while the data is getting compressed.

In another example, a gesture data set of frames may comprise 10 three-dimensional frames, each having ten gesture data features. The total amount of gesture data features, ("GDFs"), wherein each GDF corresponds to a joint or a location of the human body, is to calculated for this particular set of 10 frames as:

GDFs=(10 frames)×(3 dimensions/frame)×(10 GDFs/dimension)=300 GDFs in total.

Therefore, for 10 frames of 3-dimensional matrices of 10 GDFs (joints) the system would need to calculate or keep track of a total of 300 GDFs.

In comparison, a set of 20 frames of single-dimensional data sets having 10 GDFs/dimension each may result in an overall smaller number of GDFs, while still resulting in a more accurate overall detection and recognition accuracy because of twice the number of relevant frames of gesture data. In such an instance, the overall number of GDFs of 20 single-dimensional collapsed gesture data sets, may be calculated as:

GDFs=(20 frames)×(1 dimension/frame)×(10 GDFs/dimension)=200 GDFs in total.

In this instance, the number of GDFs (or joints/locations of human body) for a particular detection or recognition file is reduced by ⅓ while the number of frames has doubled, thereby still improving the accuracy over the 10 frame three-dimensional gesture data sets, while the speed of the processing is also improved due to the overall smaller number of GDFs to be processed. Therefore, using the PCA to collapse the three-dimensional gesture data to a two-dimensional or a single dimensional gesture data may result in data compression and still leave some room for improvement of accuracy and speeding up of the overall process.

In some embodiments, the system may utilize both the PJVA and the PCA, in such instances the frames may be collapsed from three-dimensional matrices down to two-dimensional matrices or a single-dimensional matrix, while in addition also being collapsed in terms of the number of gesture data features per frame. So for example, a gesture of a subject pointing a finger towards a particular location may be represented collapsed from a three-dimensional matrix to a two-dimensional matrix, while also being collapsed from 10 gesture data features for each dimension down to 5 gesture data features for each dimension. In such an embodiment, the gesture or movement normally being represented by 10 frames having 3-dimensional matrices of 10 gesture data features in each dimension, the gesture or movement may be represented by 20 frames of collapsed single-dimensional matrices having 5 gesture data features in each dimension, resulting in a total compression of ⅔ from the original data size. However, since the combination of PJVA and PCA would be implemented only for the gesture data whose additional number of frames introduced would exceed the error from the PJVA/PCA compression, the overall accuracy would be overall increased, while the data would still be compressed.

PCA function may include one or more algorithms for determining whether of not to collapse one or more dimensions of the matrix of the gesture data and if so, which ones to collapse. As with the PJVA function above, PCA function may also utilize a similar variance analysis to make such a determination. In one embodiment. PCA function determines mean and variance values of the GDS values through the frames. The mean and variance (or standard deviation) values may be determined based on the GDS value itself or based on each dimension of the GDS value separately. When the PCA function determines that variance or change along X direction is greater by than a threshold value, PCA function may collapse Y and Z values and use only X values of the GDS for the gesture data recognition. In some embodiments, PCA function may determine that X and Y values have a sufficiently high variance, whereas Z values do not, and in response to the determination collapse the Z dimension, leaving only a two dimensional, X and Y, matrix for gesture data recognition. In further embodiments. PCA function may determine that Y and Z dimension GDS values have variance that is smaller than a particular low-variance threshold, and in response to this determination decide to collapse the matrix into a matrix having only the X dimension. In some embodiments, PCA function may utilize high-value variance thresholds and low value-variance thresholds to determine which dimensions have a substantially high variance and which have a substantially low variance and then collapse the matrix responsive to such determinations. High and/or low variance thresholds may be established based on sigma values, such that for example a high variance threshold may be set to two sigma, while the low variance threshold may be set to about ¼ of sigma. Sigma values may be determined based on the mean and variance along each single dimension.

In a nutshell, the present disclosure is motivated by the goal to create systems and methods to effectively represent and standardize gestures to achieve efficient recognition as acquisitioning techniques evolve. The present disclosure aims to reduce human expertise and supervision necessary to control and operate the system, to reduce the hardcoding of gestures, find universal truths of body language and create a single standard for all body gestures (the entire body, only the hands, only the fingers, or face).

In addition, the present disclosure has a goal to utilize the methodology of Random Tree Classification of Body Joints (Gesture Data Features) for the detection or recognition purposes. A random trees classification may include a classification algorithm used in the field of learning software. In one embodiment, a random tree classification may be set up like a probabilities tree in which there is only one branch or leaf that can be a winner. Random forest classification algorithm may be a multitude of random tree algorithms. During the recognition phase, the system may run through several separate random forests on each joint, having 2-100 random tree algorithms within each random forest. The system may identify and select a particular gesture file that describes the new gesture data being received from the receiver or camera using random tree classification and/or random forest classification. In one embodiment, the number of trees in the random forests that has the highest success rate in a comparison of multitude of gesture data sets is selected by the system as the winning recognizer file. Therefore the Random forest classification may be used by the system to more quickly identify the gesture data set that is the closest match to the newly acquired gesture data set of the subject whose movement the system needs to detect and identify. Random Tree Classification therefore may be used for gesture data feature recognition, real-time gesture recognition, static pose analysis and the analysis of poses of the subject moving through time.

Figure 10:
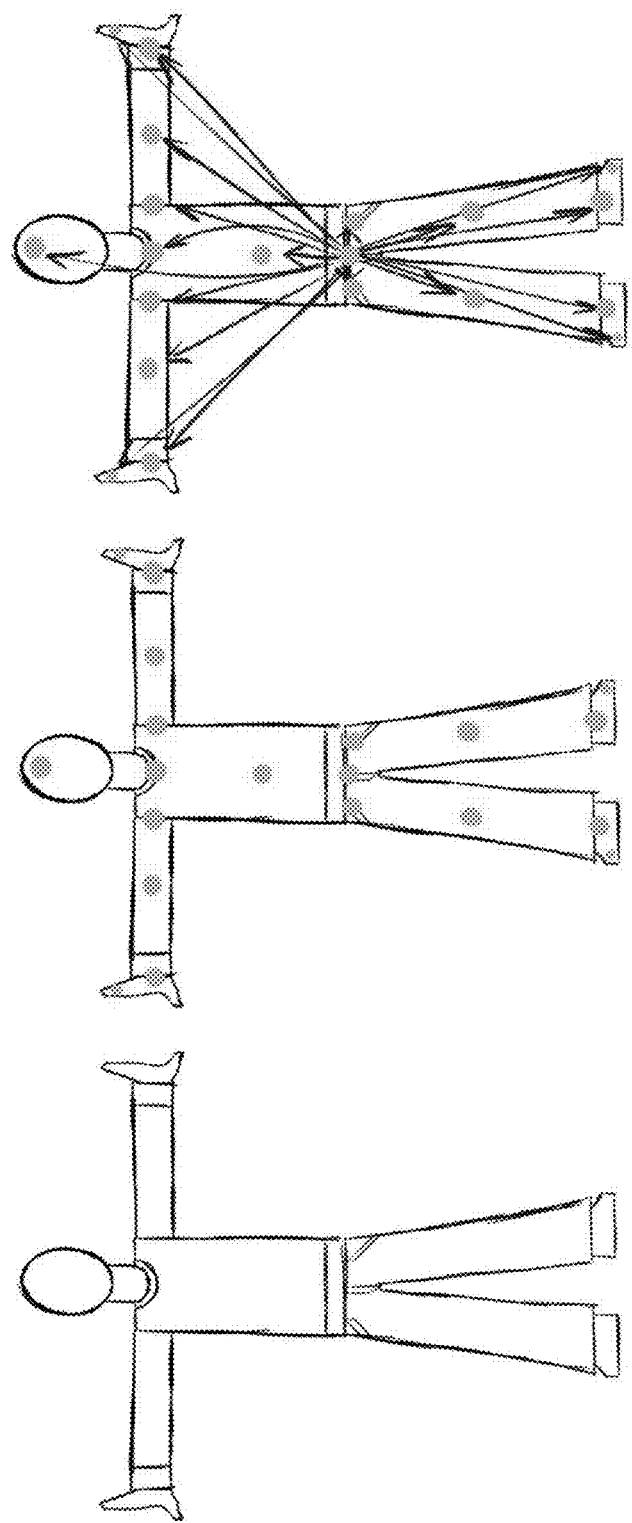
FIG. 10A illustrates an embodiment of a skeleton of a subject.
FIG. 10B illustrates an embodiment of a subject whose body is represented with a set of gesture data features.
FIG. 10C illustrates an embodiment of self-referential gesture data representations.

Referring now to FIGS. 10A, 10B and 10C, an embodiment of a subject striking a pose described by self-referential, or anchored, gesture data is illustrated. In brief overview, FIG. 10A illustrated an instance in which a subject is striking a particular pose or a gesture. FIG. 10B shows gesture data features plotted on top of the subject's body. Gesture data features describe locations on the subject's: head, finger tips of both hands, palms of both hands, both elbows, both shoulders, mid-shoulder section, belly, waist, both hips, both knees, both ankles and toes on each foot. FIG. 10C illustrates the same pose from FIG. 10A and the same set of gesture data features from FIG. 10B represented in terms of self-referential, or anchored, gesture data, where the each gesture data feature is represented as a vector with respect to the waist point. In this instance, each gesture data point is represented as a vector starting at the waist of the subject and ending at the location of the given feature of gesture data; e.g. left palm is represented as a vector from the waist to the left palm.

Anchoring technique may be used so that the joint of the human body represented by a feature of the gesture data is oriented from an anchoring point of view which has the least amount of variance. Reducing variance increases accuracy of the recognition. In most cases the waist or center of the shoulders, i.e. the mid-shoulder point, is used as the anchor. However, depending on the embodiment any feature gesture data point may be used as the anchor point. If joint orientation is more definite, which anchor point to choose becomes less important.

Figure 11:
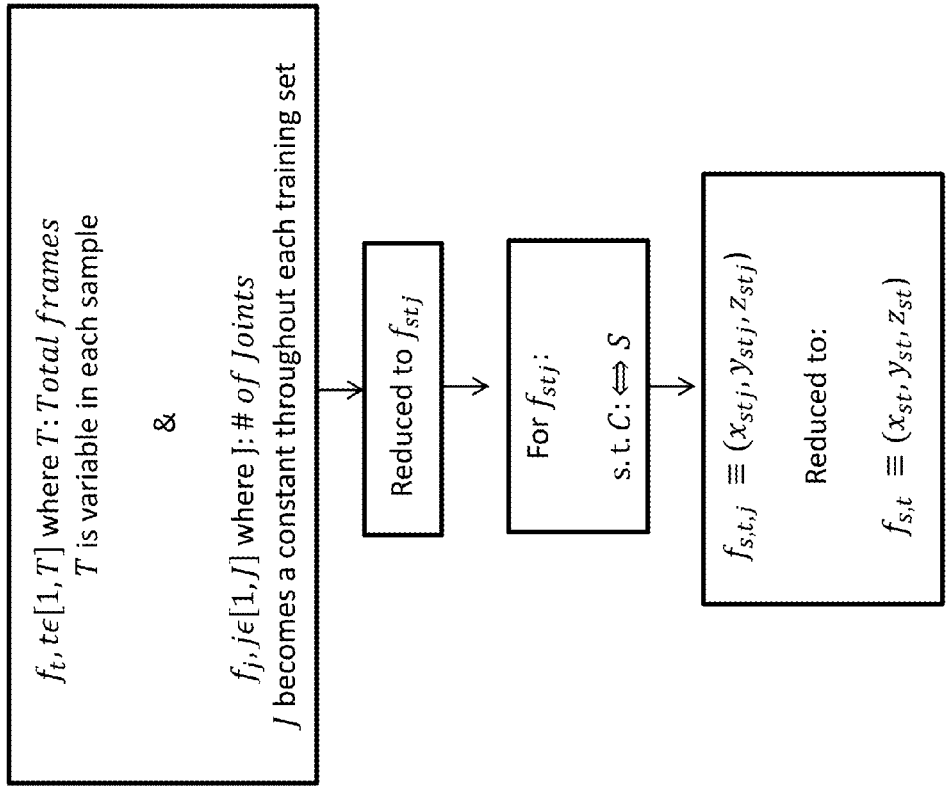
Figure 17:
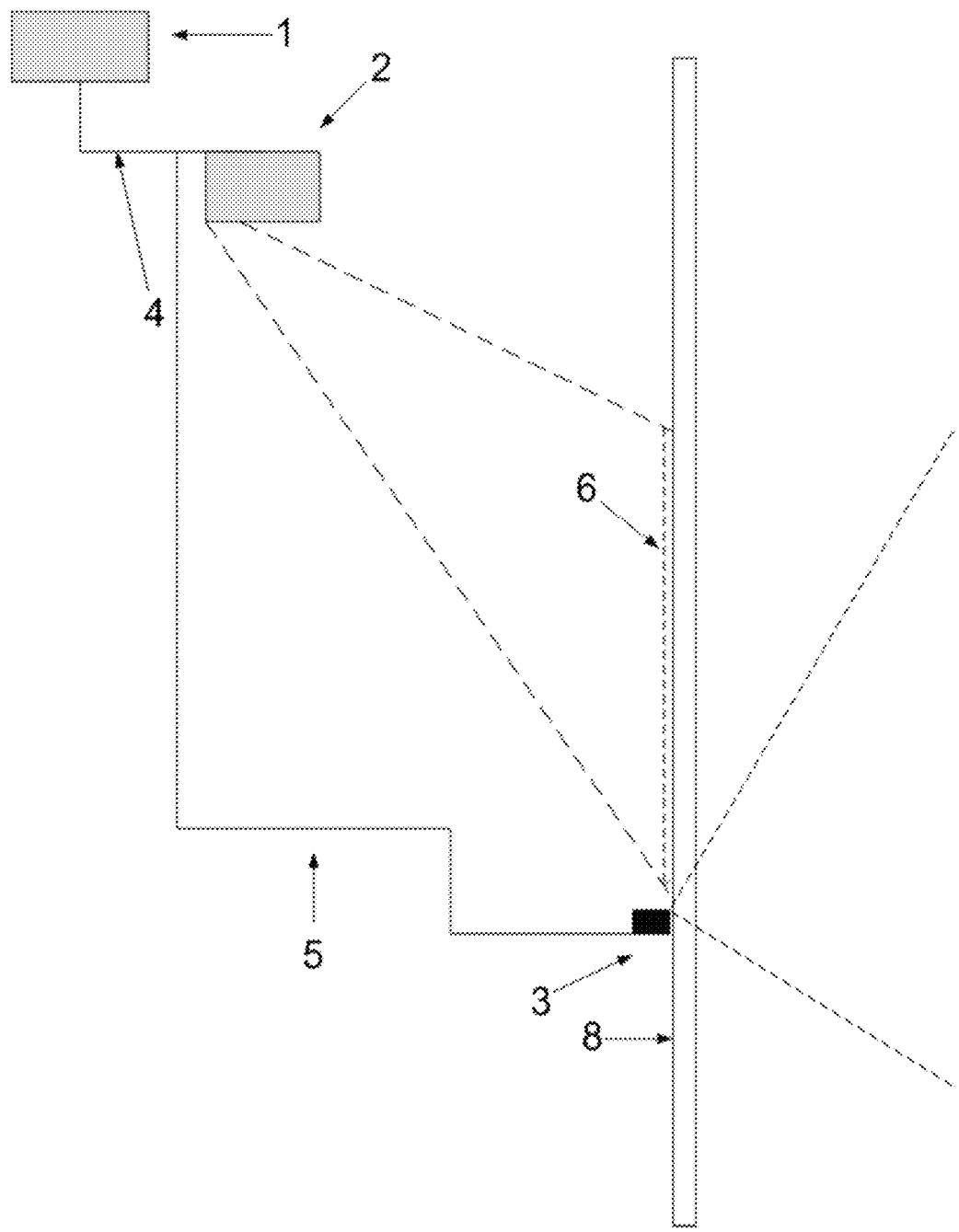
FIG. 17 illustrates an embodiment of a block diagram of a system for providing non-contact, contact, hardware-free display interface based on the gesture data matching technique.

Referring now to FIG. 11, an embodiment of a technique for defining feature matrix is illustrated. While definition may very design to design and application to application. FIG. 11 relates to mathematical rephrasing of the diagram of an embodiment shown in FIG. 6A. In this embodiment, expression: t∈[1,T], means that t is an element of the set [1,T]. Time, which is represented by "T" is variable sample to sample. Expression: j∈[1,J] means that j is an element of the set [1,J]. Joint Number which is represented by J is a constant predefined before classification, but selectively variable. Further below, statement, C:⇔S means C is logically equivalent to S. This means that the Classes and Samples may be directly related to each other mathematically. Expression: $f_{s,t,j} \equiv (x_{stj}, y_{stj}, z_{stj})$ means that for every sample or class, that the date may be prestamped with x, y, z data indexed by sample, time stamp and joint number.

Referring now to FIG. 12, an embodiment of gesture data being anchored or self-referenced is illustrated. Anchoring or self-referencing may be implemented after the matrix is defined. FIG. 12 illustrates an exemplary matrix showing how the present system modifies the data from the input. In this example, waist is used as the anchor from which all gesture data features are referenced mathematically as a matrix. So the matrix may represent each and every gesture data feature as an X-Y-X vector from the anchor point. The first row in the bottom matrix of FIG. 12 in this case represents the value of 0,0,0, which means that the first point may be the anchor point in reference to itself, resulting in x,y,z values of zero.

Referring now to FIG. 13, an embodiment of scaling or normalizing of the matrix of gesture data is illustrated. Scaling or normalizing may be completed after the anchoring of data. At this step, the values of the matrix are scaled and normalized to be between 0 and 1.

Referring now to FIG. 14, an embodiment of PCA collapsing or reduction of dimensionality is illustrated. PCA collapsing may be implemented after the data is self-referenced and normalized. PCA collapsing, as described above, may reduce a 3 column matrix to a single column representing the most significant matrix for a particular gesture. In some instances, PCA may result in reducing 3 columns of the vector down to 2 most significant columns, eliminating only one column. At this step, in addition to PCA collapsing, PJVA collapsing, as described above, may be implemented as well. Combining PCA collapsing with the PJVA collapsing may further compress the data size.

In one instance, a data set is used to conduct testing on the systems and methods for gesture recognition described herein. The data set comprises of positions of for example, 20 joints when performing 12 different gestures. There may be a total of 594 samples with a total of 719359 frames and 6244 gesture instances. In each sample the subject repeatedly performs the gestures which are recorded at around 30 Frames per second.

In this particular example, the features may be extracted from gesture by taking polynomial approximation of motion of each joint along the 3 axis. To extract features, a sequence of N1 and N2 past frames may be taken, where N1>N2 and motion of each joint point is approximated by using a D degree polynomial. So overall the classification may have a latency of N1. To reduce the noise and enhance the quality of features, PCA may be done on extracted samples to account for a variability v. First and last 100 frames may be dropped from each sample to discard any redundant motions performed in the starting or end of recording.

In this exemplary test, 80% of the samples were randomly selected to make the train set and 20% the test set. The train set was further reduced to 200,000 feature vectors by sampling with replacement while keeping the number of samples of each gesture constant. No such sampling was done on the test set.

With respect to the table below, the following values are indicated:

| Description | N1 | N2 | D | V (Eigen vectors) | Test Accuracy |
|---|---|---|---|---|---|
| Random Forest, 200 Trees, | 30 | 10 | 4 | .95 (18) | 76.79% |
| Random Forest, 200 Trees, | 30 | 10 | 4 | .92 (14) | 69.87% |
| Random Forest, 200 Trees, | 30 | 10 | 4 | .98(30) | 74.73% |
| SVM, RBF Kernel, c = 1, Gamma = 9.25 | 30 | 10 | 4 | .95 (18) | 62.45% |
| Random Forest, 200 Trees, | 30 | 10 | 2 | .95(26) | 71.81% |
| Random Forest, 200 Trees, | 30 | 10 | 6 | .95(26) | 63. 91% |
| Random Forest, 200 Trees, | 60 | 30 | 3 | .95(22) | 79.09% |
| Random Forest, 200 Trees, Not normalized data | 60 | 30 | 3 | .95(17) | 74.75% |

N1, N2: Past frame count
D: Degree of fitted polynomial
v: Variability accounted for by the selected eigenvectors after PCA
EV count: Count of Eigen vectors selected.
Test Accuracy: the percentage of correct identification of the movement or gesture.

With respect to the accuracy across different samples in the course of this particular test, it has been found that the accuracy of classifier was significantly different on different samples. On 59% test samples the accuracy was between 90%-100%, however for few samples the accuracy was even less than 10%. This can be attributed to few problems with the recorded gestures, i.e. the provided data set, of which some examples are given in table below, and also at tunes same gesture performed by different subjects involve very different motions making the whole sample getting a very poor classification.

Figure 23:
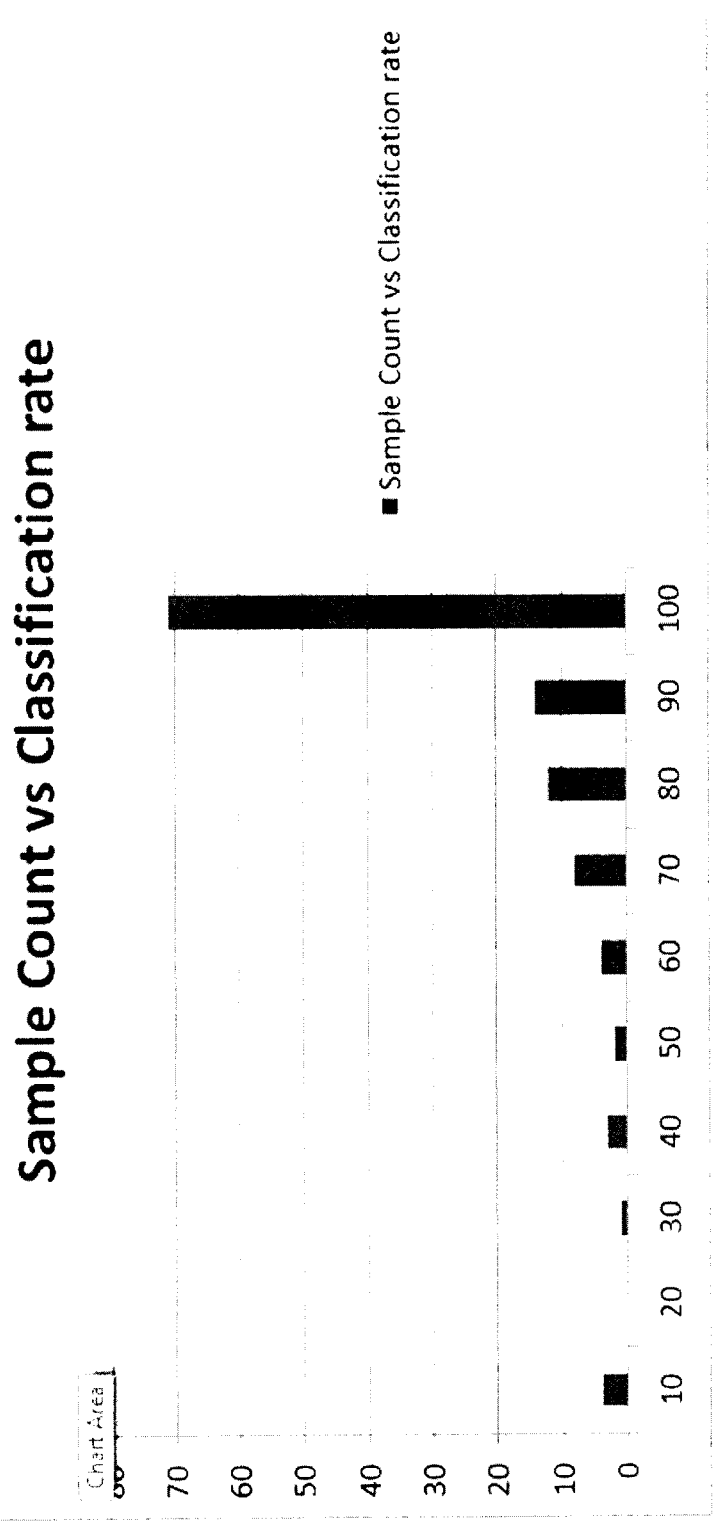
FIG. 23 is a graph illustrative of sample count plotted against classification rate.

FIG. 23 is a graph illustrative of sample count plotted against classification rate.

| Gesture | Sample Id | Accuracy | Problem |
|---|---|---|---|
| G11_Beat_both | 40 | 0% | Wrong gesture, Kicking. |
| G5_Wind_it_up | 30 | 2.31% | Circular gesture with single hand. |
| G11_Beat_both | 33 | 7.38% | Random gesture. |
| G1_lift_outstretched_arms | 8 | 34.85% | No gesture in most of the frames. |

Confusion Matrix

|     | G10    | G11    | G12    | G1     | G2     | G3     | G4     | G5     | G6     | G7     | G8     | G9     |
| --- | ------ | ------ | ------ | ------ | ------ | ------ | ------ | ------ | ------ | ------ | ------ | ------ |
| G10 | 81.90% | 0.00%  | 0.10%  | 1.00%  | 0.20%  | 1.70%  | 2.20%  | 2.00%  | 10.60% | 0.30%  | 0.00%  | 0.00%  |
| G11 | 0.00%  | 62.00% | 0.00%  | 13.90% | 0.00%  | 0.00%  | 0.20%  | 5.50%  | 0.00%  | 0.20%  | 0.30%  | 17.90% |
| G12 | 0.00%  | 0.00%  | 95.80% | 1.90%  | 0.10%  | 0.50%  | 0.10%  | 0.10%  | 0.00%  | 0.60%  | 0.80%  | 0.00%  |
| G1  | 0.00%  | 39.30% | 0.00%  | 52.20% | 0.10%  | 0.00%  | 0.30%  | 6.30%  | 0.10%  | 0.20%  | 0.00%  | 1.50%  |
| G2  | 0.00%  | 0.20%  | 0.00%  | 0.30%  | 0.00%  | 98.50% | 0.00%  | 0.20%  | 0.00%  | 0.00%  | 0.90%  | 0.00%  | 0.00%  |
| G3  | 1.00%  | 0.00%  | 0.80%  | 0.20%  | 0.10%  | 93.40% | 0.00%  | 0.20%  | 0.00%  | 2.30%  | 1.90%  | 0.00%  |
| G4  | 0.30%  | 0.20%  | 0.00%  | 0.40%  | 0.50%  | 0.00%  | 88.00% | 2.90%  | 1.60%  | 0.00%  | 0.00%  | 6.10%  |
| G5  | 8.80%  | 7.80%  | 4.40%  | 5.30%  | 2.50%  | 14.80% | 4.70%  | 44.60% | 2.50%  | 2.00%  | 2.30%  | 0.30%  |
| G6  | 0.00%  | 0.00%  | 0.00%  | 0.10%  | 0.20%  | 0.00%  | 1.10%  | 0.10%  | 98.30% | 0.10%  | 0.10%  | 0.00%  |
| G7  | 0.60%  | 0.40%  | 4.70%  | 3.60%  | 7.10%  | 1.40%  | 0.30%  | 1.00%  | 0.20%  | 80.20% | 0.60%  | 0.00%  |
| G8  | 0.60%  | 0.00%  | 0.00%  | 0.40%  | 0.20%  | 0.70%  | 0.00%  | 0.10%  | 0.00%  | 0.00%  | 98.10% | 0.00%  |
| G9  | 0.00%  | 2.00%  | 0.00%  | 5.10%  | 1.20%  | 0.00%  | 5.80%  | 0.70%  | 0.00%  | 0.30%  | 0.00%  | 84.90% |

Actual Gesture vs. Predicted Gesture.

In this particular test and for this particular data set, a few gestures are have found to be much more difficult to recognize than other gestures. Wind it up (G5), Lift outstretched arm G1) and Beat both (G11) have very low accuracy in recognition. In fact, discarding these 3 gestures the accuracy will go as high as 92%. Beat both hands and lift outstretched arms both involve lifting of arms above head and bringing them down sideways. And hence a low latency algorithm like the one used in our case, will find both actions exactly same as it is harder to tell the difference between them without analyzing a larger window of action.
Similar is the problem with 'Wind it up' which at times resembles a lot of other gestures partially.
Not Normalized Data Confusion Matrix

|     | G10    | G11    | G12    | G1     | G2     | G3     | G4     | G5     | G6     | G7     | G8     | G9     |
| --- | ------ | ------ | ------ | ------ | ------ | ------ | ------ | ------ | ------ | ------ | ------ | ------ |
| G10 | 82.20% | 0.70%  | 0.10%  | 0.10%  | 0.00%  | 5.10%  | 4.30%  | 3.80%  | 0.90%  | 0.30%  | 1.70%  | 0.70%  |
| G11 | 0.50%  | 69.10% | 0.00%  | 8.50%  | 0.70%  | 0.10%  | 7.20%  | 3.00%  | 0.70%  | 0.00%  | 0.00%  | 10.00% |
| G12 | 1.10%  | 0.50%  | 90.20% | 2.60%  | 1.10%  | 0.10%  | 0.00%  | 0.30%  | 0.00%  | 0.20%  | 3.80%  | 0.00%  |
| G1  | 0.10%  | 25.20% | 0.00%  | 54.50% | 7.00%  | 0.30%  | 0.10%  | 3.10%  | 0.40%  | 2.80%  | 0.10%  | 6.50%  |
| G2  | 0.50%  | 0.60%  | 2.60%  | 1.90%  | 83.30% | 0.30%  | 1.10%  | 0.40%  | 0.00%  | 6.30%  | 3.00%  | 0.00%  |
| G3  | 13.80% | 4.60%  | 1.30%  | 0.40%  | 0.90%  | 69.40% | 0.00%  | 2.60%  | 1.70%  | 3.30%  | 1.80%  | 0.00%  |
| G4  | 0.40%  | 0.20%  | 0.00%  | 0.30%  | 0.00%  | 0.00%  | 91.80% | 1.70%  | 2.50%  | 0.00%  | 0.00%  | 3.20%  |
| G5  | 0.80%  | 16.90% | 0.10%  | 9.30%  | 0.30%  | 0.50%  | 7.30%  | 57.50% | 6.20%  | 0.60%  | 0.10%  | 0.50%  |
| G6  | 2.20%  | 0.10%  | 0.50%  | 0.40%  | 0.00%  | 0.10%  | 9.40%  | 0.90%  | 85.40% | 0.10%  | 0.00%  | 1.00%  |
| G7  | 1.00%  | 0.20%  | 4.70%  | 6.10%  | 10.20% | 2.10%  | 0.10%  | 0.50%  | 0.00%  | 74.00% | 0.90%  | 0.20%  |
| G8  | 3.90%  | 0.00%  | 0.40%  | 3.50%  | 0.00%  | 1.40%  | 0.00%  | 0.50%  | 0.00%  | 0.00%  | 90.10% | 0.20%  |
| G9  | 0.00%  | 6.90%  | 0.00%  | 10.10% | 0.00%  | 0.10%  | 13.30% | 1.10%  | 0.60%  | 0.10%  | 0.00%  | 67.90% |

However, the above identified experiment, along with its data set represents only a single experiment, out of many which can be done. Varying the settings, the data set as well as the parameters may completely change the accuracy and the results of the set up. Therefore, these results should not be interpreted as any limitations to the system, as the system described herein may be customized for various environments, applications and usage, depending on the target movements and gestures the system is expected to monitor and identify.

D. Systems and Methods of Compressing Gesture Data Slow and Fast Motion Vector Representations Present disclosure further relates to systems and methods of compressing data based on slow and fast motion vector representation. Slow and Fast motion vector representations may be used to compress gesture data and use a smaller number of frames and then later on decompress the data by generating, additional frames from the gesture data of the existing frames.

In one example, when a gesture data set may need a set of 300 frames to accurately describe a gesture, Slow and Fast Motion Vector (SFMV) compression may be used to utilize a smaller set of frames ordered chronologically, such as for example 45 consecutive frames, to accurately represent the gesture. The smaller set of 45 frames may be used to extract and generate additional frames, thereby increasing the number of frames from 45 to anywhere around 300, which may then be used to recognize or detect a gesture. SFMV may utilize 4 degree polynomial functions for each of the GDF values in each of the existing dimensions of the frames to determine, or estimate, the values of the frames to be generated. For example, when a smaller set of 45 frames is used, SFMV technique may be used to create a mid-frame between frame 22 and frame 23, and 4 degree polynomial function plots using GDF values through frames may be used to estimate the GDF values for each given dimension for the newly created mid-frame. This way, any number of mid-frames may be generated to provide the system with a sufficient number of frames to detect or recognize a particular gesture.

To implement the SFMV functionality, an SFMV function may be deployed to use one or more algorithms to compress or decompress gesture data frames using the SFMV technique in brief overview, SFMV function may extract, or provide the tools for extracting, a smaller set of gesture data frames from a larger gesture data frame set. The smaller set of gesture data frames may include any number of frames that is smaller than the original frame set that is being shrunk. The smaller set of gesture data frames may include: 10, 15, 20, 25, 30, 35, 40, 45, 50, 55, 60, 65, 70, 75, 80, 85, 90, 95, 100, 110, 120, 130, 140, 150, 160, 170, 180, 190, 200, 220, 240, 250, 270, 290 or 300 frames. In one embodiment, the smaller gesture data set includes 45 frames. These 45 frames may include consecutive frames minus any erroneous frames which may have been cut out. The last 15 frames of the 45 frames may be given a special weight.

While the set of 45 frames may be referred to as the slow motion vector set, the last 15 frames may be referred to as the fast motion vector set. These last 15 frames may be counted by the algorithm twice. By counting the last 15 frames twice, the system gives these past 15 frames twice the credence as the other prior 30 frames. However, depending on the embodiment, the weight of the last 15 frames may be any weight between 0 and 100.

SFMV function may comprise the functionality for generating mid-frames by extrapolating data from the 45 consecutive frames. A mid-frame may be generated by SFMV function using 4 order polynomial functions to represent the movement or position of each separate GDF entry through the frames, meaning each dimensional value of each GDF may be plotted using the $4^{th}$ order polynomial function representing that particular GDF dimensional value through time (e.g. through consecutive, or at least chronological, frames). A mid-frame may be generated therefore by calculating each GDF value individually, including, the X, Y and Z dimensional values from the $4^{th}$ order polynomial function. Using this methodology, SFMV function may generate any number of mid-frames. The mid-frames may be positioned within the frame set such that they do not undermine the chronological order. In other words, consecutive order of the frames and mid-frames may be maintained. SFMV function may recreate a sufficient number of mid-frames to have the same number of frames as the larger original set, which the smaller set of gesture data frames was meant to replace. By utilizing this smaller set, SFMV function may implement compression and decompression of data.

Referring now to FIG. 15, an embodiment of slow and fast motion vector representations are illustrated. In brief overview. FIG. 15 may represent an embodiment of the matrix data after polynomial approximations, whereby gesture motion data may be most visible. The first function or equation may represent a general statement saying that with respect to a frame somewhere inside a sample, we take a larger number of frames before that frame point and a smaller number of frames after that frame point and join them into one matrix row.

The second equation may represent a more specific function in which we take the previous 45 frames and join them with the last 15 frames. This process gives us a slower and a faster sets of the gesture data. However, this process is not limited to only two gesture speed lengths, as multiple lengths of varying size may be used.

In one instance, for each joint J represented by the matrices, 4 coefficients may be derived, to approximate each row of the first matrix. Similarly, another 4 coefficients may be derived to approximate each row of the second matrix. Once we have 8 coefficients, corresponding to feature points, per skeleton point of the subject's body per coordinate axis, we have about 24 feature points describing the motion of this skeleton point along all 3 axis. The 4 coefficients may include X, Y and Z values and a time stamp, therefore corresponding to space and time. In some embodiments, only X, Y and Z values may be used, without the timestamp. The two matrices may correspond to the two set of frames, the first matrix corresponding to the 45 frames and the second matrix corresponding to 15 frames.

In one embodiment, the 4 coefficients are X, Y, Z and Timestamp. The row of a matrix may be represented such that each value in the row can have a X, Y and Z components of the GDF inside the matrix. In the instances in which PCA compression has been applied, the three dimensions are then replaced by one dimension after the PCA. However, PCA can be applied prior to this step or after it.

For example, if we have 20 joints represented by "J", we would have 480 GDFs or feature points, to describe the temporal motion of this skeleton at this point in time t. Therefore, if the gesture data frames are compressed using PCA and/or PJVA, such a process may greatly reduce the number of calculations needed.

Referring now to FIG. 16, an embodiment of a temporal vector is illustrated. FIG. 15 refers to a step of generating additional gesture data frame samples from the smaller set of gesture data frames. The newly generated gesture data frames may be saved into database by adding more random starting points to the above slide approach. Each starting, point may refer to a particular position of the mid-frame with respect to other frames having its own position in the chronological order. For example, the value of "i" in FIG. 16 expressions may be changed to generate new samples with different slices of time and use them in the classifier.

In one embodiment, the system combines the all the functionality of the gesture data recognition together with the PCA technique, PJVA technique, SFMV technique and temporal vectors into a single system for detection and recognition of gestures using self-referential gesture data.

The system may grab a frame of gesture data and normalize the GDFs corresponding to the skeleton points or locations of the subject's body, as described above. The system may select and maintain a queue of the past 45 frames. The 45 selected frames may be the smaller set of gesture data frames. In some embodiments, the number of frames may vary to be different from 45. The frames may be ordered chronologically. The frames may also be consecutive, one immediately preceding the other. A $4^{th}$ degree polynomial approximation function may be derived for each GDF for the selected 45 frames.

As a next step, a complete GDF array of floating point coefficients of polynomials derived above may be prepared. The array of the coefficients may correspond to 20 GDFs of each frame, each of the GDFs being, described by $4^{th}$ degree polynomial equation for the selected frame set, each of which are completed for two sets of frames (one for the selected 45 frames and another one for the last 15 frames of the selected 45 frame set), all of which is again done for each of the 3 dimensions (X, Y and Z). Therefore, the complete GDF array may have the size of 20 GDFs*4 degree polynomial function*2 frame sets*3 dimensions=480 GDF entries. At this stage, a vector of length of 480 is derived to denote the temporal motion by considering the selected 45 frames and the 1.5 last frames of the selected 45 frame set. This vector may represent temporal gesture of all GDF points from the selected gesture data frame set.

The system may then compress the complete GDF array by doing PCA and/or PJVA compression. In the instances in which the PC A compression is completed based on a determination that two of the dimensions have a small variance and that one dimension has a large variance, the compressed feature vector may be collapsed to a single row having 30 columns (i.e. the vector of length 30). The single row may represent as single dimension, however the values of this dimension may be transformed from the original dimension values.

The system may then predict the gesture that is being completed by the subject in real time by using random forest classification. In one example, for each gesture data set (sample) the first 45 frames may be skipped. Since the selected 45 frames are used to define the motion to be detected, at the $46^{th}$ frame onwards the system may be able to specify the temporal motion of each skeleton point (each GDF).

For each frame starting from the 46th frame onwards, to prepare a vector describing its temporal motion, the following functions or algorithms may be implemented:

First, using nomenclature define $x_{i,j}$=x coordinate of i-th GSD (skeleton point) in j-th frame. Suppose the current frame is j-th frame. In this instance, the system may specify the motion of each skeleton point at this point in time using the past 45 and 15 points (from the past 45 selected frames, and the last 15 frames of the 45 frames). In some embodiments, the input for skeleton point 0 may be defined as:

$$\begin{bmatrix} x_{0,j-45} & \cdots & x_{0,j} \\ y_{0,j-45} & \cdots & y_{0,j} \\ z_{0,j-45} & \cdots & z_{0,j} \end{bmatrix} \text{ and } \begin{bmatrix} x_{0,j-15} & \cdots & x_{0,j} \\ y_{0,j-15} & \cdots & y_{0,j} \\ z_{0,j-15} & \cdots & z_{0,j} \end{bmatrix}.$$

Using this input, the system may derive 4 coefficients for approximating each row of first Matrix, and another 4 coefficients approximating each row of second matrix. These actions may result in 8 coefficients (GSDs coefficient values) per skeleton point per co-ordinate axis, or 24 GSDs coefficient values describing the motion of this skeleton point along all 3 axis (8 GSD entries for each of X, Y and Z axis).

However, for 20 GSDs, there may be 20 such skeleton points resulting in a total of 24*20=480 feature points describing the complete temporal motion of skeleton at this instant j, to be stored in a feature vector or a GSD In one embodiment, the system may take a maximum of 30000 feature vectors prepared as above for training the classifier. This number may be selected based on the memory and CPU constraints. Then, the system may construct a Matrix where each row corresponds to a feature vector prepared above. The matrix in which each row corresponds to a feature vector or a GDF array of entries, which may be represented as:

$$\begin{bmatrix} p_{45,1} & \cdots & p_{45,480} \\ p_{46,1} & \cdots & p_{n,480} \\ p_{n,1} & \cdots & p_{n,480} \end{bmatrix},$$

$P_{i,j}$=where a feature point j corresponding to Frame i. Each frame is approximated by a 480 length coefficient vector derived in step 2. There are total of n frames in this sample. However, the system may derive feature vector for only 45th frame onwards.

At the next step, the PCA may be implemented over this feature vector matrix, and keep eigenvectors which accounts for 98% variability in the given data. (This may leave somewhere around 30-40 eigenvectors in case of data trained using all the 19 gesture classes.

$$\begin{bmatrix} x_1 \\ x_2 \\ \vdots \\ x_n \end{bmatrix} \mapsto \begin{bmatrix} A_{1,1} & A_{1,2} & \cdots & A_{1,n} \\ A_{2,1} & A_{2,2} & \cdots & A_{2,n} \\ \vdots & \vdots & \ddots & \vdots \\ A_{n,1} & A_{n,2} & \cdots & A_{n,n} \end{bmatrix} \begin{bmatrix} x_1 \\ x_2 \\ \vdots \\ x_n \end{bmatrix} = \begin{bmatrix} y_1 \\ y_2 \\ \vdots \\ y_n \end{bmatrix}$$

Once the collapsing is implemented for the PCA, the compress feature matrix by projecting them into lower dimension space given by the selected eigenvectors above.

Figure 24:
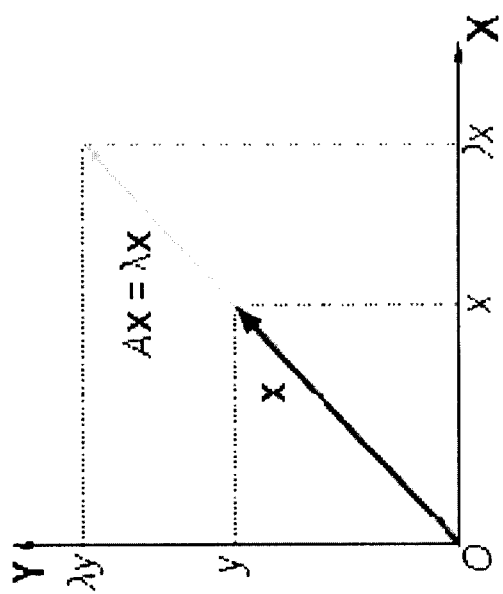
FIG. 24 is a graph illustrative of an eigenvector x and Matrix A.

FIG. 24 is a graph illustrative of an eigenvector x and Matrix A.

Then, the system may identify the max height of trees. A good value for max height of trees may be determined by fixing the number of active variables to square root of the feature vector size and successively trying $2^n$ as max tree height, resulting in outcomes, such as 2, 4, 8, 16, 32, 64 . . . .

Max height may be fixed as the best height determined above and then another sequential search for best active variable counts may be implemented by training a Random Forest with 3, 6, 12 . . . , which is the feature vector length divided by 2. The final random forest result may be trained with best parameters derived as above.

In another embodiment, the system may implement the feature vector calculations as shown below:

Feature Vector:

Step 1=>(Frame i−45, Frame i−44 . . . Frame i)=>Polynomial motion approximation=>A floating point array (Feature Vector)

Step 2=>i takes the value from 1-to-number of frames, however no feature vector is generated for i<=45.

Step 3=>In the example 139 was an instance value of i to explain what previous 45 frames mean.

Set 1 of 45 Frames and Set 2 of 15 Frames:

When preparing the feature vector, motion is approximated in past 45 frame window to capture slow moving gestures, and also in past 15 frames to capture fast moving gestures. So to break down the feature vector preparation step shown above in further detailed manner (Each step changes the data from previous step into the form given in this step).

Then:

Step 1: (Frame i−45, Frame i−44, . . . Frame i)

Step 2=>(Frame i−45, Frame i−44, . . . Frame i)+Frame (i−15, Frame i−14, . . . Frame i)

Step 3=>Polynomial approximation of joint motions in past 45 frames+Polynomial approximation of motion in past 15 frames Step 4=>A floating point array for past 45 frame motion+A floating point array for past 15 frame motion Step 5=>concatenation of both arrays Step 6=>A single floating point array (Feature Vector)

E. Non-Contact, Hardware-Free Display Interface Using Gesture Data

In some aspects, the present disclosure also relates to systems and methods that enable a user to remotely interface with a display screen without using making any physical contact with the display and without using any hardware to interface with the display. In brief overview, the above discussed gesture data may be used to identify movements of the user as the user is pointing to a particular feature on a display. For example, gesture data stored in a database may correspond to a user pointing at a particular feature on a display screen. A machine may have already gone through the process of learning the gesture data for identifying various actions of the user. For example, the gesture data stored in the database of the system may include the gesture data corresponding to the acts in which the user selects particular features on a display screen, moves particular feature from a first location to a second location on a screen, opens a window or closes a window on the screen, opens a link and closes a link, opens a page or closes a page, grabs an object or releases the object, zooms in or zooms out of a particular picture, page or a frame and more. Specific hand signals of the user may be learned by the system to recognize particular sign specific commands, such as the turn on or turn off signals, wake up or go to sleep signals or selection signals. The database may also include any additional gesture data for any particular action which is known in the arts today which the user may perform on a screen including browsing through the menu, opening, and closing files, folders, opening email or web pages, opening, or closing applications, using application buttons or features, playing video games and more.

In addition to the above identified gesture data, the gesture data features may also include gesture data of positions of each of the five fingers on each of the hands of the user. For example, in one embodiment, the gesture data may identify the locations or positions of each of the five fingers of a person's hand with respect to a particular point, such as a person's palm or a wrist of the same hand. In another example, the gesture data may identify the locations of each of the five fingers and the palm or the wrist of the person, each with respect to a different body part, such as the waist of the person. In one example, a user may point at a particular section of the projected display and the pointing movement may be identified as the selection movement. The pointing movement may include pointing with a single finger, with two, three or four fingers or with a whole hand. Open and closed first may indicate a particular action, such as open the selected feature for an open first or close the selected feature for a contracted or tightened fist.

In some embodiments, the gesture data may identify locations of the tips of each of the five fingers. In addition to any of the above identified gesture data features, these palm or hand directed data features may enable the system to identify particular hand gestures which the user may use to indicate the request to open a particular link, close a particular advertisement, move a particular icon, zoom into a particular picture, zoom out of a particular document, or select particular software function to implement. In some embodiments, the system may be configured such that any number of hand, arm or body gestures are learned to enable the user to send specific commands using her hand gestures, body gestures, arm gestures to implement various types of functions on a selected display feature.

In one aspect, in addition to the gesture data matching algorithm, the system may further comprise an algorithm for identifying the exact coordinates on the display to which the user is pointing. In some embodiments, the system uses the algorithm for gesture data matching to identify locations on the screen to which the user is pointing. In other embodiments, a separate algorithm is used for identifying the exact location to which the user is pointing. The algorithm may use the directions and/or positions of the user's fingers, wrists, elbows and shoulders to identify the location on the display to which the user is pointing. The algorithm may also use the position and/or location of the user's eyes to identify the section of the display to which the user is pointing or the user of the screen in which the user is interest.

Referring now to FIG. 7, an embodiment of a system for providing non-contact, hardware free display interface is presented. In a brief overview, a device may be deployed behind a glass panel 8 which may be used to display the image projected from projector 2. The projected area 6 is presented as a dotted line to represent the area covered. A sensor camera 3 is located under the projected area and is connected to the host computer 1. This camera sensor may track both hand and head gestures and calculate where the user who is being recorded by the camera is looking towards a feature on a display and pointing to it. This camera sensor may also include or be connected with a device that extrapolates gesture data from the incoming recorded frames of the user. The data may be transmitted to the computer 1 via a cable represented by number 5. When a user is looking and pointing at one area of the display the host computer 1 may use the gesture data stored previously stored in a database to search and find a particular gesture data that matches the newly extrapolated gesture data of the user standing, in the camera sensor's field of view. Once the extrapolated gesture data is matched against the stored gesture data within a substantial threshold for each one of the gesture data features in the gesture data frames, the host computer 1 may determine that the user's movement or selection is equivalent to a particular selection described by the stored gesture data from the database. The host computer may then further utilize additional data from the camera sensor recorded frames to identify the exact locations where the user is pointing in order to identify the areas selected. The host computer 1 may then change the projected image via a link represented by number 4. The user has the ability to select, from 20 different areas by simply looking and pointing at what they would like to select. In some embodiments, the user has the ability to select from any number of different areas, such as 5, 10, 15, 25, 30, 40, 50, 60, 70, 80, 100, 120, 140, 180, 200, 250, 300, 350, 400 or any number of areas of the display which the user may select.

In some examples of the above described embodiments, the user may point towards a particular advertisement projected on a store window. The graphical image projected onto the store window may be an image of a computing unit, such as a live image of a computer display. The camera sensor recording the user may identify that the user is pointing to the particular advertisement by matching the gesture data being extrapolated from the live feed recording the user to the gesture data stored in a database. Should an algorithm determine that there is a substantial match between the user's extrapolated gesture data set and a gesture data of a movement of the user pointing at a display. The system may also determine the exact location on the store window projected display at which the user is pointing. The system may therefore determine that the user is selecting the advertisement at which the user is pointing.

Alternatively, the system may be set up such that upon identifying the particular advertisement at which the user is pointing, the system further awaits for an additional body movement of the person, such as a more directed pointing at the same advertisement, a particular hand signal with respect to the advertisement, a sign to open the advertisement, a thumbs up, or a wave, any of which may identify the user's intention to open the advertisement projected on the window store display. The camera sensor may record this movement using the same gesture data technique as described above and determine that the user is wants to select and open the particular feature. Upon determining the user's selection, the system may command the projector to project onto the store window the graphical representation of the opening of the advertisement. The advertisement may lead to a web page with additional advertisement information, such as the price of the article being advertised, a video to be played corresponding to the article advertised or any other advertisement related material which may be displayed.

Similarly, depending on the settings, the system may be set up to project a computer display onto a wall of a conference room. The projected display may be a display from a laptop. The user may point at a link for a particular presentation. Using the gesture data matching techniques described above, the system may open the presentation. The user may then give the presentation by controlling the presentation displayed such that the hand gestures of the user are used by the system to determine the signals to open a new presentation slide, move onto the next slide, move to a previous slide, zoom into particular graphs or similar actions. Each hand gesture may be unique to a particular command. For example, one hand gesture, such as pointing, may indicate that the user wants to select a particular feature or a section of the display. Another hand gesture, such as for example two extended fingers up, or a thumbs up, may indicate that the user intends to open the selected feature or window. Another hand gesture, such as a hand wave or a thumbs down, may indicate that the user wants to close the selected feature or window.

Figure 18A:
FIG. 18A illustrates an embodiment of a user using the present systems and methods for interfacing, with a display.
Figure 18B:
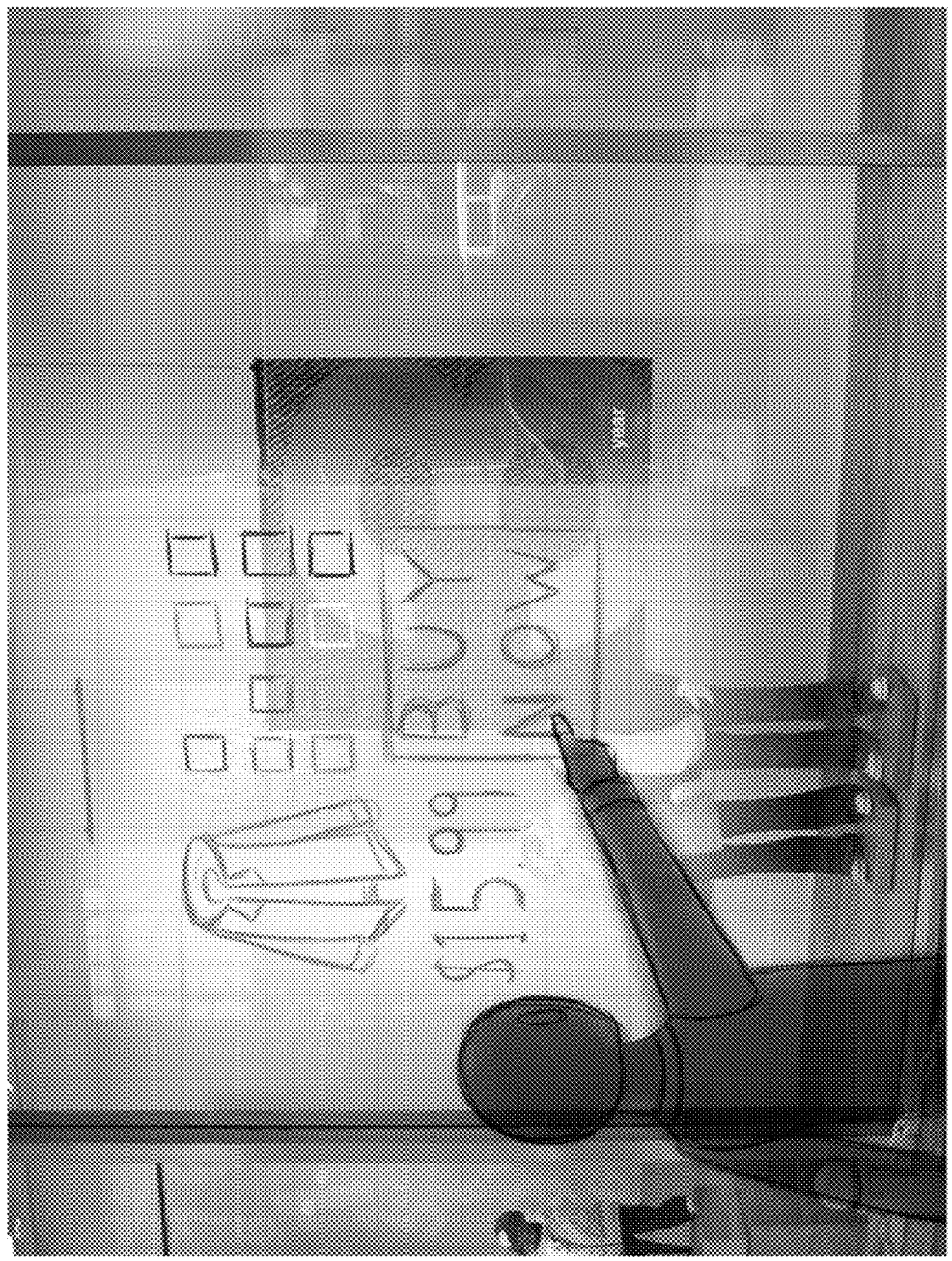
FIG. 18B illustrates another embodiment of a user using the present systems and methods for interfacing with a display.

Referring now to FIGS. 18A and 18B, an embodiment of the systems and methods is illustrated as deployed, and used on a store window. In brief overview, a user passing by a store window may notice a projected message on a window of the screen. FIG. 18A illustrates a store window on which a projected message reads "point to shop". The user may decide to point at the message. The system utilizing the gesture data extrapolated via the camera recording the user in real time may identify via a gesture data matching technique described earlier that the user is pointing at the message. In response to the determination, the system component, such as the server 200 or the client device 100 may send a command the projector to update the projected display such that the link associated with the message is displayed. As illustrated in FIG. 18B, the projector may then open a window in which the user may view a selection of goods, such as articles of clothing for example, which the user may select and get informed about the prices. The user may keep selecting and opening different links displayed on the store window until the user decides to buy an article in the store or decides to simply leave.

Figure 19A:
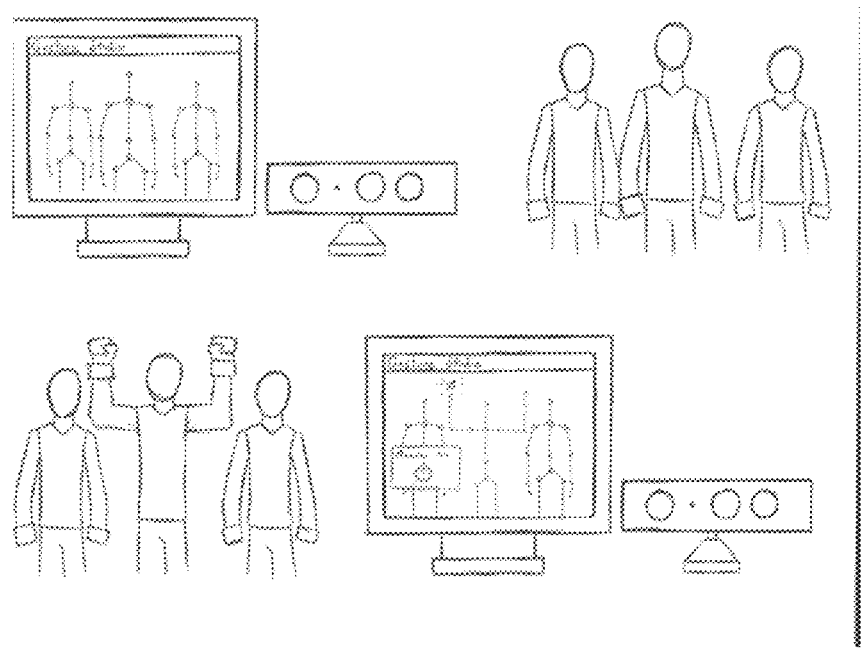
FIG. 19A schematically illustrates a group of users standing in a view of a camera detector and gesture data captured by the detector in accordance with an embodiment of the present teachings.

In some aspects, the present disclosure relates to systems and methods of directing a mouse using a non-contact, hardware free interface. Referring, now to FIG. 19A, a group of users standing in a camera detector 105 view is illustrated. The top portion of the FIG. 19A shows the users illustrated on the right hand side and the gesture data captured by the detector 105 in accordance with the aforementioned techniques displayed on the monitor on the left side of the top part of FIG. 19A. Gesture data points illustrate locations of joints, though the data may also be illustrated using the aforementioned joint velocity, joint angles and angle velocities.

The bottom part of FIG. 19A shows one of the users raising his arms, such that both arms make right angles with respect to the shoulders. This particular motion may be configured to mean that the mouse is now turned on, and that this particular user will be directing the mouse. This motion for activating the mouse may therefore be assigned a particular meaning, and a function to turn the mouse function on. Upon recognizing the gesture illustrated in the bottom of FIG. 19A, the system may identify and determine that the mouse gesture has been detected. In response to this identification of the gesture and the determination that the given gesture is a "mouse on" gesture, the system may trigger a function to turn on the mouse function.

The mouse function may enable a mouse to be displayed on the projected surface with which the users are interacting. The user that has identified the mouse function may then be assigned the mouse functionality enabling this user to operate the mouse.

Figure 19B:
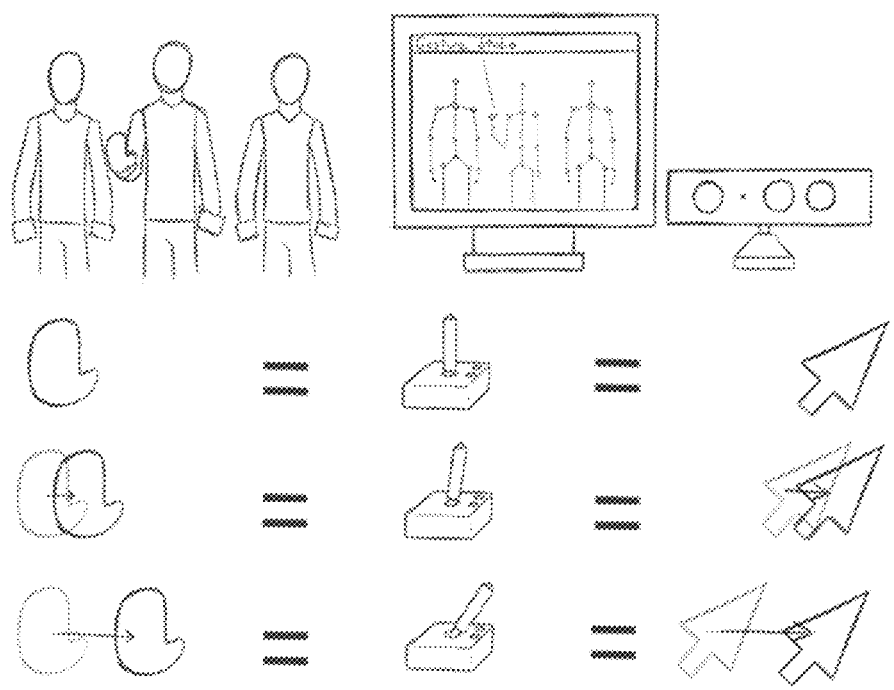
FIG. 19B schematically illustrates the activation and operation of a mouse by a user in accordance with an embodiment of the present teachings.
Figure 19B:
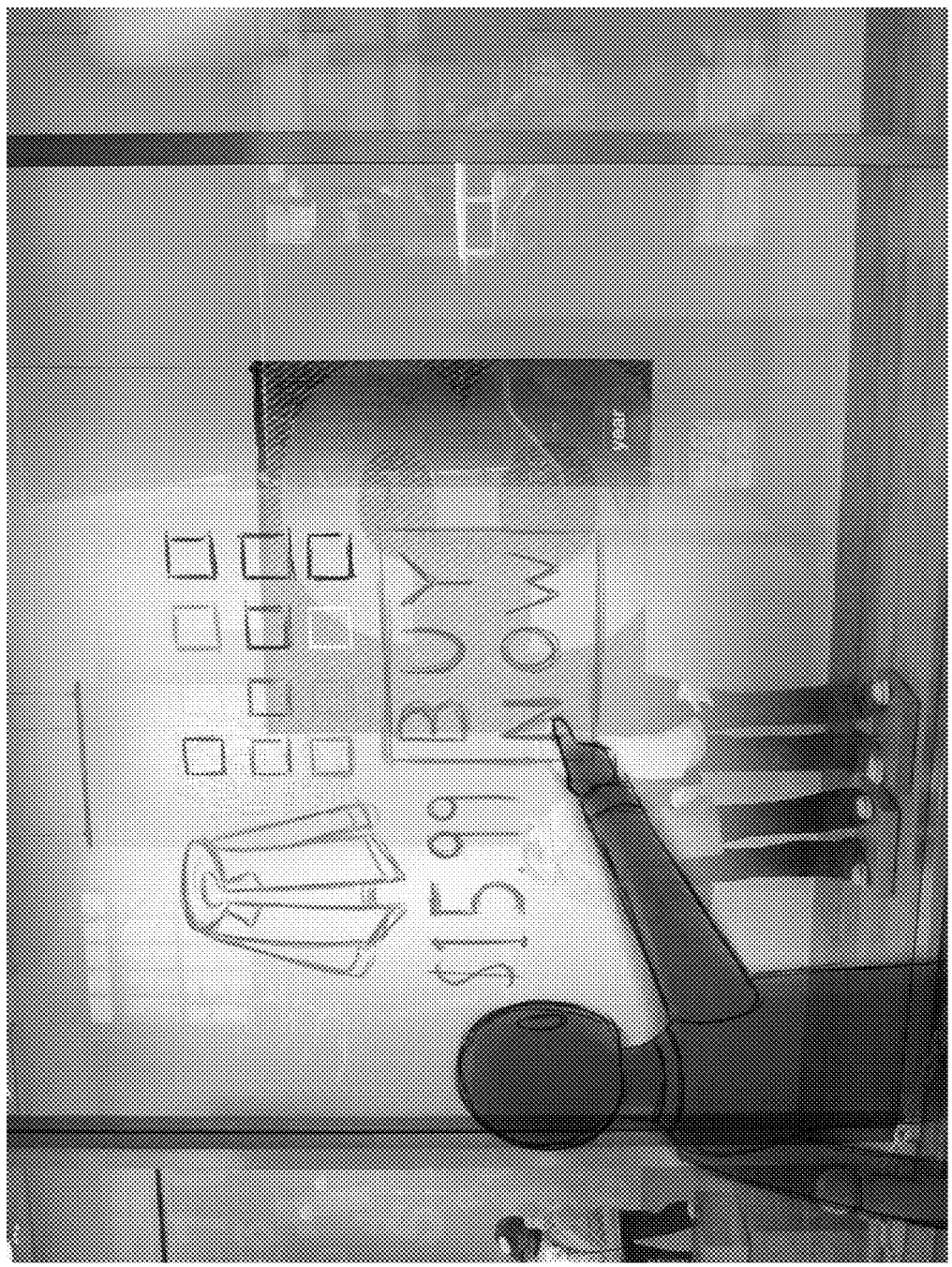

FIG. 19B illustrates the user that has activated the mouse now further operating, the mouse. The movement of the user with his right hand towards the right side slowly may trigger a slow movement of the mouse to the right. Similarly, a faster movement of the user towards the right side may correspond to a faster movement to the right. In some embodiments, the user may use a left hand instead of the right. The user may move the mouse left or right, up or down to select any projected image or object.

Figure 19C:
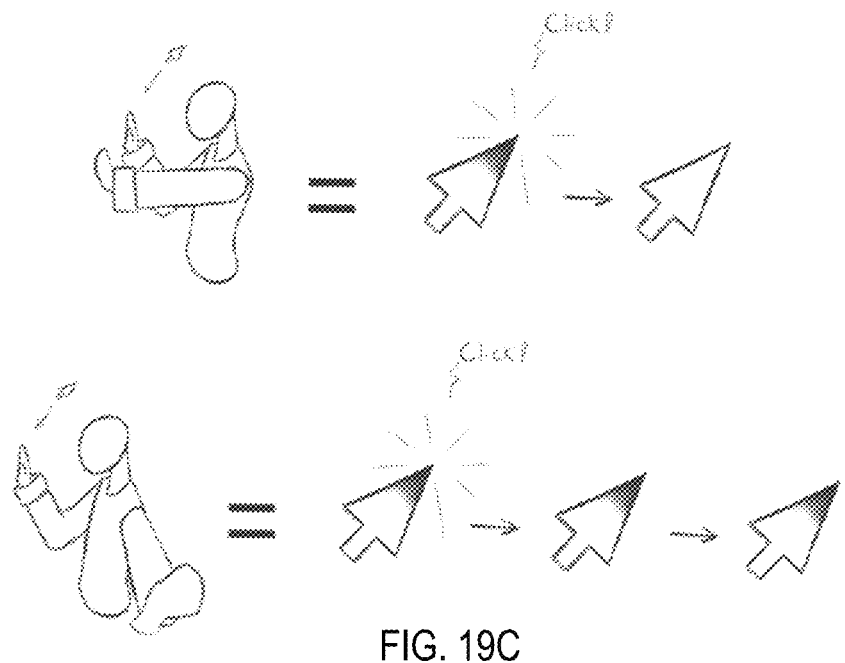
FIG. 19C schematically illustrates a user performing a "mouse click on" gesture or motion.

The top portion of FIG. 19C illustrates the user gesturing a "mouse click on" gesture or motion. The "mouse click on" motion may involve any gesture Which the user may perform, such as for example the left hand of the user extended forward. Upon identifying and determining that the user has performed the "mouse click on" gesture, the system may perform the mouse click function on the particular location on which the user has previously placed the mouse. In some embodiments, instead of the click gesture, the user's movement illustrated in top portion of FIG. 19C may be any movement which causes the system to click down onto a mouse button, without releasing the button. The mouse click function may involve selecting the particular location on the projected display screen.

The bottom part of FIG. 19C illustrates the user gesturing a "mouse click off" gesture or motion. The "mouse click off" motion may involve any gesture which the user may perform, such as for example the left hand of the user extended left away from the body. The "mouse click off" gesture may be done by the user once the user has performed a "mouse click on" gesture and dragged a particular object to a location in which the user wants to implement a "mouse click off". For example, the user may utilize the mouse click on and off gestures to click onto an object and to drag, the object to a specific folder or a location, such as for example a store "cart" such as the virtual shopping carts in web pages selling goods on the internet.

Figure 19D:
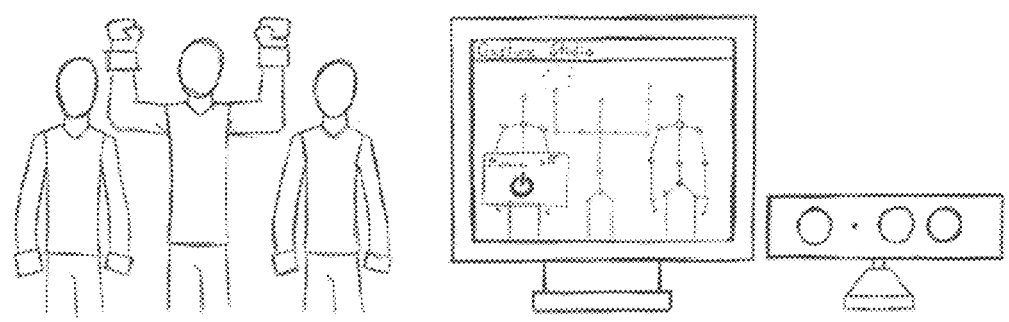
FIG. 19D schematically illustrates a user performing a "mouse off" gesture.

Once the user has completed the functions using the mouse, as illustrated in FIG. 19D, the user may perform the "mouse off" gesture to indicate to the system that the user is no longer controlling the mouse. In response to recognizing the gesture by the user, the system may turn off the mouse function.

Figure 19E:
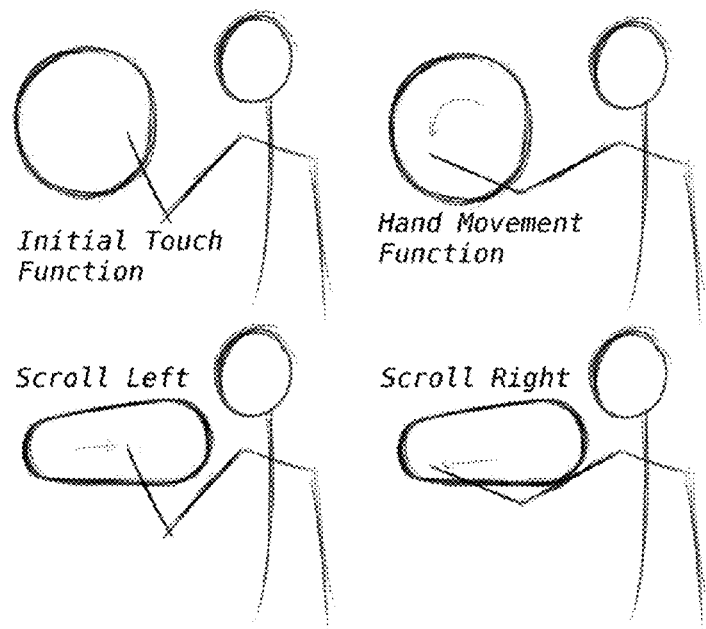
FIG. 19E schematically illustrates four different gestures, each of which refers to a separate action.

Referring now to FIG. 19E, the system may enable a user to operate various user movement objects. For example, FIG. 19E illustrates four different gestures, each referring to a separate action which the user may command in order to operate user movement objects. In brief overview, the top left gesture in FIG. 19E shows a user in a field of view of a detector 105, such as a camera touching an area which corresponds to an "initial touch function". The user movement object, in this case, is the area within which the user may touch in order to gain control over an operation. The initial touch function area may be an area which the system simply assigns with respect to a position of the user, and which moves together with the user. Alternatively, the initial touch function area may be an area which is stationary area. Initial touch function area may be displayed on a projected screen, and the user may see it and direct her hand towards the initial touch function area and perform a "touch" movement with his/her hand in order to initiate a function. The initial function area may then trigger a function that turns on the functionality for the user to operate a mouse, perform hand movements, scroll left, right, up or down.

The right top gesture of the FIG. 19E shows the user using, user movement object of the hand movement function. The hand movement function may enable the user to move a mouse or a selector across the projected screen. In one embodiment, the user may use a mouse across the store window to select particular objects on the store window.

The left and right bottom gestures correspond to scroll left and scroll right user movement objects, respectively, and pertain to the user's ability to scroll through various displayed objects by scrolling. The hand movement to the left may indicate the scroll to left, while the hand movement to the right may indicate the scroll to the right. It may be obvious to one of ordinary skill in the art, that any different movement may be assigned a scroll movement, just as it may be assigned a mouse click movements or any other movement. Similarly, the user may be given an option to scroll up or down.

Figure 19F:
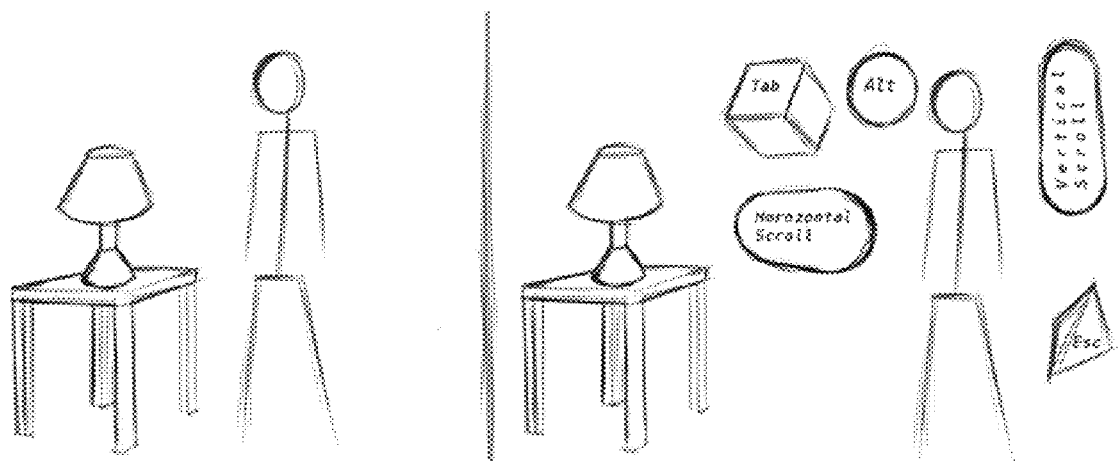
FIG. 19F schematically illustrates a user standing in a room, where the left side of the figure shows the user surrounded by virtual user movement objects.

Referring now to FIG. 19F, the left side drawing illustrates the user standing in a room, whereas the right side drawing illustrates the user given the option to operate various user movement objects. The left hand part of FIG. 19F drawing shows the user as recorded in reality. The right hand part of FIG. 19F drawing shows the user surrounded by virtual user movement objects which the system provides to enable the user to operate various functions on the projected screen or display. The user may simply touch the virtual area, such that the system recognizes the movement of the user's hand onto the particular given area to trigger the particular function of the user movement object. As illustrated, user movement objects of FIG. 19F include a "tab" user movement object, which may perform the same function as tab key on a computer keyboard, "alt" user movement object, which may perform the same function as alt key on a computer keyboard, and "esc" user movement object which may perform the same function as "esc" key on the computer keyboard. In addition, the user may also be provided with user movement objects of vertical scroll and horizontal scroll. By placing his/her hand on any of these virtual objects, the user may activate the user movement objects and may operate any of the mouse, scroll, tab, alt and escape functions which the user may be able to use on a personal computer.

Figure 20:
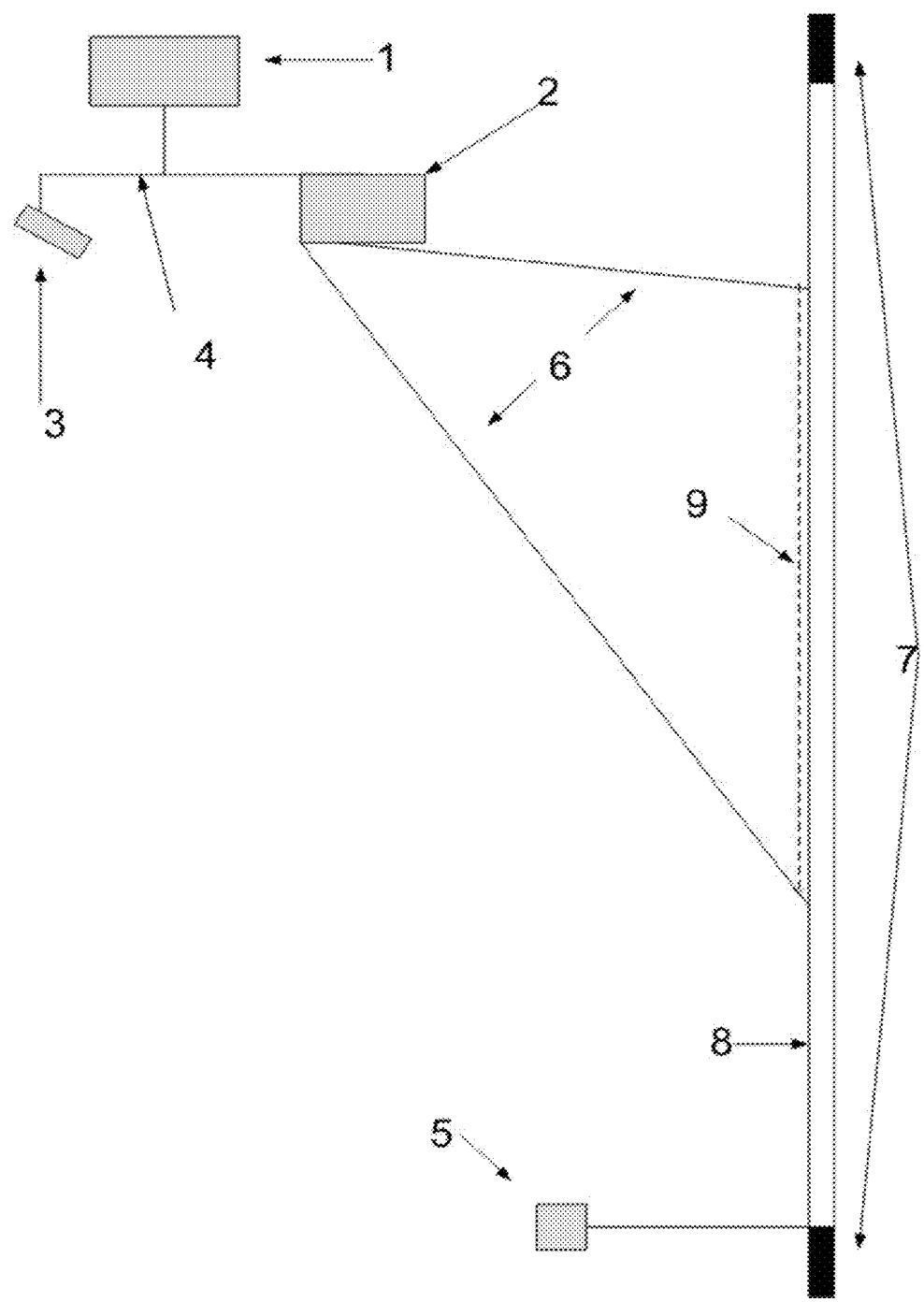
FIG. 20 illustrates is an embodiment of a block diagram of a system for providing non-contact, hardware-free display interface in a shower.
Figure 21:
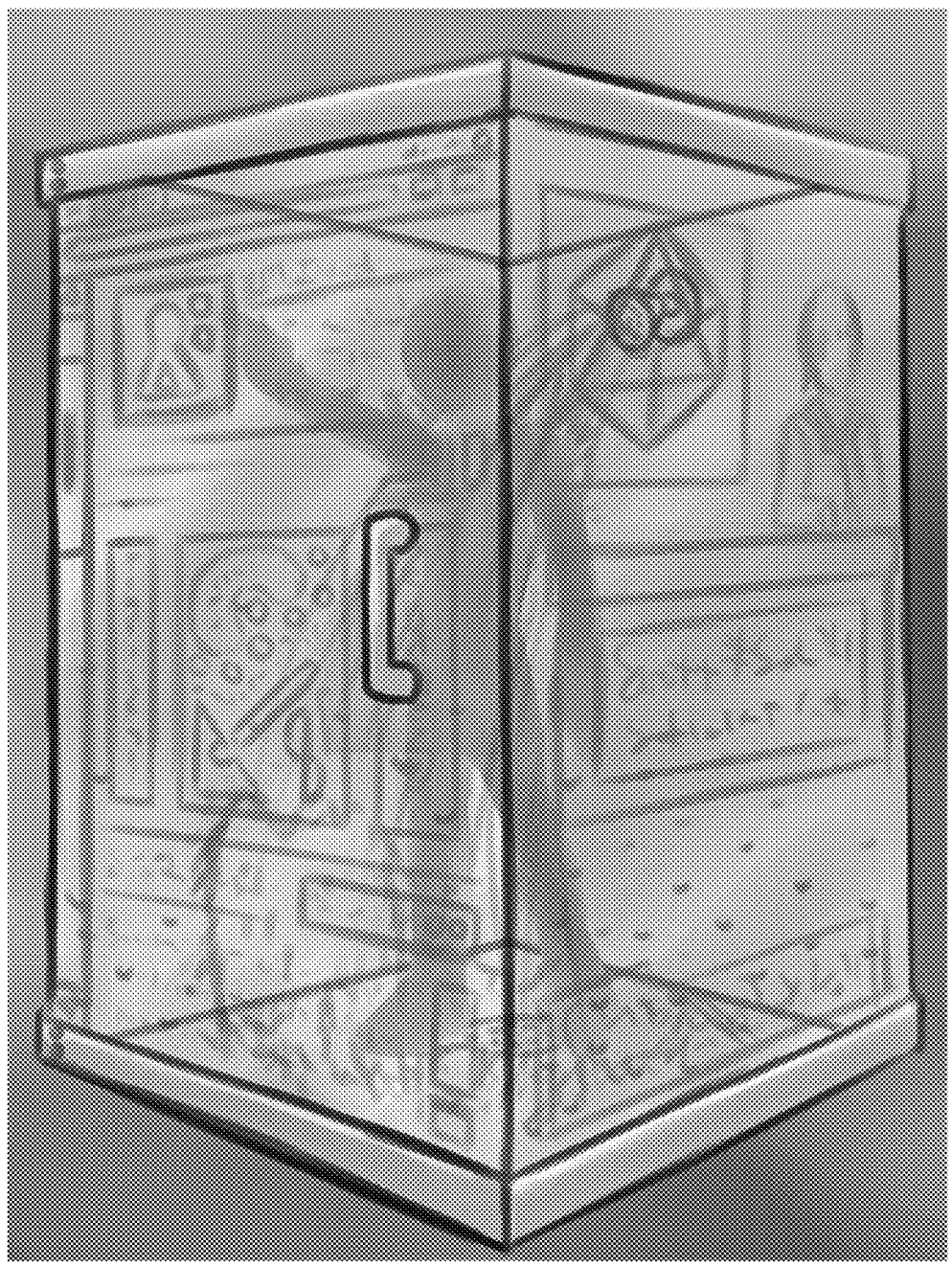
FIG. 21 illustrates an embodiment of a user using the present systems and methods to inter ace with a display in a shower.

Referring now to FIGS. 20 and 21, an aspect of the present disclosure relating to systems and methods for providing a new medium for information in the form of an interactive display unit inside a modern shower installation is illustrated. The shower, such as the shower displayed in FIG. 21, may comprise shower walls which may be made out of any material, including glass and onto which a projector may project video features, thereby forming a display on the walls of the shower with which then the user may interface. FIG. 20 illustrates a block diagram of an embodiment of a non-contact, hardware free display interface system installed inside the shower. The user inside a shower may use the interface and control a video screen using the above-described gesture data based techniques. A camera sensor may be installed inside the shower to enable or provide extrapolation of the gesture data from the user in the shower. Information can be digested as well as shared while inside or outside a shower. For example, a user may be using a shower and may be able to interact with a video feed projected onto the one or more walls of the shower using the gesture data matching technology. As a projector projects the video feed onto the wall of the shower, the system may identify movements of the user matching particular machine learned movements stored in the database as the gesture data to identify that the user is pointing to and/or selecting a particular feature on the display. The system may then update the screen to reflect the user's selections. The user may therefore be able to use the present non-contact and hardware-free display interface technology to access the interact, view, read and write emails, and access any web page, any application on a device or use any software that might otherwise be accessible via a personal laptop computer or a tablet.

Referring now to FIG. 20 and FIG. 21 in a greater detail, the system device is deployed in or around a shower. Similarly, the system device may be deployed in front of any surface which may be used as a screen for a projected image, such as a wall, a window, a piece of fabric inside of a room, or outside on the street. In one example, some features of the system are surrounded by a smart glass panel 8 which may be used to display the image projected from the projector 2 which is located behind the smart glass window 5. The lasers 7 may be projected from under and over the smart glass 8 from the top and bottom of the screen and may cover the projected area 9 (drawn as dotted lines to represent the area covered) to create a multi-touch surface on the window 8. Window can be made of glass or plastic and may be covered with an anti-fog coating to prevent fogging and ensure a visible image. A camera 3 which may be connected to a host computer 1 via a connection represented by 4 may be attached on the ceiling in from of the smart glass window. The camera may detect when the screen is touched or when the user points to a particular feature on the screen. The camera or another component of the system may use the live feed of the user from the camera to identify and send this pointing or selection information to the host computer 1. Projector 2 which may also be connected to the host computer 1 via connection 4 may project information onto the smart glass 8. The smart glass may be activated by switch number 5 which may be directly connected to the glass. When the switch 5 is active the glass 8 may be fully polarized and opaque and when it is deactivated by switch 5 the glass may appear to be transparent.

In one embodiment, after the user enters the shower the user may touch or activate a particular sensor or a switch to activate the display. In some embodiments, the user may touch a resistive/capacitive touch sensor on the glass wall of the shower to activate the display. The user may then be able to use an infrared pen to interact with the display by simply moving the pen over the glass to move the cursor and pressing against the glass to click. In other embodiments, the user may point to the glass without touching it. An infrared camera, attached to the device may be configured to detect the location of the pen on the glass using the above identified gesture date matching. If the projector is projecting onto the shower door, there may be a switch attached to the shower to detect whether the door is closed before projecting to ensure the projector will not attempt to project onto the user. The projector may be positioned inside or outside of the shower to ensure a clear line of sight which will not be intercepted by the user. Similarly, the camera sensor may be positioned at a particular location that ensures correct and accurate view of the user.

F. Systems and Methods of Adjusting Gesture Recognition Sensitivity

Referring now back to FIG. 8A, an embodiment of a gesture data set that may be used for sensitivity adjustments is illustrated. For example, FIG. 8A shows a data set which may be used for recognizing a particular gesture. For example, the system such as the remote client device 100 or a crowdsourcing system 200, illustrated in FIGS. 2 and 3, may include a software interface that enables the user to modify or configure the sensitivity of the recognition for one or more gestures. The system may include the interface which may be taught or programmed to recognize a particular gesture or a movement at any range of sensitivities and using any number of frames of gesture data. The user interface may include various range options and settings for the user to specify the number of frames to be used, to select which frames to be used, to average frames of data and select the threshold values. As illustrated in FIG. 8A, in one instance, the gesture data may include around 300 frames and each frame may include multitude joint data points, such as for example, right foot, right knee, left wrist, left hand, and more. The system may be configured or adjusted to use different sizes of data sets to recognize the gesture.

For example, in some embodiments, a gesture may be recognized with a great accuracy using a set of 300 frames of data. In such instances, sensitivity may be increased. For a specific application, a user may need to recognize the gesture rather more quickly, despite any possible trade-offs between the speed of the recognition and accuracy, due to the fact that sometimes more frames of data in a recognition data set may result in a higher overall accuracy of the recognition.

In one example in which the user may need a faster recognition, the sensitivity may be reduced and a fewer than 300 frames may be used. For example, a subset of 10 frames of gesture data may be used for a quicker recognition, or even just a single frame. In some embodiments, the reduced data set may include any one of 3, 5, 7, 10, 15, 20, 30, 50, 70, 90, 120, 150 or 200 frames. In other embodiments, a user may need to maximize the sensitivity to increase the accuracy of the prediction, in such instances, the system may use a larger set of gesture data which may include 350, 400, 600, 800, 1000, 1500, 2000, 3000 or even 5000 gesture data frames. Based on the user's desire to prioritize accuracy or speed, the user may configure the sensitivity of the system to utilize a larger or a smaller subset of the gesture data, respectively. Therefore, when a user wants to maximize the accuracy, the system may use a larger subset of gesture data frames or a larger number of data frames to recognize a gesture or a movement. Similarly, when a user wants to maximize the speed, the system may use a smaller subset of gesture data frames or a smaller number of data frames to recognize the gesture or a movement.

When a system is learning a gesture, the system may configure the gesture data to allow the user to use the particular data for a particular gesture either to maximize the speed or accuracy. For example, a particular gesture data may include a total set of 30 frames of gesture data. While configuring the learned gesture data, the system may enable any range of sensitivities or speeds to be utilized during the recognition phase. The speed at which the gesture is to recognized may be adjusted by the number of frames of gesture data that may be used. For example, if the system is using 30 frames to make a guess instead of just one, the system may divide the 30 frames into 3 sets of 10. In such an example, the system may select a first set of 10 frames, then a second set of 10 frames and then a third set of 10 frames, and create average frames for each of the three sets. This way, the system may utilize several versions of the frame average, one for each of the three sets. The system may then average the averages of each of three sets to create the final average result frame representing the particular gesture. The system may then create the thresholds using, this one single final average result frame. If, for example, the threshold is set to 2% from each of the gesture data value points within the final average result frame, the system would be able to identify a gesture based on only a single result. This methodology may sometimes result in a reduced accuracy of the gesture detection. However, it may be useful for recognizing, gestures where a speedy recognition and identification is most important.

Alternatively, when the importance is placed on accuracy and not on the speed of the recognition, the system may simply utilize all 30 frames to recognize the gesture. In additional embodiments, the system may operate by recognizing gestures using a single average result frame first, and then follow up by checking if the match of the single average result frame also correspond to the corresponding, larger gesture data set, such as all 30 frames in this instance. This way the system may quickly identify a gesture, and then go back and double check if that gesture is really correct using a more accurate, larger, data set.

G. Systems and Methods of Improving Detection by Personalization of Gesture Data In some aspects, the present disclosure relates to systems and methods for personalization and customization of the database gesture samples. Database gesture samples may refer to gesture data sets stored in a database which may then be used to be compared against the incoming newly generated gesture data frames which represent the gestures that the system need to identify. The system may identify the gestures represented by the newly generated gesture data by comparing the database gesture samples (also referred to as the gesture data sets) against the new gesture data sets of the incoming data.

Personalization or personal customization of the gesture samples stored in the database may be done by the system in order to modify the gesture samples such that they are more suited to the user for whom they're intended. In other words, if a gesture sample includes a gesture data set comprising frames of data representing a user pointing a finger at a direction, upon determining that the subject implements the same function slightly differently, the system may modify the gesture sample to more closely resemble this movement or pose by the subject. Therefore, as the system observes movements of the subject and identifies that the subject's movement vary slightly from the gesture samples stored in the database, the system may modify the gesture sample to more closely mimic the way the subject does that specific movement.

A personalization function may comprise the functionality to determine the differences between the gesture sample stored in the database and the newly acquired gesture data representing the subject's movements. The personalization function may, in response to the determination that there are the differences and in response to identifying, what those differences are, modify the gesture samples in the database to more closely resemble the subject's movements.

In one example, the system may record and observe the subject walking down the street. Upon correctly identifying the movement and determining that the subject is walking, the system may identify changes between some GDFs of the gesture samples in the database and the GDFs from the newly generated gesture data representing the subject walking. These slight changes in some entries may include changes or differences, such as for example the differences in the GDF entries of the right elbow in the Y axis, or the GDF entry of the left knee in the Z direction, or the GDF entry of the right shoulder, etc. These slight changes in GDF entries between the gesture sample stored in the database and the newly generated gesture data may provide signature for more accurately identifying the walk of this particular subject in the future.

In some embodiments, the gesture sample may be replaced or updated with the new gesture sample such that the gesture sample for walking is modified to more accurately suit this particular subject. In other embodiments, the original gesture sample may be maintained and not replaced in the database, but instead the new gesture sample may be added to the database to help identify this specific way of walking in addition to the original walking gesture sample data set. The system may then be able to identify not only that a subject is walking, but also that a particular subject is walking, all based on the subject's walk patterns. In other words, the system may then, during the process of identifying a movement of the same subject in the future, identify the subject himself by his specific walking, pattern. As most people walk in a unique manner, this specific subclass of walking that may be stored in the database may enable the system to identify a particular individual among a group of individuals.

In some embodiments, the system may determine that the subject is walking by comparing the newly generated gesture data of the subject's walking movement with the gesture sample stored in the database. The system may determine that some GDFs of the gesture sample are slightly different from the GDFs of the newly generated gesture data using variance analysis or comparing average GDF entries and determining that a few entries are substantially different. In response to such a determination, the system may modify the gesture samples stored in the database to correct those GDFs in order to personalize the gesture samples to more closely resemble the movements and gestures of the subject.

In another embodiment, a subject may be recorded by the system while running. The system may first correctly identify that the subject is running using the methodology described above. However, in addition to this determination, the system may also determine that the running motion of the subject differs in terms of some GDF entries with the running gesture sample in the database. Personalization function may then identify the GDF entries in the matrices of the gesture sample frames which need to be modified and modify those gesture sample frames to more closely suit the subject recorded. Then, the personalization function may either replace the original running gesture sample with the newly created, modified, running gesture sample, or alternatively, the personalization function may leave the original running gesture sample in the database and simply add an additional running gesture sample, personalized to this particular subject's way of running.

Determination with respect to which GDF entries inside the frames to modify may be done based on any number of thresholds. In some embodiments, personalization function may use variance thresholds to identify which GDFs to modify. In such instances, a mean and variance for each particular GDF entry through the frame set of the gesture sample may be determined. Alternatively, a mean and variance for each particular GDF entry through the frame set of the newly generated gesture data set may be determined. Personalization function may then determine which GDF entries fall a sufficient amount outside of the variance range. In one embodiment, personalization function may set the threshold at two sigma. In such au embodiment, all GDF entries whose variance from the mean (the mean of the GDF entry from either the gesture sample from database or the newly generated gesture data set) is greater than two sigma (or two standard deviations away from the mean), may be replaced by the new GDFs from the new gesture data set. Naturally, the threshold of two sigma may be replaced by any variance threshold value that may any multiple or fraction of sigma, including: ⅛ sigma, ¼ sigma, ½ sigma, ¾ sigma, 1 sigma, 1.5 sigma, 2 sigma, 2.5 sigma, 3 sigma, 4 sigma, 6 sigma or 10 sigma. Once the GDF values outside of the variance range are identified and modified and/or replaced, the newly generated gesture sample may be stored in the database.

H. Systems and Methods of Detecting Interpersonal Interaction Using Gesture Data In some aspects, the present disclosure relates to systems and methods of detecting interpersonal interaction between subjects. Utilizing the aforementioned techniques, the present disclosure may identify movements or gestures of two or more individuals simultaneously. The movement or gesture detection may be implemented using self-referenced, or anchored, gesture data sets. Since the present disclosure detects movements and gestures using a relatively small set of data samples, e.g. only several GDFs corresponding to joints and/or other particular locations of the human body, the processing resources used for the herein described determinations may be much less demanding than the processing power of other conventional gesture movement detection systems. Because of this advantage in terms of using smaller data sets which improves the processing, speed, the presently described systems and methods may simultaneously determine multiple gestures and movements.

In one embodiment, a camera extrapolating gesture data, such as the detector 105 of a device 100 or server 200, may be recording an area in which multiple subjects are located. The camera may record and acquire a sequence of frames of gesture data and from these acquired frames the system may further extrapolate gesture data sets for each individual subject in the camera's field of view. Since the present technology relies on GDFs corresponding, to joints and particular portions of the human body, the system may simply increase scale up to accommodate all of the subjects in addition to the first subject. Accordingly, regardless of bow many subjects the camera records, the system may use multiple instances of the above identified concepts to simultaneously determine gestures of multiple subjects. Therefore, if the camera has acquired 100 frames of vesture data while recording four individuals, the system may extrapolate four separate sets of gesture data each comprising a100 frames. Alternatively, the system may extrapolate a single set of gesture data in which all four subjects will be processed and distinguished from one another.

The system may then use the Random Forest Selection methodology to identify the movements and/or gestures of each of the subjects substantially simultaneously. The system may then employ an interpersonal interaction function (IIF) to determine the nature of the interaction, if any, between the four subjects recorded.

Interpersonal interaction function (IIF) may comprise any functionality having one or more algorithms for utilizing the recognized gestures to between two or more subjects to determine the nature of the interaction of the subjects. IIF may utilize the database storing gesture samples as well as a separate, additional database storing gesture samples of interpersonal interaction. IIF may then, upon identifying gesture movements or motion of each subjects individually, further determine their movements or motions as a group.

In one example, upon determining by a system that subject 1 is punching, while subject 2 is ducking down, the IIF may determine based on these two individual actions of the two subjects as well as their approximation and position with respect to each other that the two subjects are involved in a fight. In another example, upon determining that subject 1 is running towards point A and that subject 2 is also running towards the same point A, IIF may determine that both subjects are running towards the same point. Based on other movements of the subjects, as well as the location of the point A, the IIF may further determine that both subjects are running after a ball while playing soccer. In another example, upon determining that subject 1 is talking and that subject two has turned towards a side, the may determine in response to the locations and orientations of the subject 1 and subject 2 that subject 1 has said something to subject 2 and that subject 2 has turned towards subject 1 in response to the said words from subject 1.

As shown in these brief examples, IIF may utilize the previously discussed gesture detection functions to provide another layer of gesture detection, i.e. gesture interaction between two or more subjects simultaneously recorded by the camera. In some embodiments, IIF may conduct these determinations based on frames of two subjects from two separate cameras.

In one aspect, the present disclosure relates to systems and methods of detecting cheating at a casino gaming table. For example, the system may be programmed to include data sets pertaining to various gestures and movements that are indicative of cheating at a game in a casino, such as a card game, or a roulette game, or any other game. The system described herein may utilize gesture data of joints or human body parts to observe behavior or movement of players at a casino gaming table. Gesture data may be customized to also include positions of eye pupils to indicate locations towards which the user is looking. Gesture data locations of human pupils may be referenced with respect to a human nose, or a point between human eyes, to more accurately portray the direction at which the object is looking. Gesture data may also be customized to include human hands, including each of the finger tips and tips of the thumbs on each hand. The locations of the finger tips and thumb tips may be done in reference to another portion of a hand, such as a palm, or a joint such as a wrist of that particular hand. Gesture data may further include the mid sections of the fingers, underneath the tips, thereby more accurately portraying the motions or gestures of the human hands. Gesture data may also include the aforementioned joints or human body parts, such as those described by FIG. 8A.

Using the techniques described herein, the system, such as the device 100 or a server 200, may utilize a camera, such as a detector 105, to view multiple players at a gaming table simultaneously. Gesture data may then be extrapolated and the gesture data of each of the players may be processed individually with respect to the learned gesture data stored in the database 220. Sensitivity of the detection or recognition may be adjusted to more quickly or more accurately focus on any particular motion or a movement of a casino gaming player.

A further configuration of the system may be done to allow the system to count and keep a track of locations of non-human objects, such as the chips on the casino gaming table. For example, the system may be configured to identify and recognize a casino chip, as well as to keep track of the amount of chips in front of a player. Should a player suddenly and illegally remove chips from the pile, the system would be able to recognize the motion of the user, as well as identify that the chips are now missing.

Figure 22A:
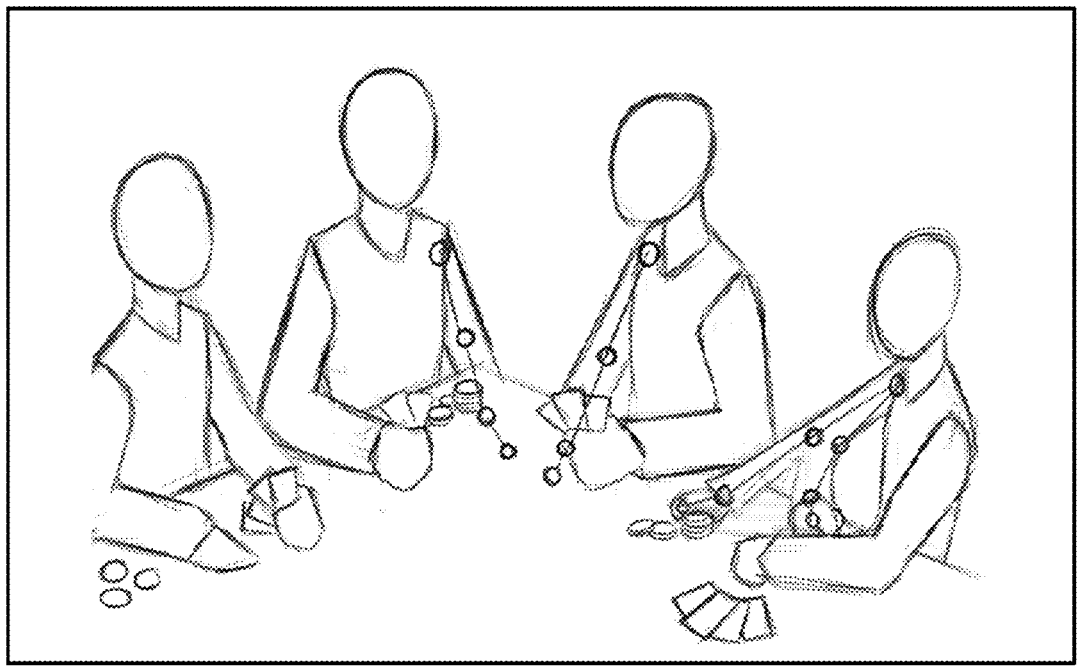
FIG. 22A schematically illustrates an embodiment of a frame of data captured by a camera detector in accordance with the present teachings filming a casino gambling table.

Referring now to FIG. 22A, an embodiment of a frame of data captured by a camera detector 105 filming a casino gaming table is illustrated. In brief overview, in this embodiment the system is already taught gestures and motions. The system may now include a database which is filled with numerous gesture data sets for identifying motions and gestures. The system may keep processing the incoming stream of frames of data checking the extrapolated gesture data between the players to see if the players are interacting. The system may also identify if the players are looking at each other, if they are looking at other players, if they are turned towards each other or other players, if they are signaling by hands or shoulders or body postures. The system may therefore observe the behavior and movement of the players bodies, hands, eyes and even lips to see if the players are making, any verbal statements. Gesture data may be configured to also include data points for upper and lower lip, which may be anchored or referenced to another part of a body, such as a nose or chin for example. In such instances, gesture data may include multiple reference points, not only one. In such instance, gesture data, such as the one described in FIG. 8A may be referenced with respect to a body waist point, while the gesture data for hands may be referenced by another anchor point, such as a wrist or a palm. Similarly, gesture data for lips and eyes, or eye pupils, may be referenced to another anchor point, such as a nose. Therefore, gesture data may include one or more reference points.

Referring back to FIG. 22A, a frame of data recorded by a camera detector 105 captures four players at a casino gaming table. The captured data records the four players sitting and playing a card game along with a set of chips on the table. The captured data may record the players' lips positions and eye pupil positions with respect to a reference point, and further record hand movements, shoulder movements and movements of other body pans. Since the gesture data in this instance does not care particularly for the positions of body below the waist, the gesture data may be compressed using PJVA to remove gesture data points below the waist as they would not be particularly useful. Similarly, the system may also use PCA compression as well.

Figure 22B:
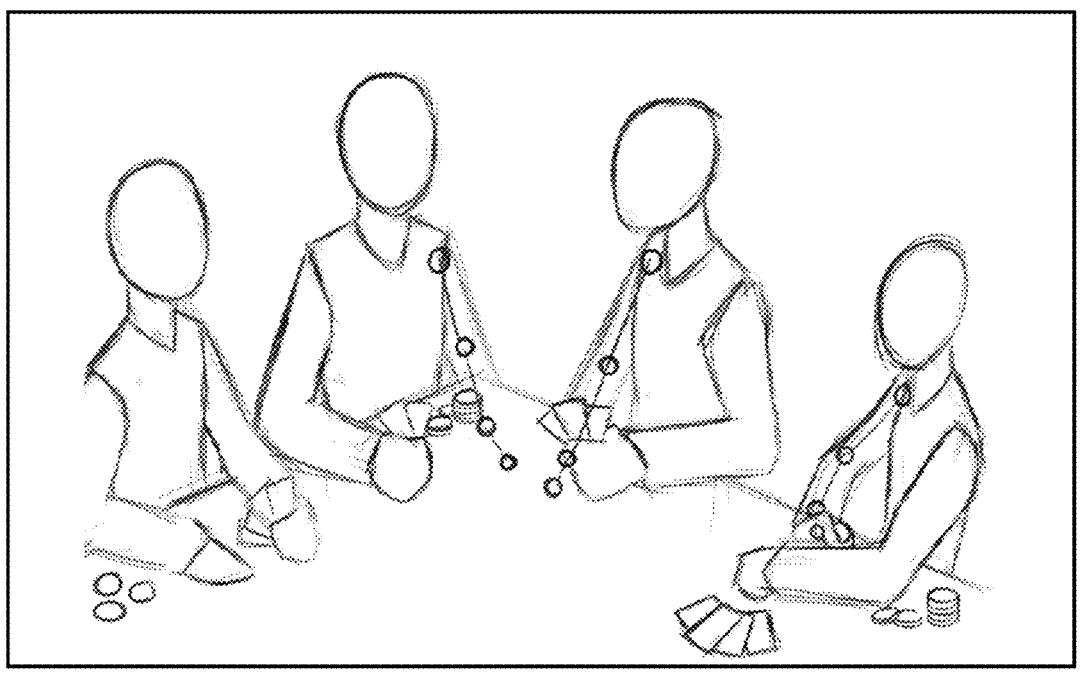
FIG. 22B schematically illustrates another frame of data captured by the camera detector of the table shown in FIG. 22A.

Referring now at FIG. 22B, a frame of data recorded by camera detector 105 captures the four players were the rightmost player has removed the chips from the table. Gesture data from the captured frames may be matched by the system to the movement of grabbing and pulling the chips from the table and determine that the rightmost player has pulled the chips towards himself. This particular example illustrates the kinds of determinations that the system may implement in a casino.

Similarly, the system may identify other more interactive motions, such as the players waving to each other, hand signaling, hand shaking, approaching the chips, approaching the cards, holding the cards or any other movement or gesture which the casino may be interested in monitoring at a gaming table.

I. Systems and Methods of Distributing Gesture Data Samples via a Web Page

Present disclosure further relates to systems and methods of distributing, via a webpage, gesture data samples to be stored in the gesture sample databases. Gesture data samples may comprise gesture data sets of a learned movement which users may simply download via a web page and download into their own database. As the users are populating their databases with the gesture data samples, the user's systems may be able to recognize more and more movements or gestures.

In a brief overview, a web page may comprise a number of gesture movements expressed as either animated gif files, video files, flash animation or any other type and form of motion depiction that can be expressed on a web page. Users may wish to download a number of gesture data samples to populate their own individual databases to be able to recognize more gestures using their own systems. Such users may access the web page of the present disclosure and simply download the gesture data samples by clicking on them and downloading them. The web page may comprise a whole library of gestures samples. Each gesture sample may include a link to a gesture sample comprising a number of gesture data frames, each comprising GDFs that can be used to identify a particular movement or gesture by a subject.

The users may be able to click, and download the whole gesture samples, individual frames of gesture data, variable number of frames or any selection of gesture data they want.

In some embodiments, users download more than one version or more than one sample of the whole gesture. Range of frames may be between 40 and 10000, such as for example 45, 50, 75, 100, 150, 200, 250, 300, 350, 400, 450, 500, 600, 700, 800, 900, 1000, 2000, 3000, 5000, 7000, and 1000 frames.

In some embodiments, gesture data sets may include PCA collapsed gesture data samples, PJVA compressed gesture data samples. SFMV compressed samples or any other type and form of gesture data set described herein. In some embodiments, gesture data samples available for download include a set of 500 consecutive frames. In other embodiments, gesture data samples include a set of 45 frames with the last 15 frames repeated for a total set of 60 frames. In further embodiments, gesture data samples available on the web page include a continuum of 60 frames of gesture data.

Web page may comprise the functionality to remove a whole frame or one or more frames, enabling the user to select the frames which the user wants to include into the gesture data sample. The frames may be edited to appear consecutive after editing, even if some frames were taken out during the editing process.

Autoremove feature or function may be included in the functionality of the website to automatically remove a frame in a succession of frames upon determining that the frame includes an error. For example, autoremove function may remove a frame of data that includes erroneous artifacts. Autoremove function may remove a frame that includes unwanted subjects. In such instances the unwanted gesture data may be erased from the frames by the autoremove function either automatically or with a user's control and selection. Autoremove function may be automated, and therefore implement these function without any input or interaction from a user, or it may be semi-automated, enabling the user to control which actions to take and in what manner.

Removal may be suggested to the user or automatically implemented by the function of the web page if a body portion of the subject is not visible. In one embodiment, if a subject is partially or wholly removed from the viewing angle, the function of the web page may produce an error. The error may result in automatic deletion of the erring frame or in an error message to the user alerting the user of the issue.

Web page may organize gestures into particular families of gestures to make more available for different kinds of users. In one example, dancing gestures may be organized into a single group enabling the users interested in dancing games to view and download dancing gestures in a single collection. In another example, aggressive gestures may be organized into a single group to enable users interested in recognizing aggressive behavior to download the relevant gestures. For example, a web page may enable a prison security guard to access the web page and download a series of gesture data samples helping the security person to use the cameras of the prison system to extrapolate gestures and movements that may resemble fights of security issues. A similar classification of other families of gestures and movements may be grouped and made available in a clear and easily researchable format on the web site.

J. Systems and Methods of Preparing Gesture Samples Using a Software Application Present disclosure further relates to systems and methods of preparing gesture samples using a software application or a software function. Gesture samples, which may then be used to detect and recognize movements or gestures of subjects, may be created by an application which may be called Gesture Studio. Gesture Studio, also referred to as the GS, may comprise hardware, software and a combination of hardware and software for creating, refining and modifying complete gesture sample sets that can then simply be stored into a database and used by the recognizing functions to detect and identify motions, gestures and movements of one or more subjects.

Gesture Studio may be used in any step of the process of recording, a movement, selecting gesture data features to be used to represent the movement and/or editing the gesture data during the creating or refinement of the gesture sample. GS may include software functions for neatly trimming the gesture data. Gesture Studio may include a user interface for enabling sensitivity adjustments, for editing gesture data and adjusting thresholds for each gesture, frame or gesture data point within any of the frames. Gesture data may be deleted or modified in the GS. Gesture data features in X, Y, Z or time dimension may be changed and modified to more accurately represent a motion, gesture or a movement. Gesture studio may enable a user to pick a reference point or the anchoring point to which the gesture data will be anchored. In some embodiments, the user may pick that for a particular gesture sample, a GDF of a waist of the user is selected as anchoring point with respect to which all the GDFs are described as vectors. An example of this is further described in FIGS. 10A-C. Gesture Studio may also enable a user to use any of the compression or processing functions described herein, including the PCA, PJVA, SMFV or other compression or enhancing functions. Gesture studio may enable the user to establish and set any threshold described herein, including any thresholds that may be used for PCA, PJVA and/or SFMV. Gesture Studio may work in conjunction with a learning algorithm and may send that gesture data set to be learned by the learning algorithm.

In some embodiments, gesture studio may comprise all functionality described herein for learning to recognize the gesture from gesture data. Gesture studio may operate on a personal computer as a specialized and installed software, and on any processing device, such as a server. Gesture studio may include the functionality for automatically trimming, modifying or deleting erroneous gesture data or gesture data frames. Gesture Studio may also allow for the integration of the recognizer file that the cloud produces to be attached to code triggers Currently Gesture Studio may be a desktop app, but it can may also be deployed via website.

In brief overview, Gesture studio may be used as follows:

A user may mark a position on the floor where a camera, such as a Kinect camera, may detect a body of a subject without intersecting with the line of sight. Then, Gesture Studio may enable the user to select custom tracking if specific points of the body (i.e. gesture data features) are especially important, or more important than others. Gesture studio may then allow the user to "start recording" or "Record" to begin capturing the movement or gesture via the camera. In some embodiments, button for recording may show up on a computer screen, which upon pressing may trigger the recording operation. In some embodiments, repeating the gesture several times increases accuracy as the Gesture Studio may acquire additional frames of gesture data. Gesture studio may enable a user to stop the capture mode and stop recording.

Gesture studio may also include the functionality for removing undesired frames from the gesture sample set. Gesture studio may also include an auto-remove function for eliminating the erroneous or had frames of gesture data. Gesture studio may include the function to enable the user to name a gesture and save it as a file. Gestures with same or similar names may be grouped together by the GS. Gesture studio may also produce an animated gif or a video illustrating the motion or movement or gesture represented by the saved gesture sample. Gesture studio may also provide a window showing the GDFs through frames, enabling the user to observe the relative locations and positions of each of the GDFs on the screen, Gesture studio may also provide a window comprising the matrices of gesture data for each of the frames or through time. Gesture studio may also enable the user to view and/or edit any of the entries in the feature matrix, including the GDF entries, polynomial constants and any entries of the gesture data matrices described herein.

Gesture studio may provide any number of gesture data samples for a particular movement or a gesture. In some embodiments, the GS may provide a minimum of 2, 3 or 5 gesture data samples. The provided gesture data samples may include anywhere between 10 and 10,000 frames of gesture data. In some embodiments, gesture data samples include 45 frames, 100 frames, 200 frames, 300 frames or 500 frames of gesture data.

User may pick and choose which gestures to record, edit and send to system to learn and store in a database. Gesture identification may be shown in a color, such as for example red. Gesture studio function may enable the user to easily assign keyboard and/or mouse keys to learned gestures or specific functions which the user may use during the process. Gesture studio may be operated individually or in conjunction with a video game using gesture movements. User may therefore teach the game the gesture movements in real time, while playing the game. Gesture Studio may be deployed online as a component of the web page described above. The GS may be implemented as a function of the web page, in flash, java or javascript. Gesture studio may be accessed by the users via their web browser, and the users may use their individual personal computer's video cameras or the cameras from mobile devices to record a gesture or a movement to teach and process via the gesture studio. Users may upload videos of themselves or others to process using the Gesture Studio via their web browsers.

I claim:

1. A method of identifying a gesture of a subject based on self-referential gesture data compressed by principal joint variable analysis in combination with principal component analysis, the method comprising:
   receiving, by a classifier of a system, a stream of reference frames from a detector unit, the stream of reference frames comprising a set of self-referential gesture data points provided in three dimensions, each self-referential gesture data point identifying locations or positions of one or more parts of a body of a subject with respect to a reference body point on the body of the subject with respect to a particular dimension of the three dimensions;
   determining, by the classifier, that a subset of the set of self-referential gesture data points is sufficient to recognize a reference gesture;
   generating, by the classifier, a feature matrix, each row of the feature matrix (i) representative of a particular location or position of the one or more parts of the body, and (ii) having at east three cells, each cell storing a self-referential gesture data point of the set of self-referential gesture data points corresponding to the particular location or position of the one or more parts of the body in one of the three dimensions;
   transforming the feature matrix into a compressed feature matrix using a principal joint variable analysis function at a pre-defined variance threshold in combination with a principal component analysis function, collapsing the feature matrix by reducing the three-dimensional data set into a two-dimensional data set or a single-dimensional data set, the compressed feature matrix maintaining only the rows of the feature matrix having a corresponding variance greater than the pre-defined variance threshold;
   storing, into a database of the system, the compressed feature matrix representative of the reference gesture;
   receiving, by a recognizer of the system, a new stream of frames including new self-referential gesture data points, each new self-referential gesture data point identifying a location of a part of a body of a new subject with respect to the reference body point on the body of the new subject;
   recognizing, by the recognizer, that the gesture of the new subject corresponds to the reference gesture by comparing only the new self-referential gesture data points corresponding to the self-referential gesture data points in the compressed feature matrix; and
   determining that the gesture of the new subject corresponds to the reference gesture when the new self-referential gesture data points corresponding to the compressed feature matrix only vary from the data set of the compressed feature matrix within a pre-defined recognition threshold.

2. The method of claim 1, further identifying, by the recognizer, within a first threshold of accuracy that at least a first new self-referential gesture data point matches at least one self-referential gesture data point of the compressed feature matrix.

3. The method of claim 2, further identifying, by the recognizer, within a second threshold of greater accuracy than the first threshold of accuracy that at least a second new self-referential gesture data point matches at least a second self-referential gesture data point of the compressed feature matrix.

4. The method of claim 1, wherein the reference body point includes a waist of the body of the subject.

5. The method of claim 1, wherein the reference body point includes the mid-point of the chest of the subject.

6. The method of claim 1, further comprising comparing, by the recognizer, a new self-referential gesture data point corresponding to a location of a wrist of the new subject with respect to the new subject's waist to a self-referential gesture data point of the wrist of the subject with respect to the subject's waist.

7. The method of claim 1, further comprising comparing, by the recognizer, a new self-referential gesture data point corresponding to a location of an elbow of the new subject with respect to the new subject's mid-point chest to a self-referential gesture data point corresponding to a location of an elbow of the subject with respect to the subject's waist.

8. A system for using self-referential gesture data compressed by principal joint variable analysis in combination with principal component analysis to identify a gesture of a subject, the system comprising:
   a classifier configured to receive a stream of reference frames from a detector unit, the stream of reference frames comprising a set of self-referential gesture data points provided in three dimensions, each self-referential gesture data point identifying locations or positions of one or more parts of a body of a subject with respect to a reference body point on the body of the subject with respect to a particular dimension of the three dimensions;

the classifier configured to determine that a subset of the set of self-referential gesture data points is sufficient to recognize a reference gesture;

the classifier configured to generate a feature matrix, each row of the feature matrix (i) representative of a particular location or position of the one or more parts of the body, and (ii) having at least three cells, each cell storing a self-referential gesture data point of the set of self-referential gesture data points corresponding to the particular location or position of the one or more parts of the body in one of the three dimensions;

the classifier configured to transform the feature matrix into a compressed feature matrix using a principal joint variable analysis function at a pre-defined variance threshold in combination with a principal component analysis function, collapsing the feature matrix by reducing the three-dimensional data set into a two-dimensional data set or a single-dimensional data set, the compressed feature matrix maintaining only the rows of the feature matrix having a corresponding variance greater than the pre-defined variance threshold;

a data storage configured to store the compressed feature matrix representative of the reference gesture; and a recognizer configured to receive a new stream of frames including new self-referential gesture data points, each new self-referential gesture data point identifying a location of a part of a body of a new subject with respect to the reference body point on the body of the new subject and recognizing that the gesture of the new subject corresponds to the reference gesture when the new self-referential gesture data points corresponding to the compressed feature matrix only vary from the data set of the compressed feature matrix within a pre-defined recognition threshold.

9. The system of claim 8, wherein the recognizer further identifies, within a first threshold of accuracy, that at least a first self-referential new gesture data point matches at least one self-referential gesture data point of the compressed feature matrix.

10. The system of claim 9, wherein the recognizer further identifies, within a second threshold of greater accuracy than the first threshold of accuracy, that at least a second new self-referential gesture data point matches at least a second self-referential gesture data point of the compressed feature matrix.

11. The system of claim 8, wherein the reference body point includes a waist of the body of the subject.

12. The system of claim 8, wherein the reference body point includes the mid-point of the chest of the subject.

13. The system of claim 8, wherein the recognizer is configured to compare a new self-referential gesture data point corresponding to a location of a wrist of the new subject with respect to the new subject's waist to a self-referential gesture data point of the wrist of the subject with respect to the subject's waist.

14. The system of claim 8, wherein the recognizer is configured to compare a new self-referential gesture data point corresponding to a location of an elbow of the new subject with respect to the new subject's mid-point chest to a self-referential gesture data point corresponding to a location of an elbow of the subject with respect to the subject's waist.

15. The method of claim 1, wherein the transforming further includes performing a slow and fast motion vector compression function to extract one or more additional mid-frames by plotting the one or more additional mid-frames using a $4^{th}$ order polynomial function applied to the feature matrix, the one or more additional mid-frames being extracted to provide a sufficient number of frames to detect or recognize the reference gesture and added to the feature matrix as additional self-referential gesture data points prior to generation of the compressed feature matrix.

16. The method of claim 1, wherein the transforming further includes the appending of a temporal vector obtained from a timestamp in the feature matrix, the temporal vector being used to generate additional frames at different slices of time, the additional frames being extracted to provide a sufficient number of frames to detect or recognize the reference gesture and added to the feature matrix as additional self-referential gesture data points prior to generation of the compressed feature matrix.

17. The method of claim 15, wherein the transforming further includes the appending of a temporal vector obtained from a timestamp in the feature matrix, the temporal vector being used to generate second additional frames at different slices of time, the second additional frames being added to the feature matrix as second additional self-referential gesture data points prior to generation of the compressed feature matrix.

18. The method of claim 16, wherein the appending of the temporal vector includes a determination of a starting point that is shifted incrementally to generate the additional frames.

19. The system of claim 8, wherein the recognizer is further configured to perform a slow and fast motion vector compression function to extract one or more additional mid-frames between first frame and the second frame by plotting the one or more additional mid-frames using a $4^{th}$ order polynomial function applied to the feature matrix, the one or more additional mid-frames being extracted to provide a sufficient number of frames to detect or recognize the reference gesture and added to the feature matrix prior to generation of the compressed feature matrix.

20. The system of claim 8, wherein the recognizer is further configured to append of a temporal vector obtained from a timestamp in the feature matrix, the temporal vector being used to generate additional frames at different slices of time, the additional frames being extracted to provide a sufficient number of frames to detect or recognize the reference gesture and added to the feature matrix prior to generation of the compressed feature matrix.

* * * * *

UNITED STATES PATENT AND TRADEMARK OFFICE
CERTIFICATE OF CORRECTION

| | | |
|---|---|---|
| PATENT NO. | : 9,448,636 B2 | Page 1 of 1 |
| APPLICATION NO. | : 13/838294 | |
| DATED | : September 20, 2016 | |
| INVENTOR(S) | : Bulzacki | |

It is certified that error appears in the above-identified patent and that said Letters Patent is hereby corrected as shown below:

TITLE PAGE

ITEM 12 ---------SHOULD READ

BULZACKI

ITEM 76 ---------SHOULD READ

Adrian Bulzacki

Signed and Sealed this
Twenty-ninth Day of November, 2016

Michelle K. Lee
*Director of the United States Patent and Trademark Office*